US011420636B2

(12) United States Patent
Oba

(10) Patent No.: US 11,420,636 B2
(45) Date of Patent: Aug. 23, 2022

(54) INFORMATION PROCESSING DEVICE, MOVING APPARATUS, METHOD, AND PROGRAM

(71) Applicant: Sony Semiconductor Solutions Corporation, Kanagawa (JP)

(72) Inventor: Eiji Oba, Tokyo (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 17/274,100

(22) PCT Filed: Aug. 30, 2019

(86) PCT No.: PCT/JP2019/034078
§ 371 (c)(1),
(2) Date: Mar. 5, 2021

(87) PCT Pub. No.: WO2020/054458
PCT Pub. Date: Mar. 19, 2020

(65) Prior Publication Data
US 2021/0188289 A1 Jun. 24, 2021

(30) Foreign Application Priority Data
Sep. 13, 2018 (JP) .............................. JP2018-171586

(51) Int. Cl.
*B60W 40/08* (2012.01)
*B60W 50/08* (2020.01)
(Continued)

(52) U.S. Cl.
CPC .......... *B60W 40/08* (2013.01); *B60W 50/082* (2013.01); *B60W 50/14* (2013.01);
(Continued)

(58) Field of Classification Search
CPC . B60W 2040/0818; B60W 2040/0881; B60W 2050/007; B60W 2050/0083;
(Continued)

(56) References Cited

U.S. PATENT DOCUMENTS

| 2016/0029940 A1 | 2/2016 | Iizuka et al. |
| 2016/0041553 A1* | 2/2016 | Sato .................... B60W 30/143 |
| | | 701/23 |

(Continued)

FOREIGN PATENT DOCUMENTS

| EP | 2977975 A1 | 1/2016 |
| EP | 2982565 A2 | 2/2016 |

(Continued)

OTHER PUBLICATIONS

International Search Report and English translation thereof dated Nov. 26, 2019 in connection with International Application No. PCT/JP2019/034078.

*Primary Examiner* — Thomas S McCormack
(74) *Attorney, Agent, or Firm* — Wolf, Greenfield & Sacks, P.C.

(57) ABSTRACT

An alertness level that is the consciousness level of the driver of a vehicle is determined, and the timing of a manual driving return request notification is controlled in accordance with the alertness level. A data processing unit determines the alertness level of the driver of the vehicle, and records evaluation data. The data processing unit acquires observation information about the driver, determines the alertness level of the driver, and evaluates and records the return rate at each time. The vehicle is a vehicle capable of switching between automatic driving and manual driving, and the data processing unit controls the timing of a manual driving return request notification for the driver's return from automatic driving to manual driving, in accordance with the alertness level of the driver. The observation (Continued)

information to be acquired by the data processing unit includes observation information about the driver both before and after the driver gets in the vehicle. For example, passive monitoring, information about the driver's response to a notification, and the like are observed.

18 Claims, 35 Drawing Sheets

(51) Int. Cl.
*B60W 50/14* (2020.01)
*G06V 20/59* (2022.01)
*B60W 50/00* (2006.01)

(52) U.S. Cl.
CPC ... *G06V 20/597* (2022.01); *B60W 2040/0818* (2013.01); *B60W 2040/0881* (2013.01); *B60W 2050/007* (2013.01); *B60W 2050/146* (2013.01); *B60W 2540/223* (2020.02); *B60W 2540/229* (2020.02)

(58) Field of Classification Search
CPC ..... B60W 2050/146; B60W 2540/221; B60W 2540/223; B60W 2540/227; B60W 2540/229; B60W 2540/30; B60W 2556/10; B60W 40/08; B60W 50/082; B60W 50/14; B60W 60/005; G06K 9/00791; G06K 9/00845; G08G 1/00; G08G 1/16

See application file for complete search history.

(56) References Cited

U.S. PATENT DOCUMENTS

| | | | |
|---|---|---|---|
| 2017/0303842 A1* | 10/2017 | Yoshida | B60W 50/0097 |
| 2018/0113454 A1 | 4/2018 | Emura et al. | |
| 2018/0329414 A1 | 11/2018 | Igarashi et al. | |

FOREIGN PATENT DOCUMENTS

| | | |
|---|---|---|
| EP | 3378722 A1 | 9/2018 |
| JP | 2016-038768 A | 3/2016 |
| JP | 2017-001563 A | 1/2017 |
| JP | 2017-131445 A | 8/2017 |
| JP | 2018-045451 A | 3/2018 |
| WO | WO 2014/147828 A1 | 9/2014 |
| WO | WO 2017/085981 A1 | 5/2017 |

* cited by examiner

FIG. 3
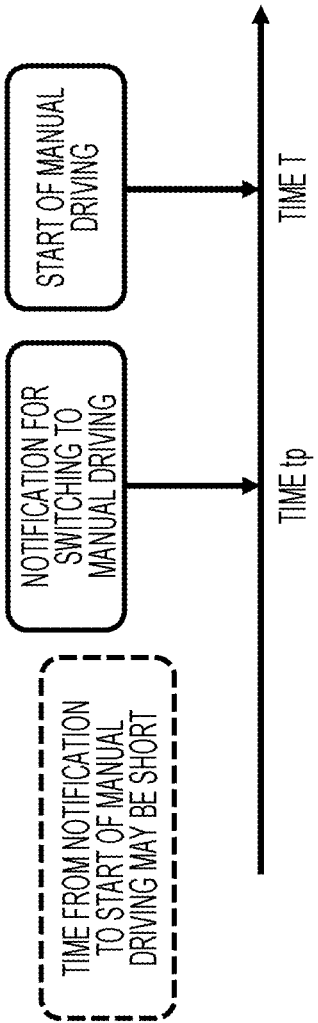
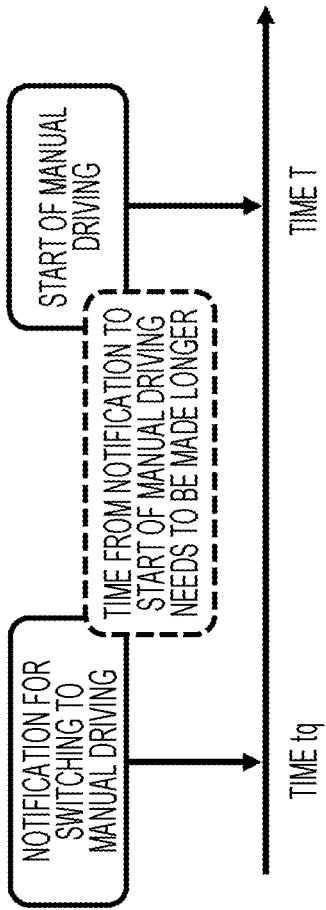

FIG. 24

| | DRIVER INFORMATION PARAMETERS (Pd1, Pd2, ...Pdn) | ENVIRONMENT INFORMATION PARAMETERS (Pc1, Pc2, ...Pcm) | SAFETY INDEX VALUE (0 (DANGER) TO 1 (SAFETY)) | ESTIMATED MANUAL DRIVING RESUMABLE TIME VALUE |
|---|---|---|---|---|
| (1) | (Pd1,Pd2,...Pdn)= (0.9,1.2,2.2··) | (Pc1,Pc2,...Pcn)= (3.5,4.2,1.0··) | 0 | 120sec |
| (2) | (Pd1,Pd2,...Pdn)= (0.9,1.3,2.1··) | (Pc1,Pc2,...Pcn)= (3.4,4.1,0.9··) | 0 | 120sec |
| (3) | (Pd1,Pd2,...Pdn)= (1.0,1.1,2.1··) | (Pc1,Pc2,...Pcn)= (3.4,4.1,1.0··) | 0.1 | 100sec |
| (4) | (Pd1,Pd2,...Pdn)= (0.8,1.1,2.1··) | (Pc1,Pc2,...Pcn)= (3.3,4.0,0.9··) | 0.2 | 90sec |
| ·· | ·· | ·· | ·· | ·· |
| (kkk-1) | (Pd1,Pd2,...Pdn)= (2.1,1.5,2.8··) | (Pc1,Pc2,...Pcn)= (3.1,3.8,0.5··) | 0.9 | 40sec |
| (kkk) | (Pd1,Pd2,...Pdn)= (02.2,1.7,2.9··) | (Pc1,Pc2,...Pcn)= (3.0,3.7,0.3··) | 1.0 | 30sec |

FIG. 29

(1) CASE OF NAPPING IN NAP ROOM

| (a) PASSIVE MONITORING | (b) AWAKENING, WAKING UP, CHECKING OF SURROUNDINGS | (c) RETURN TO DRIVER'S SEAT | (d) RETURN TO DRIVING POSTURE | (e) ACTIVE RESPONSE (interactive) | (f) EYE MOVEMENT | (g) CHECKING OF RETURN CAPABILITY (S/P) |
|---|---|---|---|---|---|---|
| t0 | t1 | | t2 | t3 | t4 | t5 | t6 |

(2) CASE OF BEING NOT IN DRIVER'S SEAT AND BEING AWAKE (AWAKE STATE)

| (h) NOT IN DRIVER'S SEAT (PASSIVE/ACTIVE MONITORING) | (c) RETURN TO DRIVER'S SEAT | (d) RETURN TO DRIVING POSTURE | (e) ACTIVE RESPONSE (interactive) | (f) EYE MOVEMENT | (g) CHECKING OF RETURN CAPABILITY (S/P) |
|---|---|---|---|---|---|
| t10 | t11 | t12 | t13 | t14 | t15 | t16 |

(3) CASE OF BEING SEATED IN DRIVER'S SEAT BUT BEING NOT IN DRIVING POSTURE

| (i) IRREGULAR POSTURE IN DRIVER'S SEAT (PASSIVE/ACTIVE MONITORING) | (d) RETURN TO DRIVING POSTURE | (e) ACTIVE RESPONSE (interactive) | (f) EYE MOVEMENT | (g) CHECKING OF RETURN CAPABILITY (S/P) |
|---|---|---|---|---|
| t21 | t22 | t23 | t24 | t25 | t26 |

(4) CASE OF EXECUTING SECONDARY TASK WHILE REMAINING IN DRIVING POSTURE

| (j) EXECUTING SECONDARY TASK IN DRIVING POSTURE (PASSIVE/ACTIVE MONITORING) | (e) ACTIVE RESPONSE (interactive) | (f) EYE MOVEMENT | (g) CHECKING OF RETURN CAPABILITY (S/P) |
|---|---|---|---|
| t32 | t23 | t24 | t25 | t26 |

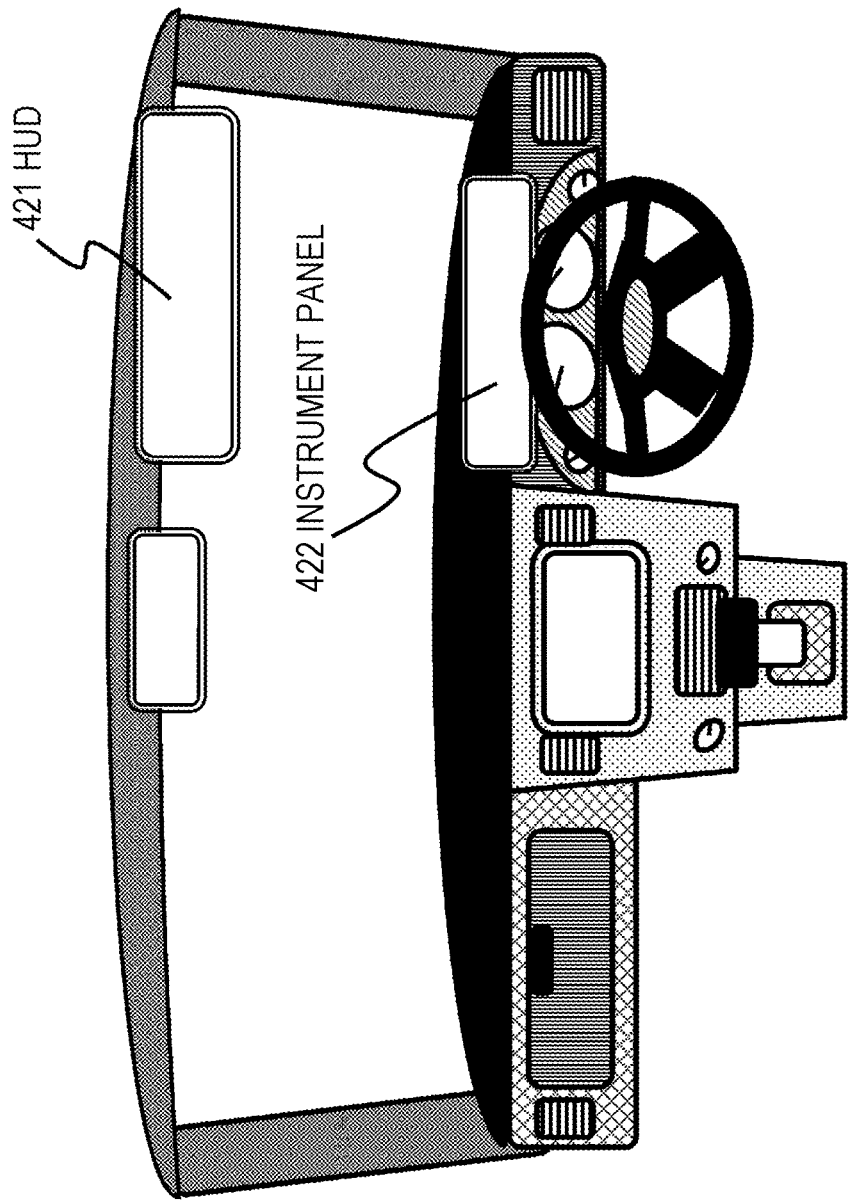

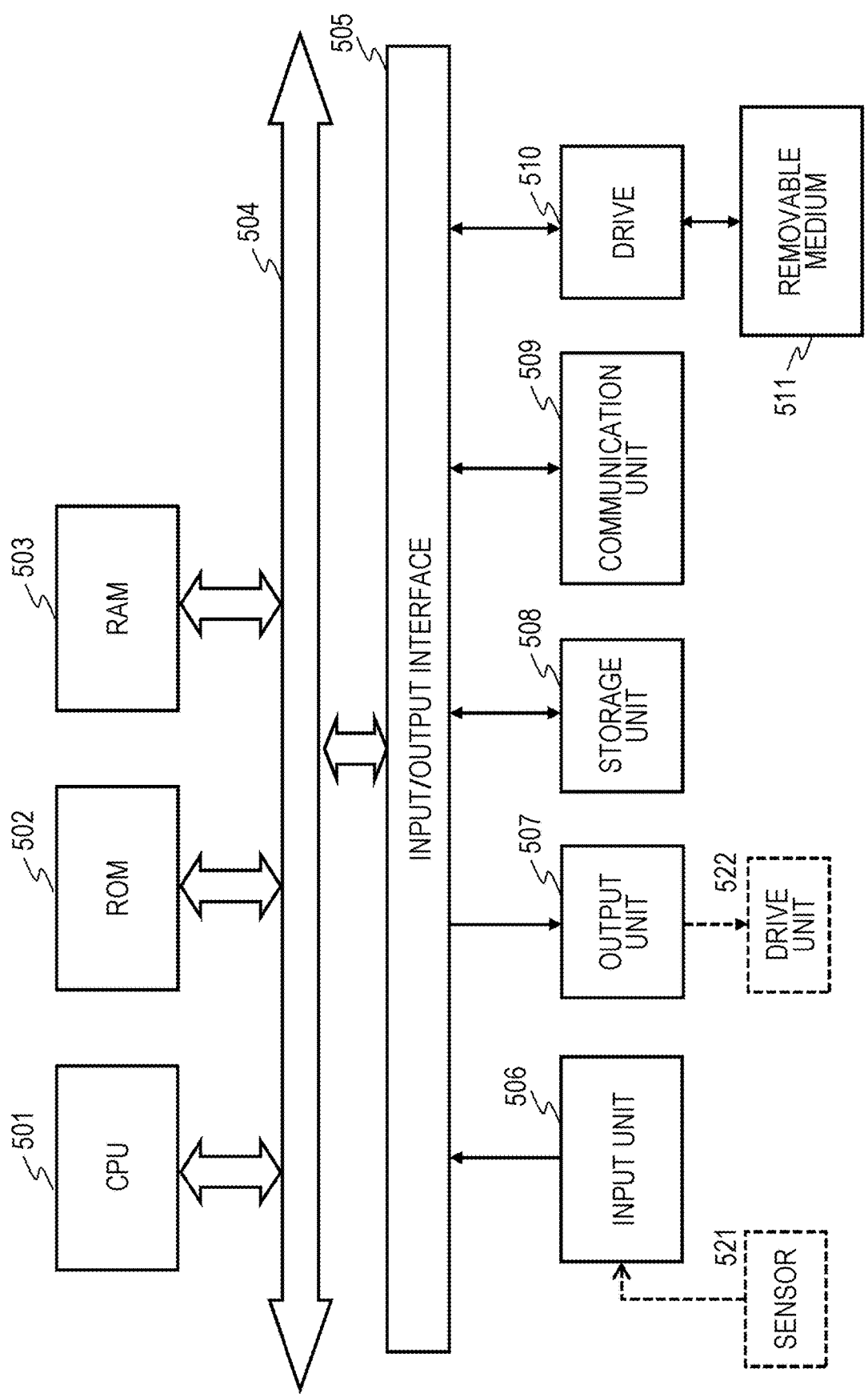

INFORMATION PROCESSING DEVICE, MOVING APPARATUS, METHOD, AND PROGRAM

CROSS-REFERENCE TO RELATED APPLICATIONS

This is a U.S. National Stage Application under 35 U.S.C. § 371, based on International Application No. PCT/JP2019/034078, filed in the Japanese Patent Office as a Receiving Office on Aug. 30, 2019, which claims priority under 35 U.S.C. § 119(a)-(d) or 35 U.S.C. § 365(b) to Japanese Patent Application Number JP2018-171586, filed in the Japanese Patent Office on Sep. 13, 2018, each of which applications is hereby incorporated by reference in its entirety.

TECHNICAL FIELD

The present disclosure relates to an information processing device, a moving apparatus, a method, and a program. More particularly, the present disclosure relates to an information processing device, a moving apparatus, a method, and a program for controlling switching between automatic driving and manual driving.

BACKGROUND ART

Technological development related to automatic driving is being actively conduced these days.

Autonomous driving technology is a technology that enables automatic driving on roads by using various sensors such as position detecting means provided in a vehicle (automobile), and is expected to spread rapidly in the future.

At present, however, automatic driving is in the development stage, and it is believed to take some time before 100% automatic driving becomes possible. Therefore, it is predicted that, for some time in the future, driving is performed by switching automatic driving and manual driving by an operator (driver).

For example, on a straight road with a sufficient road width such as an expressway, driving is performed in an automatic driving mode. However, in a case where a vehicle leaves an expressway and stops at a desired position in a parking lot, or on a narrow mountain road or the like, it is predicted that it will be necessary to switch the mode to a manual driving mode to perform driving according to an operation being performed by the operator (driver).

While a vehicle is performing automatic driving, the operator (driver) does not need to look ahead in the traveling direction of the vehicle, and can take a desired action such as taking a nap, watching TV, reading a book, or sitting backward and talking with a person in the back seat, for example.

In a vehicle that switches between automatic driving and manual driving, in a case where it becomes necessary to switch from the automatic driving mode to the manual driving mode, it is necessary to make the operator (driver) start manual driving.

However, if the driver dozes off during automatic driving, for example, the driver's level of alertness drops. That is, the level of consciousness becomes lower. If the driving mode is switched to the manual driving mode in such a state in which the level of alertness has dropped, appropriate manual driving cannot be performed, and, in the worst case, an accident might occur.

To ensure safe driving, it is necessary to make the driver start manual driving when the driver's level of alertness is high, which is when the driver is clearly in a conscious state.

For this purpose, it is necessary to check the driver's level of alertness.

Note that an example conventional technology that discloses a technique for estimating the situation of an occupant in a vehicle is Patent Document 1 (Japanese Patent Application Laid-Open No. 2014-133449), for example. This document discloses a configuration for estimating a disability level such as the state of injury inflicted on the occupant by an accident or the like.

However, conventional technologies, including Patent Document 1, do not disclose any configuration for controlling the timing of notification that is necessary for a safe return from automatic driving to manual driving.

In a case where it becomes necessary to switch from the automatic driving mode to the manual driving mode, the operator (driver) needs to be notified to start manual driving.

If this notification timing is too late, manual driving is started when the driver's level of alertness is low, which is when the driver's level of consciousness is low, and the possibility of an accident will become higher.

CITATION LIST

Patent Document

Patent Document 1: Japanese Patent Application Laid-Open No. 2014-133449

SUMMARY OF THE INVENTION

Problems to be Solved by the Invention

The present disclosure is made in view of the above problem, for example, and aims to provide an information processing device, a moving apparatus, a method, and a program for enabling safe switching from automatic driving to manual driving.

Solutions to Problems

A first aspect of the present disclosure lies in an information processing device that includes a data processing unit that determines an alertness level that is the consciousness level of the driver of a vehicle, in which the data processing unit acquires observation information about the driver, and determines the alertness level of the driver on the basis of the acquired observation information.

Further, a second aspect of the present disclosure lies in a moving apparatus capable of switching between automatic driving and manual driving, the moving apparatus including a data processing unit that determines an alertness level that is the consciousness level of the driver of a vehicle, in which the data processing unit performs an observation information recording process to acquire observation information about the driver and store the observation information into a storage unit, determines the alertness level of the driver on the basis of the acquired observation information, and, in accordance with the determined alertness level, controls the notification timing of a manual driving return request notification that is a notification of request for the driver's return from automatic driving to manual driving.

Further, a third aspect of the present disclosure lies in an information processing method implemented in an information processing device, the information processing device including a data processing unit that determines an alertness level that is the consciousness level of the driver of a vehicle, in which the data processing unit performs an observation information recording process to acquire observation information about the driver and store the observation information into a storage unit, and determines the alertness level of the driver on the basis of the acquired observation information.

Further, a fourth aspect of the present disclosure lies in an information processing method implemented in a moving apparatus capable of switching between automatic driving and manual driving, the moving apparatus including a data processing unit that determines an alertness level that is the consciousness level of the driver of the moving apparatus, in which the data processing unit performs an observation information recording process to acquire observation information about the driver and store the observation information into a storage unit, determines the alertness level of the driver on the basis of the acquired observation information, and, in accordance with the determined alertness level, controls the notification timing of a manual driving return request notification that is a notification of request for the driver's return from automatic driving to manual driving.

Further, a fifth aspect of the present disclosure lies in a program for causing an information processing device to perform information processing, the information processing device including a data processing unit that determines an alertness level that is the consciousness level of the driver of a vehicle, in which the program causes the data processing unit to perform an observation information recording process to acquire observation information about the driver and store the observation information into a storage unit, and determine the alertness level of the driver on the basis of the acquired observation information.

Note that the program of the present disclosure is a program that can be provided in a computer-readable format from a storage medium or a communication medium to an information processing device or a computer system that can execute various program codes, for example. As such a program is provided in a computer-readable format, processes according to the program are performed in an information processing device or a computer system.

Other objects, features, and advantages of the present disclosure will be made apparent by the embodiments of the present disclosure described below and the detailed descriptions with reference to the accompanying drawings. Note that, in this specification, a system is a logical assembly of a plurality of devices, and does not necessarily mean devices with the respective components incorporated into the same housing.

Effects of the Invention

A configuration of one embodiment of the present disclosure forms a configuration that determines an alertness level that is the consciousness level of the driver of a vehicle, and determines the timing of a manual driving return request notification in accordance with the alertness level.

Specifically, a data processing unit determines the alertness level, which is the consciousness level of the driver of the vehicle, for example. The data processing unit acquires observation information about the driver, and determines the alertness level of the driver. The vehicle is a vehicle capable of switching between automatic driving and manual driving, and the data processing unit controls the timing of a manual driving return request notification for the driver's return from automatic driving to manual driving, in accordance with the alertness level of the driver. The observation information to be acquired by the data processing unit includes observation information about the driver both before and after the driver gets in the vehicle. For example, passive monitoring, information about the driver's response to a notification, and the like are observed.

This configuration forms a configuration that determines an alertness level that is the consciousness level of the driver of a vehicle, and determines the timing of a manual driving return request notification in accordance with the alertness level.

Note that the advantageous effects described in this specification are merely examples, and the advantageous effects of the present technology are not limited to them and may include additional effects.

BRIEF DESCRIPTION OF DRAWINGS

FIG. 3 is diagrams for explaining processes to be performed by a moving apparatus of the present disclosure.

FIG. 24 is a diagram for explaining an example configuration of input/output data of a learner.

FIG. 29 is a diagram for explaining examples of transition of state changes and transition timings corresponding to different initial states of the driver.

FIG. 34 is a diagram for explaining a configuration for issuing a notification formed with a message or warning information to the driver, using a head-up display (HUD) or an instrument panel in the vehicle.

FIG. 35 is a diagram for explaining an example hardware configuration of an information processing device.

MODES FOR CARRYING OUT THE INVENTION

Figure 1:
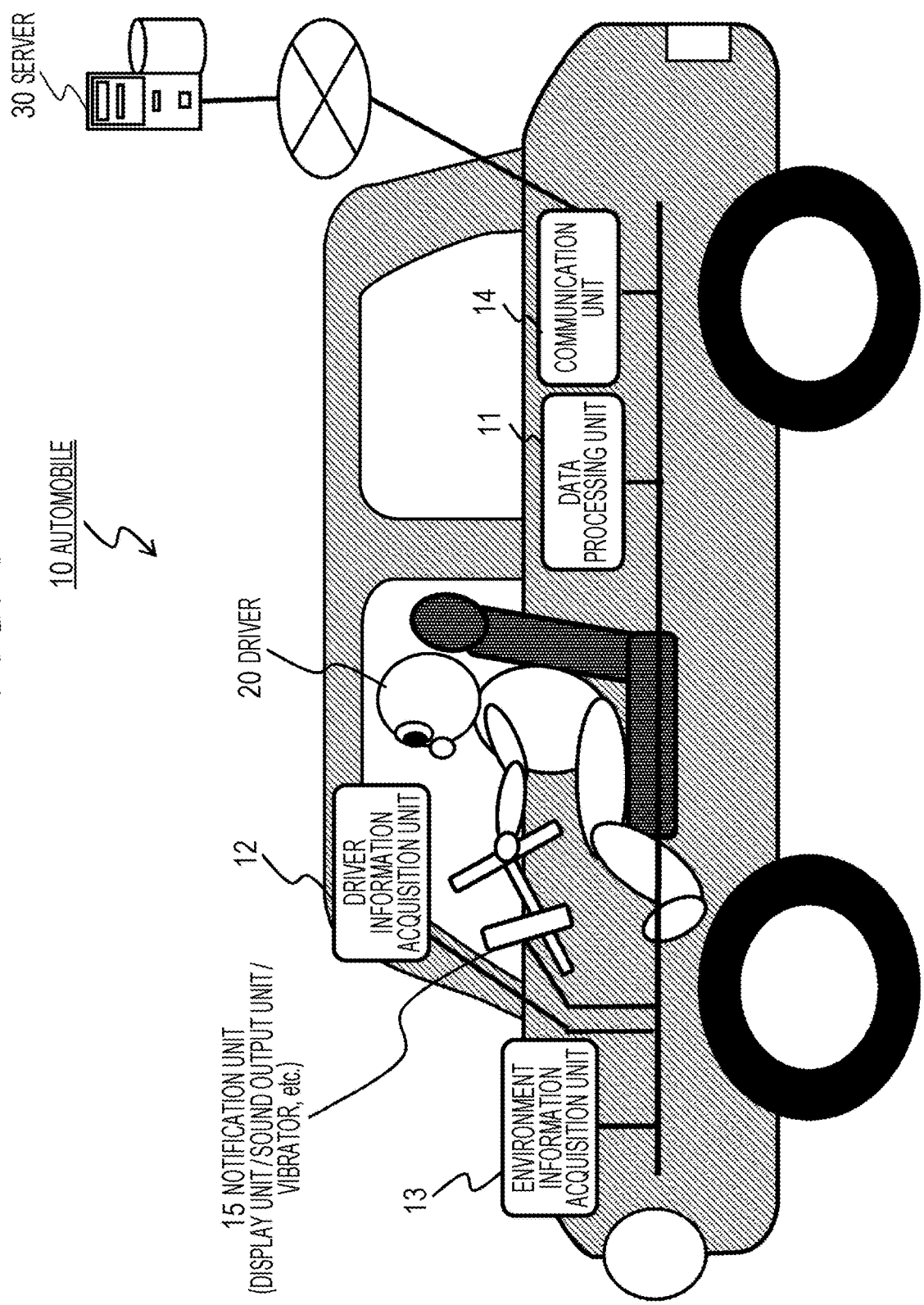
FIG. 1 is a diagram for explaining an example configuration of a moving apparatus of the present disclosure.

The following is a detailed description of an information processing device, a moving apparatus, a method, and a program of the present disclosure, with reference to the drawings. Note that explanation will be made in the following order.

1. Outline of the configurations of and the processes to be performed by a moving apparatus and an information processing device 2. Specific example configuration of a moving apparatus and example processes 3. Sequence of mode switching from automatic driving mode to manual driving mode 4. Example of automatic driving operation sequence 5. Safety determination process and manual driving resumable time estimation process to be performed by a moving apparatus 6. Sequence of processes to be performed by a moving apparatus and an information processing device of the present disclosure 7. Observation of the driver's states before and after execution of notification processes from the system to the driver, and a process of recording observation information 7-(1) Driver information to be acquired before the driver gets in the vehicle 7-(2) Driver information to be acquired after the driver gets in the vehicle 7-(2) (a) Driver information to be acquired before issuance of a manual driving return request notification to the driver 7-(2) (b) Driver information to be acquired after issuance of a manual driving return request notification to the driver 8. Driver's state changes and observation information at a time of transition from automatic driving to manual driving, and a return quality evaluation process 9. Specific examples for checking the driver's responses to notifications from the system 10. Example configuration of an information processing device 11. Summary of the configuration of the present disclosure

[1. Outline of the Configurations of and the Processes to be Performed by a Moving Apparatus and an Information Processing Device]

First, the configurations of a moving apparatus and an information processing device, and the processes to be performed are roughly described, with reference to FIG. 1 and the drawings that follow.

A moving apparatus of the present disclosure is an automobile capable of traveling while switching between automatic driving and manual driving, for example.

In such an automobile, in a case where it becomes necessary to switch from an automatic driving mode to a manual driving mode, it is necessary to make the operator (driver) start manual driving.

However, there are various processes (secondary tasks) that can be performed by the driver during automatic driving.

For example, there are cases where the driver has simply taken his/her hands off the steering wheel but is carefully looking ahead of the automobile in a manner similar to that during driving, there are cases where the driver is reading a book, and there are cases where the driver is napping.

The driver's level of alertness (consciousness level) varies depending on the differences among these processes.

For example, napping lowers the level of alertness of the driver. That is, the level of consciousness becomes lower. In such a state where the level of alertness is lowered, normal manual driving cannot be performed. If the mode is switched to the manual driving mode in that state, an accident might occur in the worst case.

To ensure safe driving, it is necessary to make the driver start manual driving when the driver's level of alertness is high, which is when the driver is clearly in a conscious state.

Therefore, it is necessary to change the notification timing for issuing a request for switching from automatic driving to manual driving, in accordance with the driver's level of alertness during automatic driving.

For example, in a case where the driver is looking ahead at the road during automatic driving, the driver's level of alertness is high, or is able to immediately start manual driving at any time.

In such a case, a notification for switching to manual driving is only required to be issued immediately before the time when manual driving becomes necessary. This is because the driver can immediately start safe manual driving.

However, in a case where the driver is dozing off during automatic driving, the driver's level of alertness is extremely low.

In such a case, if a notification for switching to manual driving is made immediately before the time when manual driving becomes necessary, the driver has no choice but to start manual driving, though he/she is not sufficiently alert. As a result, the possibility of an accident becomes higher. Therefore, in such a case where the level of alertness is low, it is necessary to issue a notification for switching to manual driving at an earlier stage.

A moving apparatus of the present disclosure, or an information processing device that can be mounted in the moving apparatus controls the timing of notification for switching to manual driving, in accordance with the driver's level of alertness, for example.

Further, in one embodiment of the present disclosure, not only driver information such as the level of alertness, but also the traveling time of the moving apparatus, the driver's operation information, environment information about the road and the like, information about the accidents that occurred in the past, and the like are used to calculate the optimum timing of notification for switching to manual driving, for example.

In one embodiment of the present disclosure, for example, a learning process is performed to calculate the alertness level using the respective pieces of information mentioned above, which are the traveling time of the moving apparatus, the driver's operation information, environment information about the road and the like, information about the accidents that occurred in the past, and the like, and the optimum notification timing is calculated as a result of the learning process.

Note that the learning process can be performed in an automobile that is the moving apparatus, or may be performed in a server that can communicate with the automobile that is the moving apparatus.

Also, in one embodiment of the present disclosure, at the time of the notification timing calculation process mentioned above, a process is performed by taking into consideration the driver's personal information, which is the driver's driving history, accident history, accumulated fatigue history according to a pre-driving life log, physical condition history information such as the drinking and sleep history, the driving operation information after a start of manual driving, information about the type of the automobile, and the like.

Further, information about the number of passengers and the cargo being loaded is used.

Note that, in a case where many kinds of information are used, the information may be used separately for preliminary learning and online learning, depending on data characteristics.

The configurations of a moving apparatus of the present disclosure and an information processing device that can be mounted in the moving apparatus, and the processes to be performed are now described, with reference to FIG. 1 and the drawings that follow.

FIG. 1 is a diagram showing an example configuration of an automobile 10 that is an example of a moving apparatus of the present disclosure.

An information processing device of the present disclosure is mounted in the automobile 10 shown in FIG. 1.

The automobile 10 shown in FIG. 1 is an automobile capable of driving in two driving modes: a manual driving mode and an automatic driving mode.

In the manual driving mode, traveling is performed on the basis of operations by an operator (driver) 20, such as an operation of the steering wheel, and operations of the accelerator, the brake, and the like.

In the automatic driving mode, on the other hand, operations by the operator (driver) 20 are unnecessary, and driving is performed on the basis of sensor information from a position sensor, and other sensors such as an ambient information detection sensor, for example.

The position sensor is a GPS receiver or the like, for example, and the ambient information detection sensor is a camera, an ultrasonic sensor, a radar, or a light detection and ranging or laser imaging detection and ranging (LIDAR) device, a sonar, or the like, for example.

Note that FIG. 1 is a diagram for explaining the outline of the present disclosure and schematically shows the principal components. The specific configuration will be described later.

As shown in FIG. 1, the automobile 10 includes a data processing unit 11, a driver information acquisition unit 12, an environment information acquisition unit 13, a communication unit 14, and a notification unit 15.

The driver information acquisition unit 12 acquires information for determining the level of alertness of the driver, operation information about the driver, and the like, for example. Specifically, the driver information acquisition unit 12 is formed with a camera that captures an image of the driver's face, operation information acquisition units of the respective operation units (such as the steering wheel, the accelerator, and the brake), and the like, for example.

The environment information acquisition unit 13 acquires traveling environment information about the automobile 10. For example, the traveling environment information includes information about the front, the rear, the right, and the left of the automobile, positional information by a GPS, light detection and ranging or laser imaging detection and ranging (LiDAR), information about surrounding obstacles from a sonar or the like, for example.

The data processing unit 11 receives inputs of driver information acquired by the driver information acquisition unit 12 and environment information acquired by the environment information acquisition unit 13, and calculates a safety index value indicating whether or not the driver in the vehicle in the automatic driving mode is capable of safely performing manual driving, and further, whether or not the driver performing manual driving is performing safe driving, and the like.

Further, in a case where it is necessary to switch from the automatic driving mode to the manual driving mode, for example, a process of performing a notification process via the notification unit 15 is performed so as to switch to the manual driving mode.

The timing of this notification process is the optimum timing calculated by receiving inputs from the driver information acquisition unit 12 and the environment information acquisition unit 13, for example.

That is, the timing is such that the driver 20 can start safe manual driving.

Specifically, in a case where the level of alertness of the driver is high, a notification is issued immediately before the manual driving start time, such as five seconds before the manual driving start time, for example. In a case where the level of alertness of the driver is low, a notification is issued 20 seconds before the manual driving start time to allow time. The calculation of the optimum timing for a specific notification will be described later.

The notification unit 15 is formed with a display unit or a sound output unit that issues this notification, or a vibrator of the steering wheel or the seat.

Figure 2:
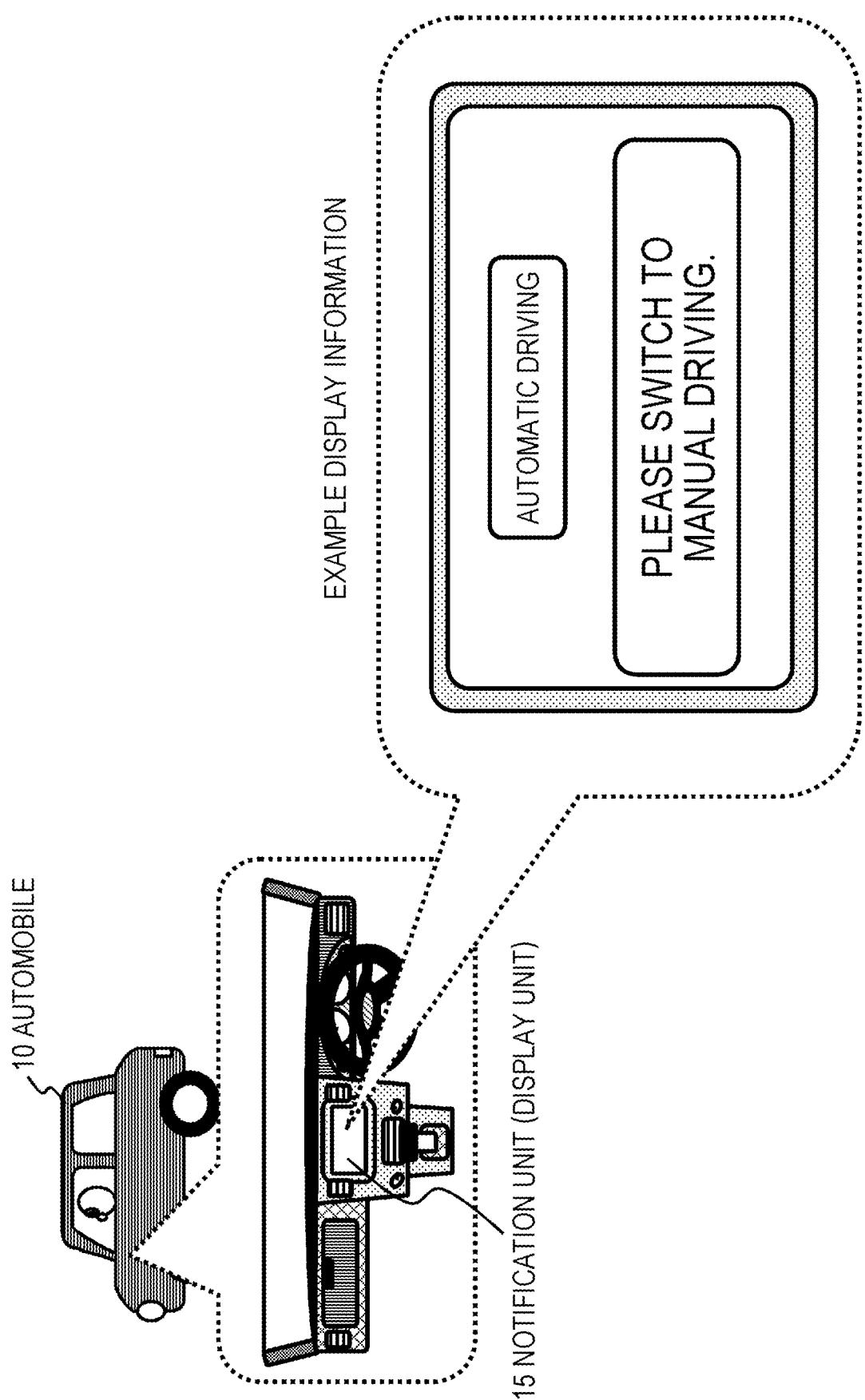
FIG. 2 is a diagram for explaining an example of data displayed on a display unit of a moving apparatus of the present disclosure.

An example of warning display on a display unit forming the notification unit 15 is shown in FIG. 2.

As shown in FIG. 2, a display unit 30 displays each of the following messages.

Driving mode information="Automatic Driving"
Warning display="Please switch to manual driving."

In a driving mode information display region, "Automatic Driving" is displayed during the automatic driving mode, and "Manual Driving" is displayed during the manual driving mode.

A warning display information display region is a display region that displays the following message while automatic driving is being performed in the automatic driving mode.

"Please switch to manual driving."

Note that this example is an example in which the explanation is put into words. However, the display is not necessarily such text display, but may be display using symbols such as pictograms, for example.

Note that the automobile 10 has a configuration capable of communicating with a server 30 via the communication unit 14, as shown in FIG. 1.

For example, part of the process of calculating an appropriate time for a notification output at the data processing unit 11, or specifically, a learning process can be performed in the server 30.

This specific example will be described later.

FIG. 3 is diagrams showing specific example processes to be executed by a moving apparatus and an information processing device of the present disclosure.

FIG. 3 is diagrams showing example settings of appropriate timing of a notification for making a request to switch to manual driving during automatic driving in the automatic driving mode, and the diagrams show the following two example notification processes.

(a) A notification process in a case where the level of alertness of the driver during automatic driving is high (b) A notification process in a case where the level of alertness of the driver during automatic driving is low The example in (a) is an example in which the driver looks ahead while looking at the road during automatic driving. In this case, the driver's level of alertness is high, or the driver is capable of starting manual driving at any time.

In such a case, the driver can promptly start safe manual driving, even if a notification for switching to manual driving is made immediately before the time when manual driving becomes necessary.

In the example in (b), in a case where the driver is dozing off during automatic driving, the driver's level of alertness is extremely low.

In such a case, if a notification for switching to manual driving is made immediately before the time when manual driving becomes necessary, the driver starts manual driving when he/she is not sufficiently alert, which will increase the possibility of an accident. Therefore, in such a case where the level of alertness is low, it is necessary to issue a notification for switching to manual driving at an earlier stage.

Figure 4:
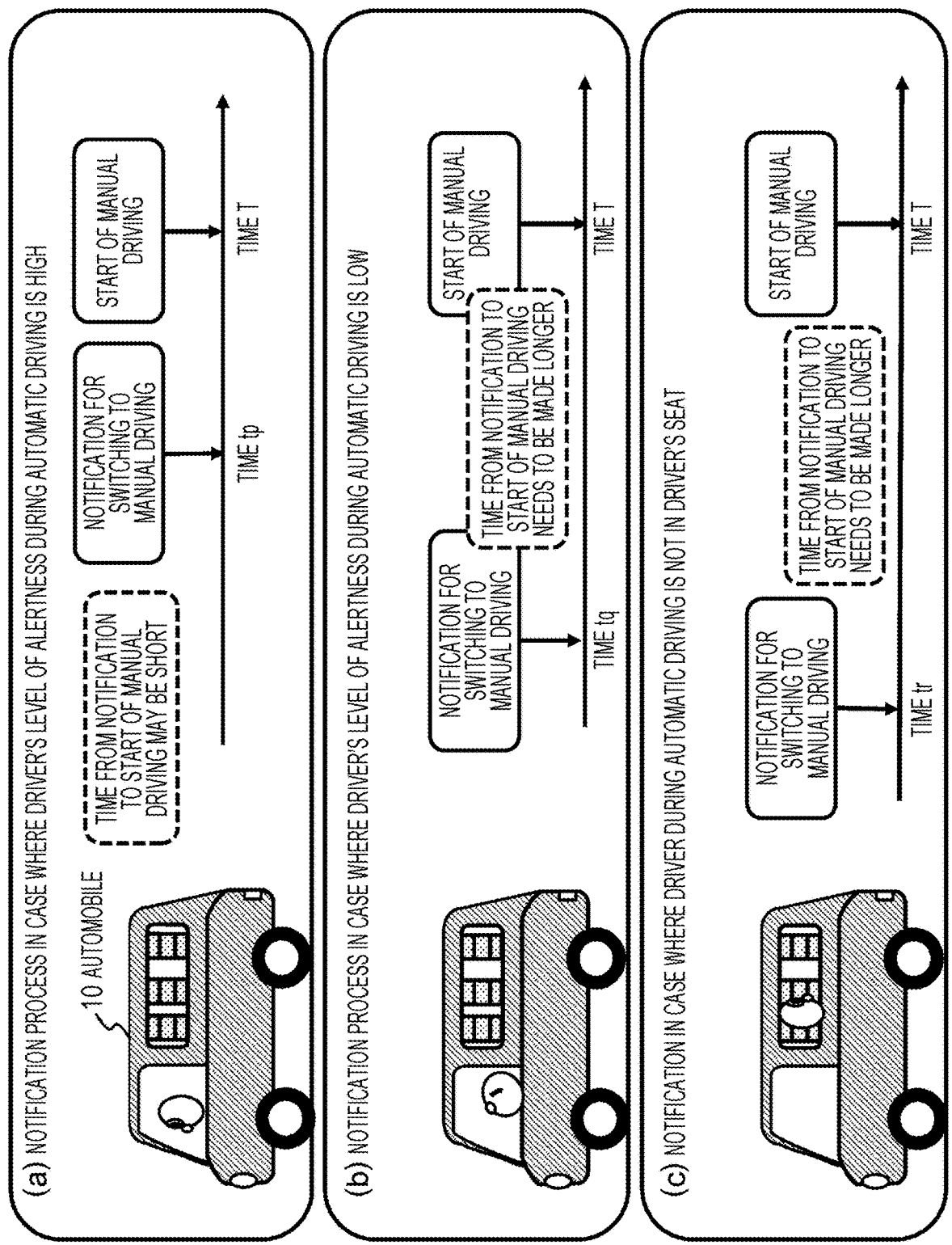
FIG. 4 is diagrams for explaining processes to be performed by a moving apparatus of the present disclosure.

Further, in a vehicle such as a delivery vehicle that has a cargo compartment and allows the driver to enter the cargo compartment and perform work during automatic driving, the notification timing for requesting switching to manual driving preferably varies in the following three cases as shown in FIG. 4, for example.

(a) A notification process in a case where the level of alertness of the driver during automatic driving is high (b) A notification process in a case where the level of alertness of the driver during automatic driving is low (c) A notification process in a case where the driver is away from the driver's seat during automatic driving The example in (a) is an example in which the driver looks ahead while looking at the road during automatic driving. In this case, the driver's level of alertness is high, or the driver is capable of starting manual driving at any time.

In such a case, the driver can promptly start safe manual driving, even if a notification for switching to manual driving is made immediately before the time when manual driving becomes necessary.

The example in (b) is an example case where the driver is dozing off during automatic driving, and, in this case, the driver's level of alertness is extremely low.

In such a case, if a notification for switching to manual driving is made immediately before the time when manual driving becomes necessary, the driver starts manual driving when he/she is not sufficiently alert, which will increase the possibility of an accident. Therefore, in such a case where the level of alertness is low, it is necessary to issue a notification for switching to manual driving at an earlier stage.

The example in (c) is an example case where the driver is working away from the driver's seat during automatic driving, and, in such a case, it takes time for the driver to return to the driver's seat.

In such a case, if a notification for switching to manual driving is made immediately before the time when manual driving becomes necessary, the driver may approach a manual driving zone before returning to the driver's seat. Therefore, in such a case where the driver is away from the driver's seat, it is necessary to issue a notification for switching to manual driving at an earlier stage.

Also, in a case where the operator (driver) 20 in the automobile 10 is away from the driver's seat, the driver 20 is unable to notice the display described above with reference to FIG. 2 on the notification unit (display unit) 15 of the driver's seat.

Figure 5:
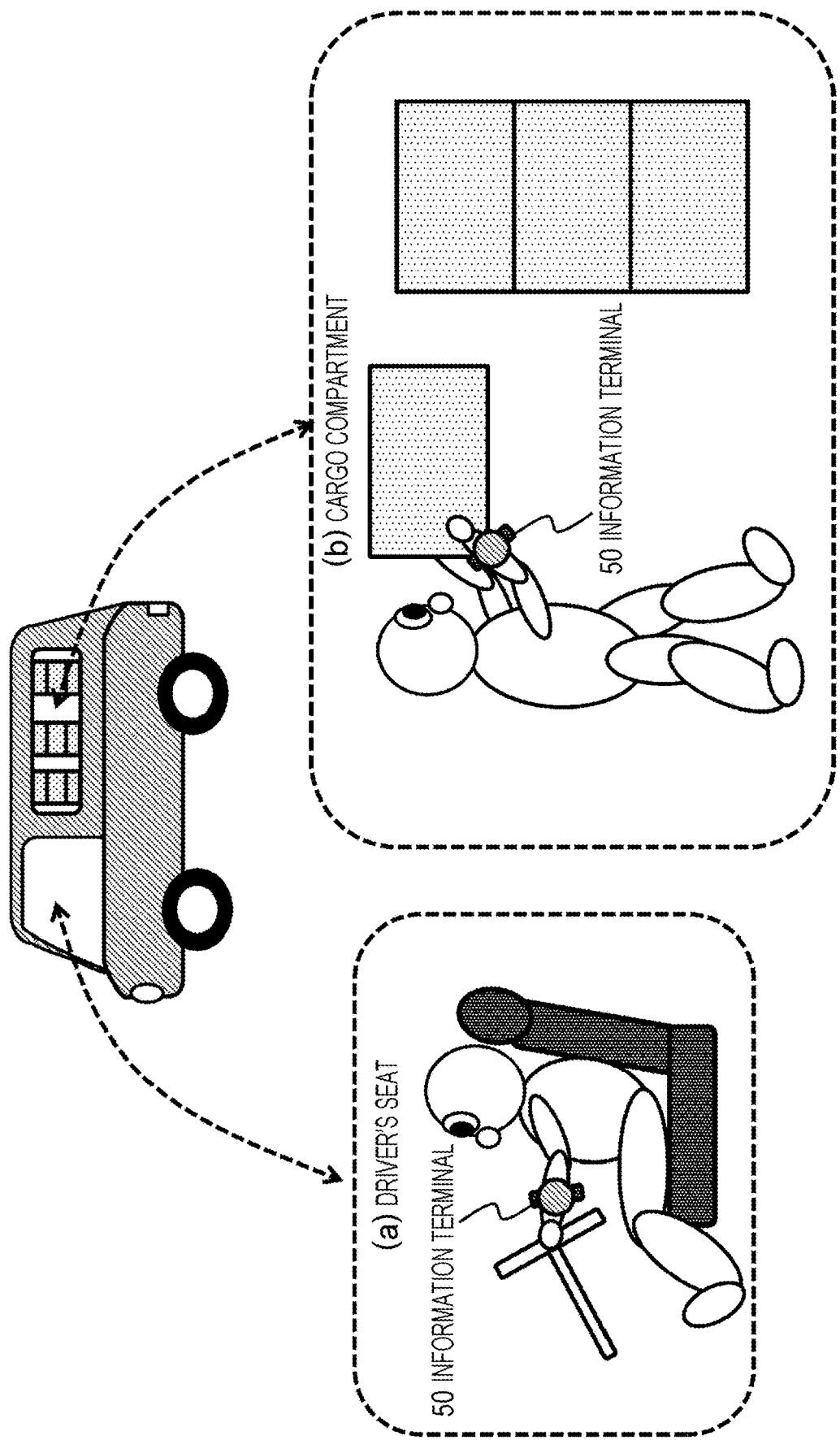
FIG. 5 is a diagram for explaining an example behavior of the driver in a moving apparatus of the present disclosure.

To solve this, a notification and information are provided via an information terminal 50 the operator (driver) 20 wears on his/her arm, such as an information terminal 50 shown in FIG. 5, for example. The information terminal 50 performs a process of displaying display data similar to that described above with reference to FIG. 2, and further displays approach information or the like about the road zone (an automatic driving zone, or a manual driving zone) in which the automobile 10 is traveling. Further, the information terminal 50 has alarm output, voice output, and vibration functions, and notifies the driver 20 of various notifications and warnings.

FIG. 5 is a diagram showing an example of use of the information terminal 50. In some cases, the operator (driver) 20 in the automobile 10 is in the driver's seat while the automobile 10 is performing automatic driving, as shown in FIG. 4(a). In the other cases, the driver 20 is away from the driver's seat, and is working in the cargo compartment during automatic driving, as shown in FIG. 4(b). However, the driver 20 always wears the information terminal 50 on his/her arm, and is able to notice display information displayed on the information terminal 50, and a voice, an alarm, vibration, and the like output from the information terminal 50.

Figure 6:
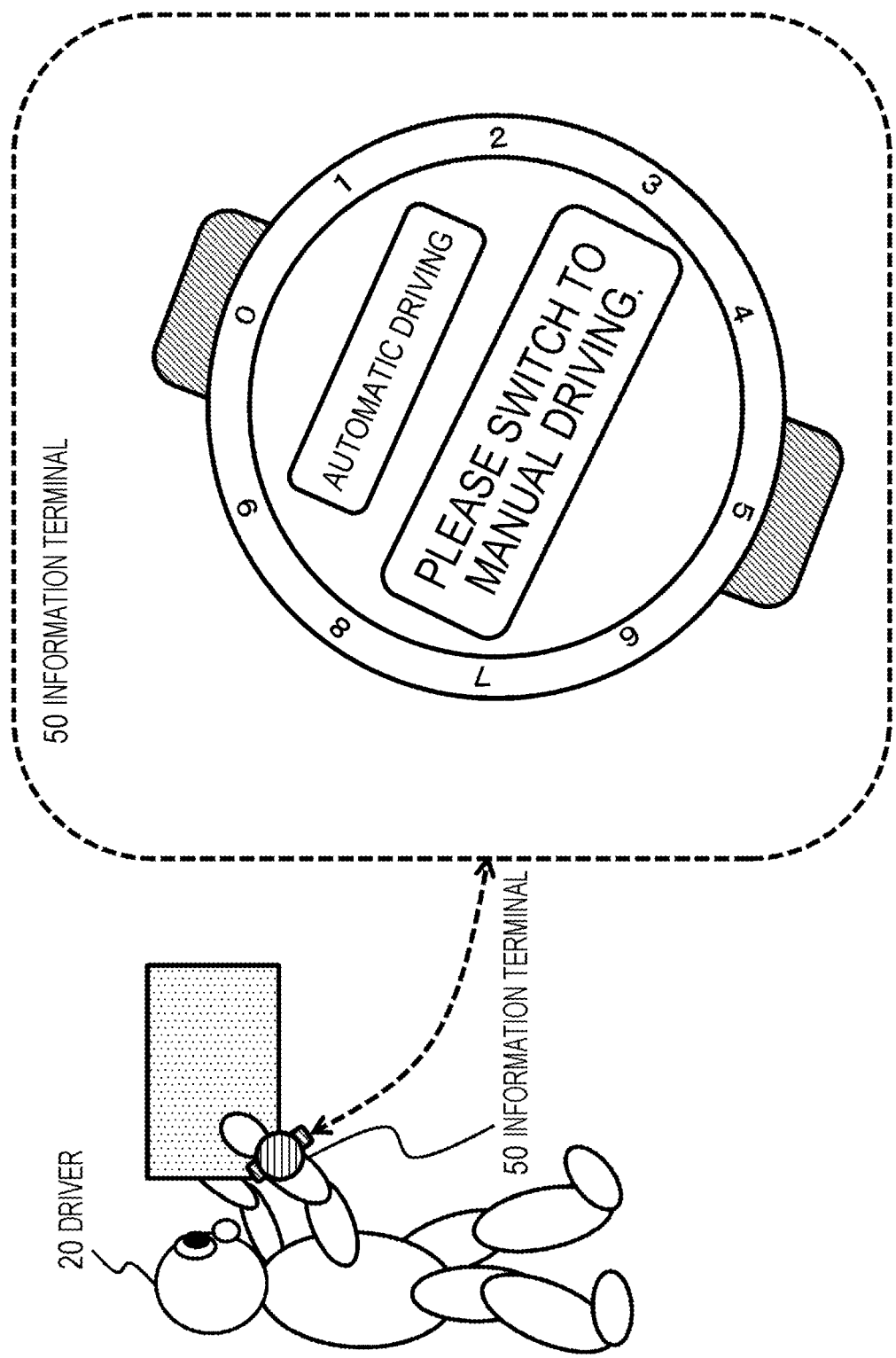
FIG. 6 is a diagram for explaining an example of data display on a terminal held by the driver.

FIG. 6 is a diagram showing an example of information displayed on the information terminal 50. The example shown in FIG. 6 shows an example display similar to the example display on the notification unit (display unit) 15 described above with reference to FIG. 2. Each of the following displays is made on the information terminal 50.

Figure 7:
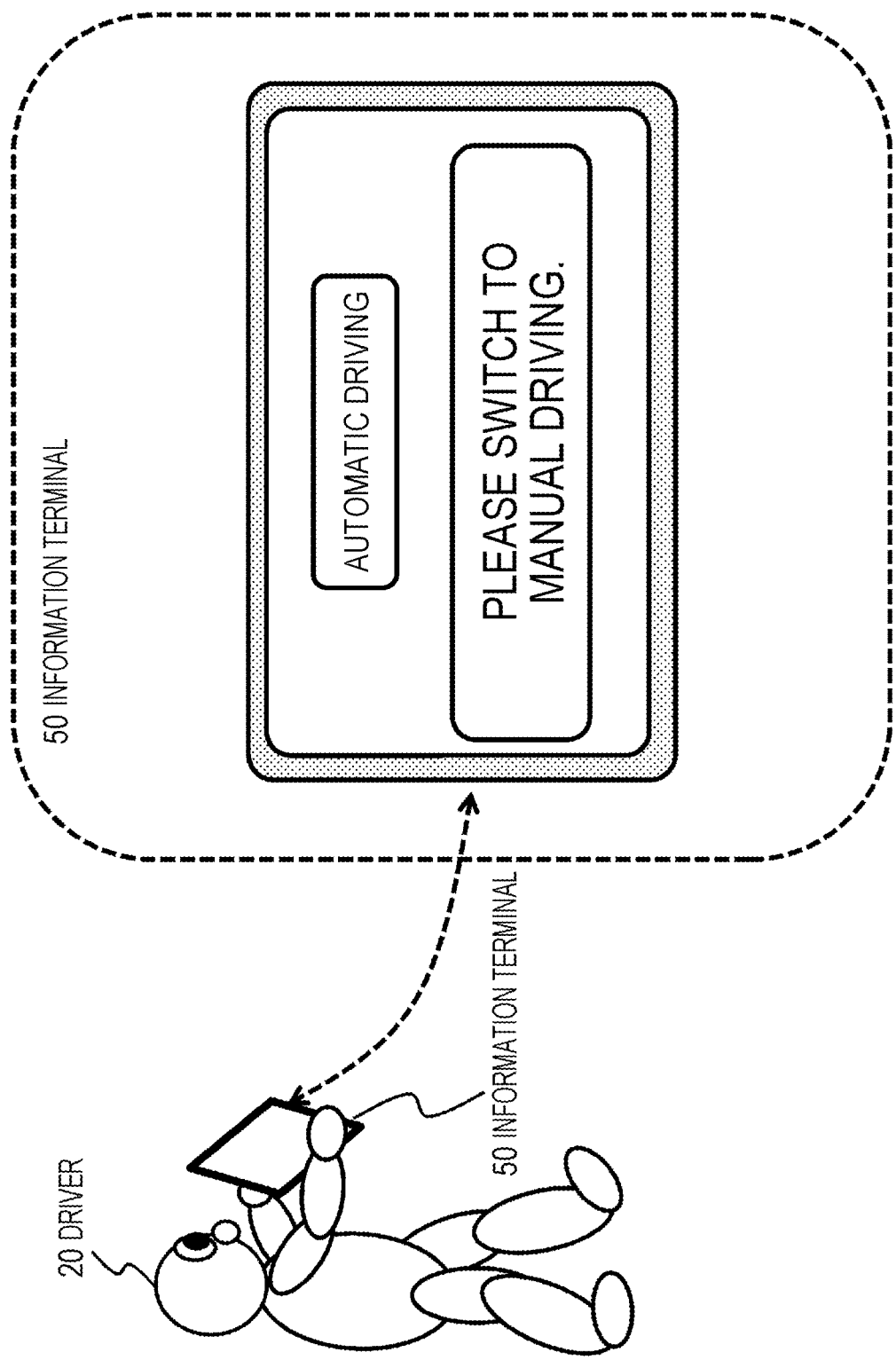
FIG. 7 is a diagram for explaining an example of data display on a terminal held by the driver.

Driving mode information="Automatic Driving",
Warning display="Please switch to manual driving."
The driver 20 can check this display wherever he/she is.
Further, a tablet-type information terminal 50 shown in FIG. 7 may be used to provide notifications and information.

[2. Specific Example Configuration of a Moving Apparatus and Example Processes]

Figure 8:
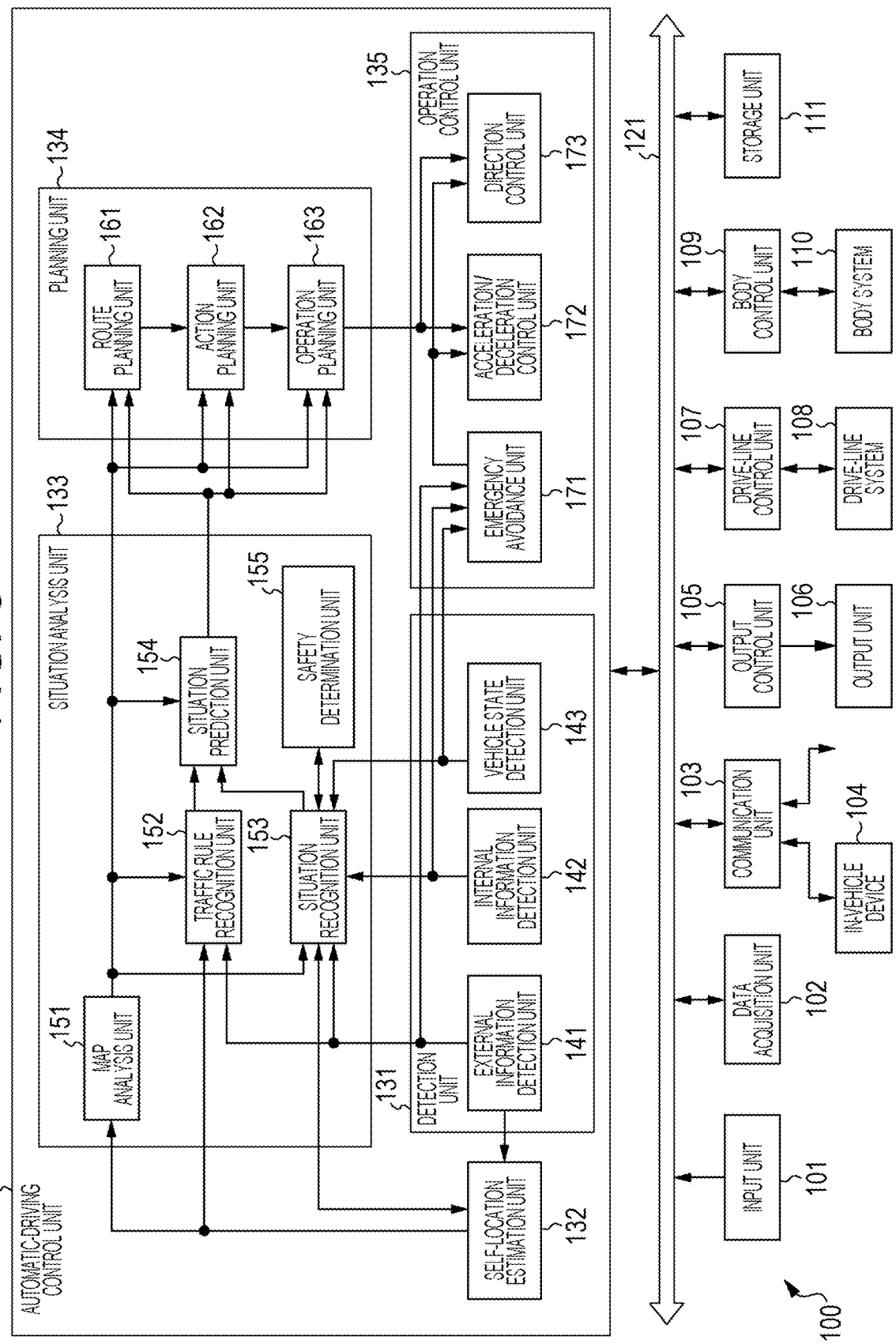
FIG. 8 is a diagram for explaining an example configuration of a moving apparatus of the present disclosure.

Next, a specific example configuration of the moving apparatus 10 of the present disclosure and example processes to be performed are described, with reference to FIG. 8 and the drawings that follow.

FIG. 8 shows an example configuration of a moving apparatus 100. Note that, in the description below, in a case where the vehicle in which the moving apparatus 100 is provided is distinguished from other vehicles, the vehicle will be referred to as the subject car or the subject vehicle.

The moving apparatus 100 includes an input unit 101, a data acquisition unit 102, a communication unit 103, an in-vehicle device 104, an output control unit 105, an output unit 106, a drive-line control unit 107, a drive-line system 108, a body control unit 109, a body system 110, a storage unit 111, and an automatic-driving control unit 112.

The input unit 101, the data acquisition unit 102, the communication unit 103, the output control unit 105, the drive-line control unit 107, the body control unit 109, the storage unit 111, and the automatic-driving control unit 112 are connected to one another via a communication network 121. The communication network 121 is formed with an in-vehicle communication network, a bus, and the like compliant with an appropriate standard, such as a controller area network (CAN), a local interconnect network (LIN), a local area network (LAN), or FlexRay (registered trademark), for example. Note that the respective components of the moving apparatus 100 may be connected directly to one another in some cases without the communication network 121.

Note that, in the description below, in a case where the respective components of the moving apparatus 100 perform communication via the communication network 121, any description of the communication network 121 will be omitted. For example, in a case where the input unit 101 and the automatic-driving control unit 112 perform communication via the communication network 121, the communication will be described simply as communication performed between the input unit 101 and the automatic-driving control unit 112.

The input unit 101 includes devices that are used by a passenger to input various kinds of data, instructions, and the like. For example, the input unit 101 includes operation devices such as a touch panel, buttons, a microphone, switches, and a lever, and operation devices through which inputs can be made by a method other than a manual operation, such as by voice, gestures, or the like. Further, the input unit 101 may be a remote control device using infrared rays or other radio waves, or an external connection device such as a mobile device or a wearable device compatible with operation of the moving apparatus 100, for example. The input unit 101 generates an input signal on the basis of data, an instruction, or the like that is input by a passenger, and supplies the input signal to the respective components of the moving apparatus 100.

The data acquisition unit 102 includes various kinds of sensors and the like that acquire data to be used in processing to be performed by the moving apparatus 100, and supplies the acquired data to the respective components of the moving apparatus 100.

For example, the data acquisition unit 102 includes various kinds of sensors for detecting the state and the like of the subject vehicle. Specifically, the data acquisition unit 102 includes a gyroscope sensor, an acceleration sensor, an inertia measurement unit (IMU), and a sensor or the like for detecting an amount of operation of an accelerator pedal, an amount of operation of a brake pedal, a steering angle of a steering wheel, an engine speed, a motor rotation speed, a rotation speed of the wheels, or the like, for example.

The data acquisition unit 102 also includes various kinds of sensors for detecting information about the outside of the subject vehicle, for example. Specifically, the data acquisition unit 102 includes imaging devices such as a time-of-flight (ToF) camera, a stereo camera, a monocular camera, an infrared camera, and other kinds of cameras, for example. The data acquisition unit 102 also includes an environment sensor for detecting weather, climate, or the like, and an ambient information detection sensor for detecting objects around the subject vehicle, for example. The environment sensor is formed with a raindrop sensor, a fog sensor, a sunshine sensor, a snow sensor, or the like, for example. The ambient information detection sensor is formed with an ultrasonic sensor, a radar, or a light detection and ranging or laser imaging detection and ranging (LIDAR) device, a sonar, or the like, for example.

Figure 9:
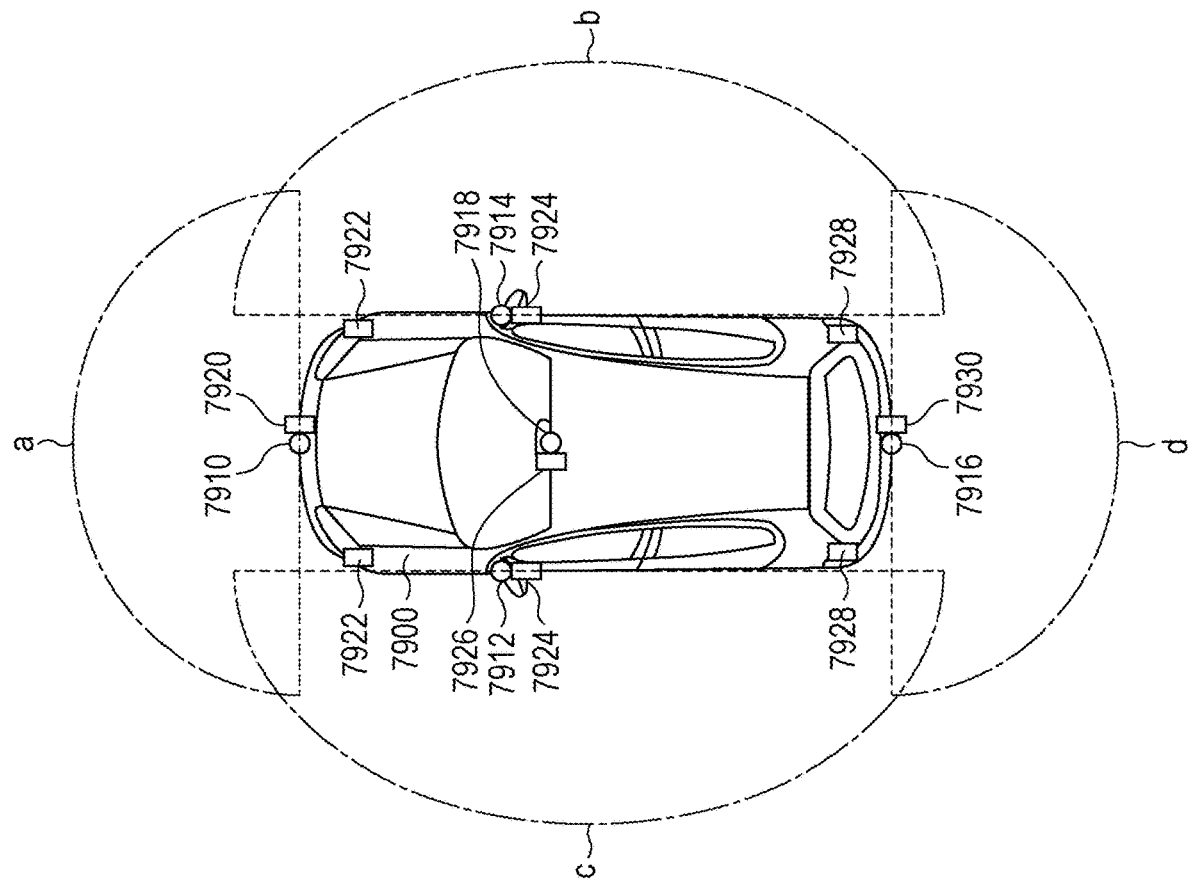
FIG. 9 is a diagram for explaining an example configuration of a moving apparatus of the present disclosure.

For example, FIG. 9 shows an example of installation of various sensors for detecting external information about the subject vehicle. Imaging devices 7910, 7912, 7914, 7916, and 7918 are provided at at least one of the following positions: the front end edge, a side mirror, the rear bumper, and a rear door of a vehicle 7900, and an upper portion of the front windshield inside the vehicle, for example.

The imaging device 7910 provided at the front end edge and the imaging device 7918 provided at the upper portion of the front windshield inside the vehicle mainly capture images ahead of the vehicle 7900. The imaging devices 7912 and 7914 provided on the side mirrors mainly capture images on the sides of the vehicle 7900. The imaging device 7916 provided on the rear bumper or a rear door mainly captures images behind the vehicle 7900. The imaging device 7918 provided at the upper portion of the front windshield inside the vehicle is mainly used for detection of a vehicle running in front of the vehicle, a pedestrian, an obstacle, a traffic signal, a traffic sign, a lane, or the like. Further, in automatic driving in the future, when a vehicle turns right or left, the use of these imaging devices may be extended to a pedestrian crossing a road on the right or left turn destination in a wide area, and further to a crossing approaching object range.

Note that FIG. 9 shows an example of the imaging range of each of the imaging devices 7910, 7912, 7914, and 7916. An imaging range a indicates the imaging range of the imaging device 7910 provided at the front end edge, imaging ranges b and c indicate the imaging ranges of the imaging devices 7912 and 7914 provided on the respective side mirrors, and an imaging range d indicates the imaging range of the imaging device 7916 provided on the rear bumper or a rear door. For example, pieces of image data captured by the imaging devices 7910, 7912, 7914, and 7916 are superimposed on one another, so that an overhead image of the vehicle 7900 viewed from above, an entire circumference stereoscopic display image surrounding the peripheral portion of the vehicle with a curved plane, or the like is obtained.

Sensors 7920, 7922, 7924, 7926, 7928, and 7930 provided on the front, the rear, the sides, and the corners of the vehicle 7900 and at an upper portion of the front windshield inside the vehicle may be ultrasonic sensors or radars, for example. The sensors 7920, 7926, and 7930 provided at the front end edge, the rear bumper, and the rear doors of the vehicle 7900, and at the upper portion of the front windshield inside the vehicle may be LiDARs, for example. These sensors 7920 to 7930 are mainly used for detecting a vehicle running in front of the vehicle 7900, a pedestrian, an obstacle, or the like. The results of the detection may be further used for improvement of three-dimensional object display such as the overhead display or the entire circumference stereoscopic display.

Referring back to FIG. 8, explanation of each component is continued. The data acquisition unit 102 includes various kinds of sensors for detecting the current location of the subject vehicle. Specifically, the data acquisition unit 102 includes a GNSS receiver that receives a GNSS signal from a global navigation satellite system (GNSS) satellite, or the like, for example.

The data acquisition unit 102 also includes various kinds of sensors for detecting information about the inside of the vehicle, for example. Specifically, the data acquisition unit 102 includes an imaging device that captures images of the driver, a biological sensor that detects biological information about the driver, a microphone that collects sound in the vehicle, and the like, for example. The biological sensor is disposed on a seating surface or the steering wheel or the like, for example, and detects biological information about the seating state of the passenger sitting in the seat or the driver holding the steering wheel. As for biological signals, it is possible to use a wide variety of observable data such as a heart rate, a pulse rate, a blood flow, breathing, psychosomatic correlation, visual stimulation, brain waves, a sweating state, head postures/behaviors, eyes, staring, blinking, saccade, microsaccade, fixation, drifting, gazing, and iris pupillary reactions. The observable biological activity information that reflects an observable driving state is collected as observable evaluation values estimated from observations, and is to be used by the later described safety determination unit 155 to calculate a return notification timing as characteristics specific to the return delay issue of the driver from the return delay time characteristics associated with the log of the evaluation values.

Figure 10:
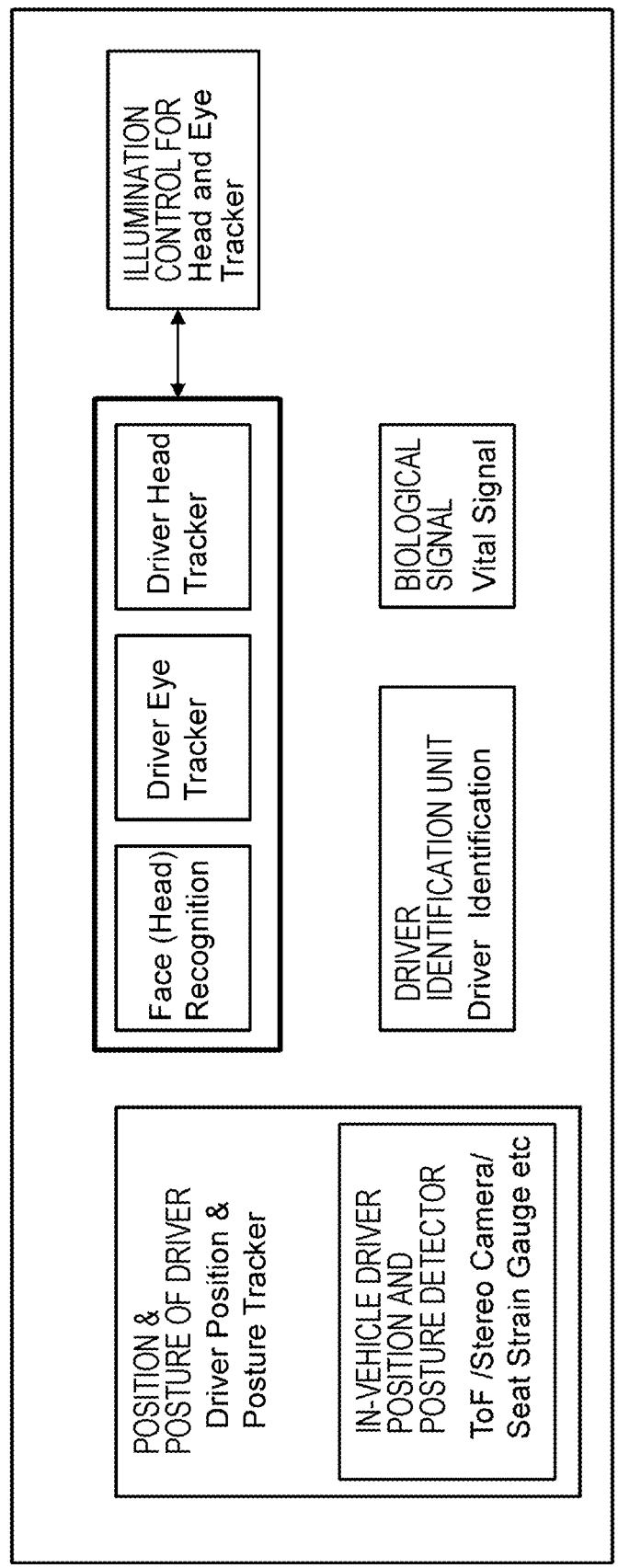
FIG. 10 is a diagram for explaining an example sensor configuration of a moving apparatus of the present disclosure.

FIG. 10 shows examples of various sensors included in the data acquisition unit 102 for obtaining information about the driver in the vehicle. For example, the data acquisition unit 102 includes a ToF camera, a stereo camera, a seat strain gauge, and the like as detectors for detecting the position and the posture of the driver. The data acquisition unit 102 also includes a face recognizer (Face (Head) Recognition), a driver's eye tracker (Driver Eye Tracker), a driver's head tracker (Driver Head Tracker), and the like as detectors for obtaining observable biological activity information about the driver.

The data acquisition unit 102 also includes a biological signal (Vital Signal) detector as a detector for obtaining observable biological activity information about the driver. The data acquisition unit 102 also includes a driver authentication unit (Driver Identification). Note that the authentication method here may be knowledge authentication using a password or a personal identification number, or may be biometric authentication using the face, a fingerprint, the iris, the voiceprint, or the like.

The communication unit 103 communicates with the in-vehicle device 104 and various devices outside the vehicle, such as servers and base stations. The communication unit 103 transmits data supplied from the respective components of the moving apparatus 100, and supplies received data to the respective components of the moving apparatus 100. Note that the communication protocol supported by the communication unit 103 is not limited to any particular one, and the communication unit 103 can also support a plurality of kinds of communication protocols.

For example, the communication unit 103 performs wireless communication with the in-vehicle device 104 through a wireless LAN, Bluetooth (registered trademark), near field communication (NFC), a wireless USB (WUSB), or the like. The communication unit 103 also performs wired communication with the in-vehicle device 104 through a universal serial bus (USB), a high-definition multimedia interface (HDMI), a mobile high-definition link (MHL), or the like via a connecting terminal (not shown) (and a cable, if necessary), for example.

The communication unit 103 further performs communication with a device (an application server or a control server, for example) existing in an external network (the Internet, a cloud network, or a company-specific network, for example) via a base station or an access point, for example. The communication unit 103 also performs communication with a terminal (a terminal of a pedestrian or a shop, or a machine type communication (MTC) terminal, for example) existing in the vicinity of the subject vehicle, using the peer-to-peer (P2P) technology, for example.

The communication unit 103 further conducts V2X communication, such as vehicle-to-vehicle communication, vehicle-to-infrastructure communication, communication between the subject vehicle and home (vehicle-to-home), and vehicle-to-pedestrian communication, for example. The communication unit 103 also includes a beacon reception unit, to receive radio waves or electromagnetic waves transmitted from a wireless station or the like installed on a road, and acquire information such as the current location, traffic congestion, closing of a road, or a required time, for example. Note that pairing with a vehicle that can be a leading vehicle and is traveling ahead in the zone may be performed through the communication unit, and information acquired by the data acquisition unit mounted in the leading vehicle may be acquired as pre-travel information and may be used as a supplement to the data acquired by the data acquisition unit 102 of the subject vehicle. The information is the means for securing a higher degree of safety for the following vehicles in a caravan being led by the leading vehicle, for example.

The in-vehicle device 104 includes a mobile device (a tablet, a smartphone, or the like) or a wearable device possessed by a passenger, an information device that is carried into or attached to the subject vehicle, a navigation device that searches for a route to a desired destination, and the like, for example. Note that, as automatic driving is widely used, passengers do not need to stay in fixed seat positions. In view of this, automatic driving may also be used, in the future, for devices that can be detached from another vehicle and be used, such as a video player or a game machine. This embodiment described herein is an example in which information about the location where intervention by the driver is required is presented only to the driver. However, the information may be provided to the following vehicles in a traveling caravan or the like. Further, information may be constantly reported to the operation management center for passenger transportation shared buses and long-distance logistics commercial vehicles, to use the information in combination with remote driving support as appropriate.

The output control unit 105 controls outputs of various kinds of information to a passenger of the subject vehicle or the outside of the vehicle. For example, the output control unit 105 generates an output signal including at least one piece of visual information (image data, for example) and audio information (audio data, for example), and supplies the output signal to the output unit 106, to control outputs of visual information and audio information from the output unit 106. Specifically, the output control unit 105 generates an overhead image, a panoramic image, or the like by combining image data captured by different imaging devices of the data acquisition unit 102, for example, and supplies an output signal including the generated image to the output unit 106. The output control unit 105 also generates audio data including a warning sound, a warning message, or the like for danger such as a collision, contact, or entry into a dangerous zone, for example, and supplies an output signal including the generated audio data to the output unit 106.

The output unit 106 includes devices capable of outputting visual information or audio information to a passenger of the subject vehicle or to the outside the vehicle. For example, the output unit 106 includes a display device, an instrument panel, an audio speaker, headphones, a wearable device such as a spectacle-like display to be worn by a passenger, a projector, a lamp, and the like. The display device included in the output unit 106 is not necessarily a device with a conventional display, but may be a display that displays visual information in the driver's field of view, such as a head-up display, a transmissive display, or a display having an augmented reality (AR) display function, for example.

The drive-line control unit 107 generates various kinds of control signals, and supplies the control signals to the drive-line system 108, to control the drive-line system 108. The drive-line control unit 107 also supplies control signals to the respective components other than the drive-line system 108 as necessary, and notifies the other components of a control state of the drive-line system 108 or the like.

The drive-line system 108 includes various kinds of devices related to the drive-line of the subject vehicle. For example, the drive-line system 108 includes a driving force generation device for generating a driving force such as an internal combustion engine or a driving motor, a driving force transmission mechanism for transmitting the driving force to the wheels, a steering mechanism for adjusting the steering angle, a braking device that generates a braking force, an antilock brake system (ABS), an electronic stability control (ESC), an electric power steering device, and the like.

The body control unit 109 generates various kinds of control signals, and supplies the control signals to the body system 110, to control the body system 110. The body control unit 109 also supplies control signals to the respective components other than the body system 110 as necessary, and notifies the other components of a control state of the body system 110 or the like.

The body system 110 includes various kinds of body devices that are mounted on the vehicle body. For example, the body system 110 includes a keyless entry system, a smart key system, a powered window device, powered seats, a steering wheel, an air conditioner, various lamps (headlamps, tail lamps, a brake lamp, a blinker, a fog lamp, and the like, for example), and the like.

The storage unit 111 includes a read only memory (ROM), a random access memory (RAM), a magnetic storage device such as a hard disc drive (HDD), a semiconductor storage device, an optical storage device, a magnetooptical storage device, and the like, for example. The storage unit 111 stores various kinds of programs, data, and the like to be used by the respective components of the moving apparatus 100. For example, the storage unit 111 stores map data such as a three-dimensional high-precision map such as a dynamic map, a global map that is less precise than a high-precision map but covers a wider area, and a local map that includes information about the surroundings of the subject vehicle.

The automatic-driving control unit 112 performs control related to automatic driving such as autonomous driving or drive assist. Specifically, the automatic-driving control unit 112 performs cooperative control to achieve the functions of an advanced driver assistance system (ADAS), including collision avoidance or shock mitigation of the subject vehicle, follow-up running based on the distance between vehicles, vehicle speed maintenance running, a collision warning for the subject vehicle, a lane deviation warning for the subject vehicle, or the like, for example. The automatic-driving control unit 112 also performs cooperative control to conduct automatic driving or the like to autonomously travels without depending on the operation by the driver, for example. The automatic-driving control unit 112 includes a detection unit 131, a self-location estimation unit 132, a situation analysis unit 133, a planning unit 134, and an operation control unit 135.

The detection unit 131 detects various kinds of information necessary for controlling automatic driving. The detection unit 131 includes an external information detection unit 141, an internal information detection unit 142, and a vehicle state detection unit 143.

The external information detection unit 141 performs a process of detecting information about the outside of the subject vehicle, on the basis of data or signals from the respective components of the moving apparatus 100. For example, the external information detection unit 141 performs a process of detecting, recognizing, and tracking an object around the subject vehicle, and a process of detecting the distance to the object and the relative velocity. Examples of objects to be detected include vehicles, people, obstacles, structures, roads, traffic lights, traffic signs, road signs, and the like.

The external information detection unit 141 also performs a process for detecting the environment around the subject vehicle, for example. The ambient environments to be detected include weather, temperature, humidity, brightness, road surface conditions, and the like, for example. The external information detection unit 141 supplies data indicating the results of the detection processes to the self-location estimation unit 132, a map analysis unit 151, a traffic rule recognition unit 152, and a situation recognition unit 153 of the situation analysis unit 133, an emergency avoidance unit 171 of the operation control unit 135, and the like.

Information to be acquired by the external information detection unit 141 can be information supplied mainly by the infrastructures, if the traveling zone is a zone for which a constantly updated local dynamic map (LDM) is supplied by the infrastructures as a zone in which automatic driving is possible. Alternatively, information update may be constantly received from a vehicle or a group of vehicles traveling ahead in the zone before the subject vehicle enters the zone. Also, in a case where the latest local dynamic map is not constantly updated by the infrastructures, for example, road environment information obtained from the zone entry leading vehicle may be further used in a complementary manner, to obtain the road information immediately before the subject vehicle enters a safer entry zone, particularly in a caravan. In many cases, whether automatic driving is possible in a zone depends on the presence/absence of advance information provided by the infrastructures. The updated fresh local dynamic map (LDM) that forms automatic driving allowance information in a route provided by the infrastructures is virtually equivalent to providing an invisible track in the form of "information". Note that the external information detection unit 141 is mounted in the subject vehicle in the drawing, for the sake of convenience. However, information that is regarded as the "information" by a foregoing vehicle may be used, to further increase the advance predictability during traveling.

The internal information detection unit 142 performs a process of detecting information about the inside of the vehicle, on the basis of data or signals from the respective components of the moving apparatus 100. For example, the internal information detection unit 142 performs a process of authenticating and recognizing the driver, a process of detecting the state of the driver, a process of detecting a passenger, a process of detecting the internal environment of the vehicle, and the like. The states of the driver to be detected includes physical conditions, a level of alertness, a level of concentration, a level of fatigue, a gaze direction, specific eye movement, and the like, for example.

Further, in the future, a driver during automatic driving will be completely separated from the driving/steering operation, and the driver starts napping or doing some other operation. Therefore, a system needs to recognize to which degree the consciousness required for the driver to return to driving has recovered. That is, a conventional driver monitoring system mainly detects a drop in the level of consciousness caused by drowsiness or the like. In the future, however, the driver does not intervene in driving and steering at all. Therefore, a system loses the means to measure the driver's degree of intervention in driving directly from the steering stability of the steering device or the like. Instead, such a system needs to observe transition of the consciousness of the driver to the level of consciousness required for driving from a state in which the accurate state of the consciousness of the driver is unknown. The system then recognizes the accurate state of the inner alertness of the driver, and needs to proceed with intervention transfer from automatic driving to manual driving in steering.

Therefore, the internal information detection unit 142 mainly has two major roles: the first role is passive monitoring of the driver's state during automatic driving, and the second role is to detect and determine the ability of the driver to notice, recognize, and determine the surroundings, and the ability of the driver to operate the steering device up to the levels at which manual driving can be performed, after a return request is issued from the system till the arrival in a zone of driving with alertness. As a control operation, self-examination for a failure may be further performed on the entire vehicle. In a case where functional deterioration occurs during automatic driving due to a failure in a function of the automatic driving, the driver may also be prompted to return to manual driving at an early stage. Here, passive monitoring refers to a kind of detection means that does not require a conscious response reaction from the driver, and does not exclude objects that detect a response signal by transmitting physical radio waves, light, or the like from a device. That is, passive monitoring refers to monitoring of the state of an unconscious driver, such as a driver who is napping, and a reaction that is not a cognitive response reaction from the driver is classified as a passive-type reaction. This does not exclude active response devices that analyze and evaluate reflected or diffused signals of emitted radio waves, infrared rays, or the like. On the other hand, one that requires a conscious response requiring a response reaction from the driver is regarded as active.

The internal environments to be detected include temperature, humidity, brightness, odor, and the like, for example. The internal information detection unit 142 supplies data indicating the results of the detection processes to the situation recognition unit 153 of the situation analysis unit 133, and the operation control unit 135. Note that, in a case where it is found that the driver cannot start manual driving within an appropriate time limit after the system issued a driving return instruction to the driver, and it is determined that the transition cannot be performed soon enough even if deceleration control is performed to allow more time during extended automatic driving, an instruction is issued to the emergency avoidance unit 171 and the like of the system, and deceleration, evacuation, and stop procedures are started for evacuation of the vehicle. That is, even in a situation where the initial state is in the same delayed state, it is possible to earn the time to reach the transition limit by decelerating the vehicle at an early stage. By earning the time to reach the transition limit, the system is allowed to have time to handle events, and becomes capable of taking measures to ensure safety. However, as will be described later, the application of unreasonable deceleration and slowdown is limited, because it will increase congestion-inducing factors and a risk of a rear-end collision.

The vehicle state detection unit 143 performs a process of detecting the state of the subject vehicle, on the basis of data or signals from the respective components of the moving apparatus 100. The states of the subject vehicle to be detected include a velocity, an acceleration, a steering angle, presence/absence and details of an abnormality, a driving operation state, powered seat positions and tilts, a door lock state, states of the other in-vehicle devices, and the like, for example. The vehicle state detection unit 143 supplies data indicating the results of the detection processes to the situation recognition unit 153 of the situation analysis unit 133, the emergency avoidance unit 171 of the operation control unit 135, and the like.

The self-location estimation unit 132 performs a process of estimating the position, the posture, and the like of the subject vehicle, on the basis of data or signals from the respective components of the moving apparatus 100, such as the external information detection unit 141 and the situation recognition unit 153 of the situation analysis unit 133. The self-location estimation unit 132 also generates a local map (hereinafter referred to as the self-location estimation map) to be used for self-location estimation, as necessary.

The self-location estimation map is a highly accurate map using a technique such as simultaneous localization and mapping (SLAM), for example. The self-location estimation unit 132 supplies data indicating the result of the estimation process to the map analysis unit 151, the traffic rule recognition unit 152, the situation recognition unit 153, and the like of the situation analysis unit 133. The self-location estimation unit 132 also stores the self-location estimation map into the storage unit 111.

The situation analysis unit 133 performs an analysis process on the situation of the subject vehicle and the surroundings. The situation analysis unit 133 includes the map analysis unit 151, the traffic rule recognition unit 152, the situation recognition unit 153, a situation prediction unit 154, and a safety determination unit 155.

The map analysis unit 151 performs a process of analyzing various kinds of maps stored in the storage unit 111 while using data or signals from the respective components of the moving apparatus 100, such as the self-location estimation unit 132 and the external information detection unit 141, as necessary, and constructs a map that includes the information necessary for an automatic driving process. The map analysis unit 151 supplies the constructed map to the traffic rule recognition unit 152, the situation recognition unit 153, the situation prediction unit 154, and a route planning unit 161, an action planning unit 162, an operation planning unit 163, and the like of the planning unit 134.

The traffic rule recognition unit 152 performs a process of recognizing the traffic rules in the surroundings of the subject vehicle, on the basis of data or signals from the respective components of the moving apparatus 100, such as the self-location estimation unit 132, the external information detection unit 141, and the map analysis unit 151. Through this recognition process, the positions and the states of signals around the subject vehicle, the contents of traffic restrictions around the subject vehicle, the lanes that allow running, and the like are recognized, for example. The traffic rule recognition unit 152 supplies data indicating the results of the recognition process to the situation prediction unit 154 and the like.

The situation recognition unit 153 performs a process of recognizing a situation relating to the subject vehicle, on the basis of data or signals from the respective components of the moving apparatus 100, such as the self-location estimation unit 132, the external information detection unit 141, the internal information detection unit 142, the vehicle state detection unit 143, and the map analysis unit 151. For example, the situation recognition unit 153 performs a process of recognizing the situation of the subject vehicle, the situation of the surroundings of the subject vehicle, the situation of the driver of the subject vehicle, and the like. The situation recognition unit 153 also generates a local map (hereinafter referred to as the situation recognition map) to be used for recognition of the situation around the subject vehicle, as necessary. The situation recognition map is an occupancy grid map, for example.

Situations of the subject vehicle to be recognized include the position, the posture, the movement (such as velocity, acceleration, and the moving direction, for example) of the subject vehicle, gravity center movement of the vehicle body accompanying the cargo capacity and cargo loading that determine the motion characteristics of the subject vehicle, wheel pressure, braking distance movement due to a situation of brake pad wear, the maximum allowable deceleration braking to prevent cargo movement caused by load braking, the centrifugal relaxation limit velocity accompanying liquid products in the cargo during traveling in a curved road, for example. The return start timing required in control varies with these characteristics specific to the vehicle, and the characteristics of the vehicle and the products in the cargo, even in exactly the same road environments. Therefore, these various conditions need to be collected and learned, so that the optimum timing for control will reflect those conditions. In determining the control timing depending on the type of vehicle and the load, it is not enough to simply observe and monitor the presence/absence of an abnormality in the subject vehicle, its content, and the like. In the transportation industry and the like, the parameter that determines the addition of a desired allowance time for recovery may be set beforehand as a fixed value to ensure a certain level of safety depending on the characteristics specific to the load, and not all the notification timing determination conditions need to be uniformly set by self-accumulation learning.

Situations of the surroundings of the subject vehicle to be recognized include the types and the positions of stationary objects in the surroundings, the types, the positions, and the movement (such as speeds, accelerations, and moving directions, for example) of moving objects in the surroundings, the configuration of the roads and the states of the road surfaces in the surroundings, the weather, the temperature, the humidity, and brightness of the surroundings, and the like, for example. States of the driver to be recognized includes physical conditions, an arousal level, a concentration level, a fatigue level, line-of-sight movement, a driving operation, and the like, for example. To drive a vehicle safely, the control start point at which handling is required greatly varies depending on the load capacity and the chassis fixed state of the mounting unit in a state specific to the vehicle, a gravity center deviated state, the maximum value of possible deceleration, the maximum loadable centrifugal force, the return response delay amount depending on the state of the driver, and the like.

The situation recognition unit 153 supplies data (including the situation recognition map, as necessary) indicating the results of the recognition process to the self-location estimation unit 132, the situation prediction unit 154, and the like. The situation recognition unit 153 also stores the situation recognition map into the storage unit 111.

The situation prediction unit 154 performs a process of predicting a situation related to the subject vehicle, on the basis of data or signals from the respective components of the moving apparatus 100, such as the map analysis unit 151, the traffic rule recognition unit 152, and the situation recognition unit 153. For example, the situation prediction unit 154 performs a process of predicting a situation of the subject vehicle, a situation of the surroundings of the subject vehicle, a situation of the driver, and the like.

Situations of the subject vehicle to be predicted include a behavior of the subject vehicle, an occurrence of an abnormality, a distance that can be covered, and the like, for example. Situations of the surroundings of the subject vehicle to be predicted include behaviors of moving objects in the surroundings of the subject vehicle, changes in signal states, changes in the environments such as weather, and the like, for example. Situations of the driver to be predicted include, for example, behaviors, physical conditions, and the like of the driver.

The situation prediction unit 154 supplies data indicating the results of the prediction process, together with the data from the traffic rule recognition unit 152 and the situation recognition unit 153, to the route planning unit 161, the action planning unit 162, the operation planning unit 163, and the like of the planning unit 134.

The safety determination unit 155 learns the optimum return timing depending on the driver's return behavior pattern, the vehicle characteristics, and the like, and supplies the learned information to the situation recognition unit 153 and the like. As a result, it becomes possible to present to the driver the statistically determined optimum timing required for the driver to appropriately return from automatic driving to manual driving at a predetermined ratio or higher, for example.

The route planning unit 161 plans a route to a destination, on the basis of data or signals from the respective components of the moving apparatus 100, such as the map analysis unit 151 and the situation prediction unit 154. For example, the route planning unit 161 sets a route from the current location to a designated destination, on the basis of the global map. The route planning unit 161 also changes routes as appropriate, on the basis of situations such as a traffic jam, an accident, a traffic restriction, and a construction, the physical conditions of the driver, and the like, for example. The route planning unit 161 supplies data indicating the planned route to the action planning unit 162 and the like.

On the basis of data or signals from the respective components of the moving apparatus 100, such as the map analysis unit 151 and the situation prediction unit 154, the action planning unit 162 plans an action of the subject vehicle to safely travel the route planned by the route planning unit 161 within a planned period of time. For example, the action planning unit 162 plans a start, a stop, a traveling direction (such as a forward direction, a backward direction, a left turn, a right turn, or a change of direction, for example), the current running lane, a running velocity, passing, or the like. The action planning unit 162 supplies data indicating the planned action of the subject vehicle to the operation planning unit 163 and the like.

On the basis of data or signals from the respective components of the moving apparatus 100, such as the map analysis unit 151 and the situation prediction unit 154, the operation planning unit 163 plans an operation of the subject vehicle to realize the action planned by the action planning unit 162. For example, the operation planning unit 163 plans acceleration, deceleration, a traveling track, and the like. The operation planning unit 163 supplies data indicating the planned operation of the subject vehicle to an acceleration/deceleration control unit 172, a direction control unit 173, and the like of the operation control unit 135.

The operation control unit 135 controls operation of the subject vehicle. The operation control unit 135 includes the emergency avoidance unit 171, the acceleration/deceleration control unit 172, and the direction control unit 173.

The emergency avoidance unit 171 performs a process of detecting an emergency situation such as a collision, contact, entry into a danger zone, an abnormality of the driver, an abnormality of the vehicle, or the like, on the basis of results of detection performed by the external information detection unit 141, the internal information detection unit 142, and the vehicle state detection unit 143. In a case where an occurrence of an emergency situation is detected, the emergency avoidance unit 171 plans an operation of the subject vehicle to avoid an emergency situation such as a sudden stop or a sudden turn. The emergency avoidance unit 171 supplies data indicating the planned operation of the subject vehicle to the acceleration/deceleration control unit 172, the direction control unit 173, and the like.

The acceleration/deceleration control unit 172 performs acceleration/deceleration control for realizing an operation of the subject vehicle planned by the operation planning unit 163 or the emergency avoidance unit 171. For example, the acceleration/deceleration control unit 172 calculates a control target value for a driving force generation device or a braking device to perform planned acceleration, deceleration, or a sudden stop, and supplies a control command indicating the calculated control target value to the drive-line control unit 107. Note that there are two typical cases where an emergency might occur. That is, in one case, an unexpected accident occurs during automatic driving on a road that was originally considered safe according to the local dynamic map or the like acquired from the infrastructures on the traveling route during automatic driving, and the driver's emergency return is not made in time. In the other case, it is difficult for the driver to accurately return from automatic driving to manual driving.

The direction control unit 173 performs direction control for realizing an operation of the subject vehicle planned by the operation planning unit 163 or the emergency avoidance unit 171. For example, the direction control unit 173 calculates a control target value for the steering mechanism to travel a traveling track or perform a sudden turn planned by the operation planning unit 163 or the emergency avoidance unit 171, and supplies a control command indicating the calculated control target value to the drive-line control unit 107.

[3. Sequence of Mode Switching from the Automatic Driving Mode to the Manual Driving Mode]

Next, a sequence of transition from the automatic driving mode to the manual driving mode is described.

Figure 11:
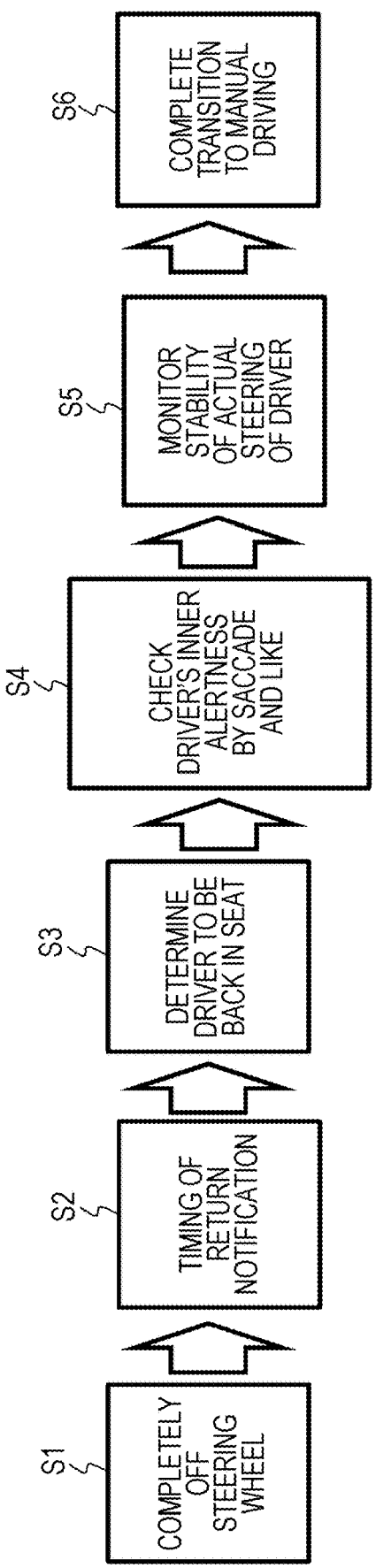
FIG. 11 is a diagram showing an example sequence of mode switching from an automatic driving mode to a manual driving mode, the mode switching being performed by a moving apparatus of the present disclosure.

FIG. 11 schematically shows an example sequence of mode switching from the automatic driving mode to the manual driving mode at the automatic-driving control unit 112.

In step S1, the driver is in a state of being completely away from the driving/steering. In this state, the driver can perform a secondary task such as taking a nap, watching a video, concentrating on a game, and working with a visual tool such as a tablet or a smartphone, for example. The work using a visual tool such as a tablet or a smartphone may be performed while the driver's seat is displaced or the driver is in a seat that is not the driver's seat, for example.

Depending on such states of the driver, when the vehicle approaches a zone in which returning to manual driving is required in the route, the time before the driver returns to manual driving probably greatly varies with the contents of the work at that time. Therefore, the time before the return might be too short due to a notification made immediately before the event. In a case where the notification is made for allowing enough time to cope with the event but the timing of the notification is too early, the time before the returning is actually necessary might be too long. As a result, after a situation where a notification is not issued at appropriate timing repeatedly occurs, the driver stops believing the notification timing from the system, and the driver's alertness to notifications drops. As a result, the risk of failed transition becomes higher, and at the same time, comfortable execution of a secondary task will be hindered. Therefore, the system needs to optimize the notification timing, to cause the driver to start returning to driving appropriately in response to a notification.

Step S2 is the timing of a manual driving return request notification as described above with reference to FIG. 2. The driver is notified of returning to driving by dynamic haptics such as vibration, or in a visual or auditory manner. At the automatic-driving control unit 112, the steady state of the driver is monitored, the timing of issuing a notification is noticed, and a notification is issued at an appropriate timing, for example. That is, the driver's secondary task execution state is constantly monitored passively during the preceding passive monitoring period, and the system can calculate the optimum timing for a notification. The passive monitoring during step S1 is constantly continued. The return timing and the return notification are preferably set in accordance with the return characteristics specific to the driver.

That is, the optimum return timing depending on the driver's return behavior pattern, the vehicle characteristics, or the like is learned, and the statistically calculated optimum timing necessary for the driver to return from automatic driving to manual driving at a predetermined certain rate or higher is preferably presented to the driver. In this case, if the driver does not respond to the notification within a certain period of time, a warning is issued by ringing an alarm or the like.

In step S3, a check is made to determine whether the driver has returned to the seat. In step S4, the level of inner alertness of the driver is checked through analysis of the face and movement of the eyes such as saccade. In step S5, the stability of the condition of the actual steering by the driver is monitored. In step S6, the transition from automatic driving to manual driving is then completed.

[4. Example of Automatic Driving Operation Sequence]

Figure 12:
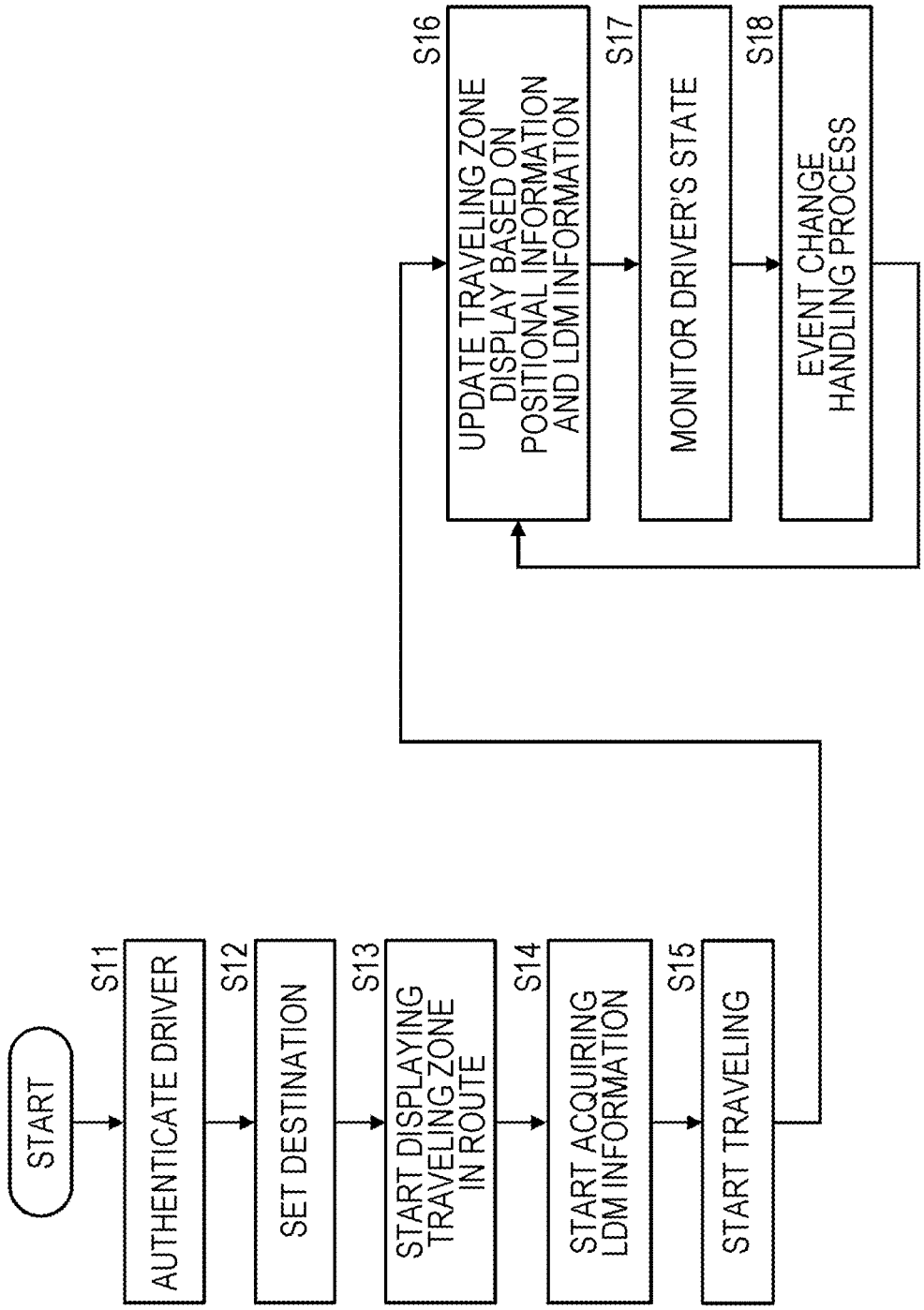
FIG. 12 is a diagram showing a flowchart for explaining an example of an automatic driving operation sequence.

Next, an example of an automatic driving operation sequence is described, with reference to the flowchart shown in FIG. 12.

The flowchart shown in FIG. 12 is a flowchart for explaining an automatic driving operation sequence to be executed by the moving apparatus 100.

First, in step S11, driver authentication is performed. This driver authentication is performed through knowledge authentication using a password, a personal identification number, or the like, biometric authentication using the face, a fingerprint, the iris, the voiceprint, or the like, or a combination of knowledge authentication and biometric authentication. As driver authentication is performed in such a manner, it is possible to accumulate information for determining a notification timing associated with each driver, even in a case where a plurality of drivers drives the same vehicle.

Next, in step S12, the driver operates the input unit 101, to set a destination. In this case, the driver's input operation is performed on the basis of the display on the instrument panel.

Note that this embodiment relates to an example case where a user gets in a vehicle and then sets a travel itinerary. However, a user may set a remote advance reservation from a smartphone before getting in the vehicle or from a personal computer before leaving home, for example. Further, the system of the vehicle may set preplanning in accordance with a schedule created by the driver following a schedule table, and update and acquire so-called local dynamic map (LDM) information and the like by constantly updating, with high density, LDM information about the road environment, or travel map information about the road on which the vehicle is traveling. By doing so, the system may further display actual traveling advice like a concierge when or before the user rides in the vehicle, for example.

Next, in step S13, display of the traveling zone in the traveling route is started. This traveling zone is displayed on the instrument panel, or is displayed next to the work window on a tablet or the like with which the driver performs a secondary task, for example. As a result, the driver working through the work window can easily recognize a driver intervention required zone and an automatic driving allowed zone in the traveling route on the axis of arrival time predicted from the current location.

This traveling zone display presents the forward schedule and information about approach to each location. In this traveling zone display, the driver intervention required zone and the automatic driving allowed zone of the traveling route are displayed with the axis of the arrival time predicted from the current location. The driver intervention required zone then includes a manual driving zone, a zone of transition from automatic driving to manual driving, and a cautionary traveling zone from automatic driving. This traveling zone display will be described later in detail.

Next, in step S14, acquisition of LDM update information is started. As this LDM update information is acquired, the contents of the traveling zone display can be changed to the latest state. Next, in step S15, traveling is started. Next, in step S16, the display of the traveling zone display is updated, on the basis of the positional information about the subject vehicle and the acquired LDM update information. As a result, the traveling zone display is scrolled so that each zone approaches the subject vehicle as the vehicle keeps traveling.

The means to present information such as the forward traveling environment that approaches as the vehicle keeps traveling, the timing necessary for transition of the subject vehicle, and the like is not necessarily a scrolling means, and another preferred method involves a means with which the driver can know the imminent time interval in an intuitive and explicit manner, and when to start returning to driving with less false recognition. For example, it is possible to use a time presentation method imitating an hourglass, or a means to present the remaining transition time directly to the device the user is wearing in the form of a chronograph wristwatch.

Next, in step S17, the driver's state is monitored. Next, in step S18, an event change handling process is performed. This event change handling process includes a mode switching process for coping with a case where a point of switching between the automatic driving mode and the manual driving mode or a cautioned traveling zone already existing in the traveling route is approaching, an event generation process for coping with a case where a mode switching point or a driver intervention required zone of a cautionary traveling zone newly appears in the traveling route, and the like. After that, the processes in steps S16 to S18 are repeated as appropriate.

[Details of Traveling Zone Display]

Figure 13:
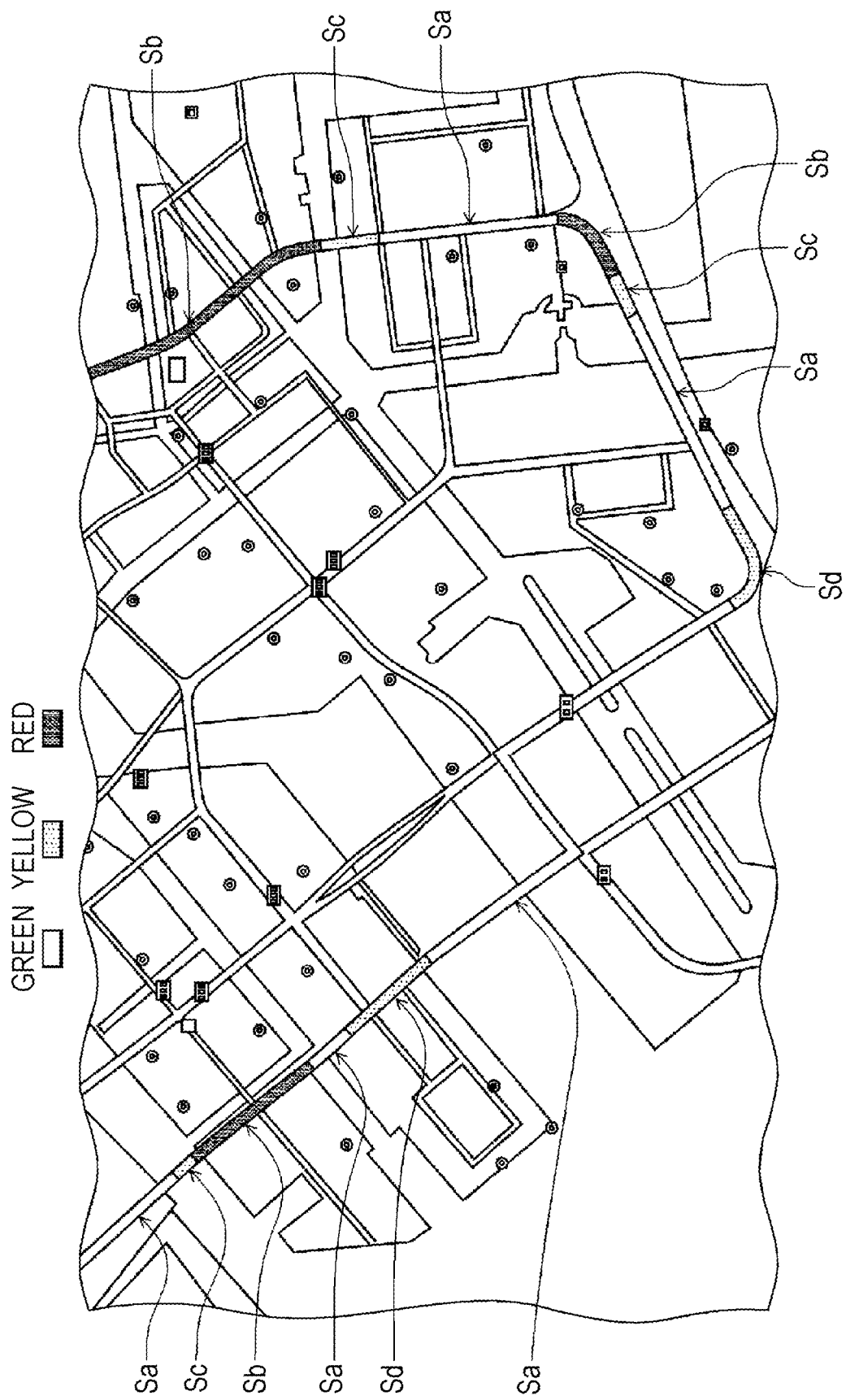
FIG. 13 is a diagram showing an example traveling route in which automatic driving allowed/prohibited zones determined by the driver setting a destination are set in a scattered manner or are generated.

FIG. 13 shows an example traveling route determined by the driver setting a destination. In this traveling route, there exist automatic driving allowed zones Sa, manual driving zones Sb, transfer zones Sc from automatic driving to manual driving, and cautionary traveling zones Sd from automatic driving. Here, a transition zone Sc must exist immediately before a manual driving zone Sb, and the driver needs to be in a position to return to manual driving. Further, a cautionary traveling zone Sd is a zone in which the vehicle can be decelerated while traveling in the automatic driving mode under careful monitoring by the driver who is in a position to return to manual driving.

In the example shown in the drawing, the automatic driving allowed zones Sa are indicated by green, the manual driving zones Sb are indicated by red, and the transition zones Sc and the cautionary traveling zones Sd are indicated by yellow. Note that, For the sake of convenience, each color is represented by a different pattern.

In a traveling zone display on a display device such as a center information display or a tablet, each zone in a traveling route like the one described above is displayed with the axis of arrival time predicted from the current location. The automatic-driving control unit 112 performs information processing for displaying the traveling zones in the traveling route on the basis of traveling route information and traffic information.

Figure 14:
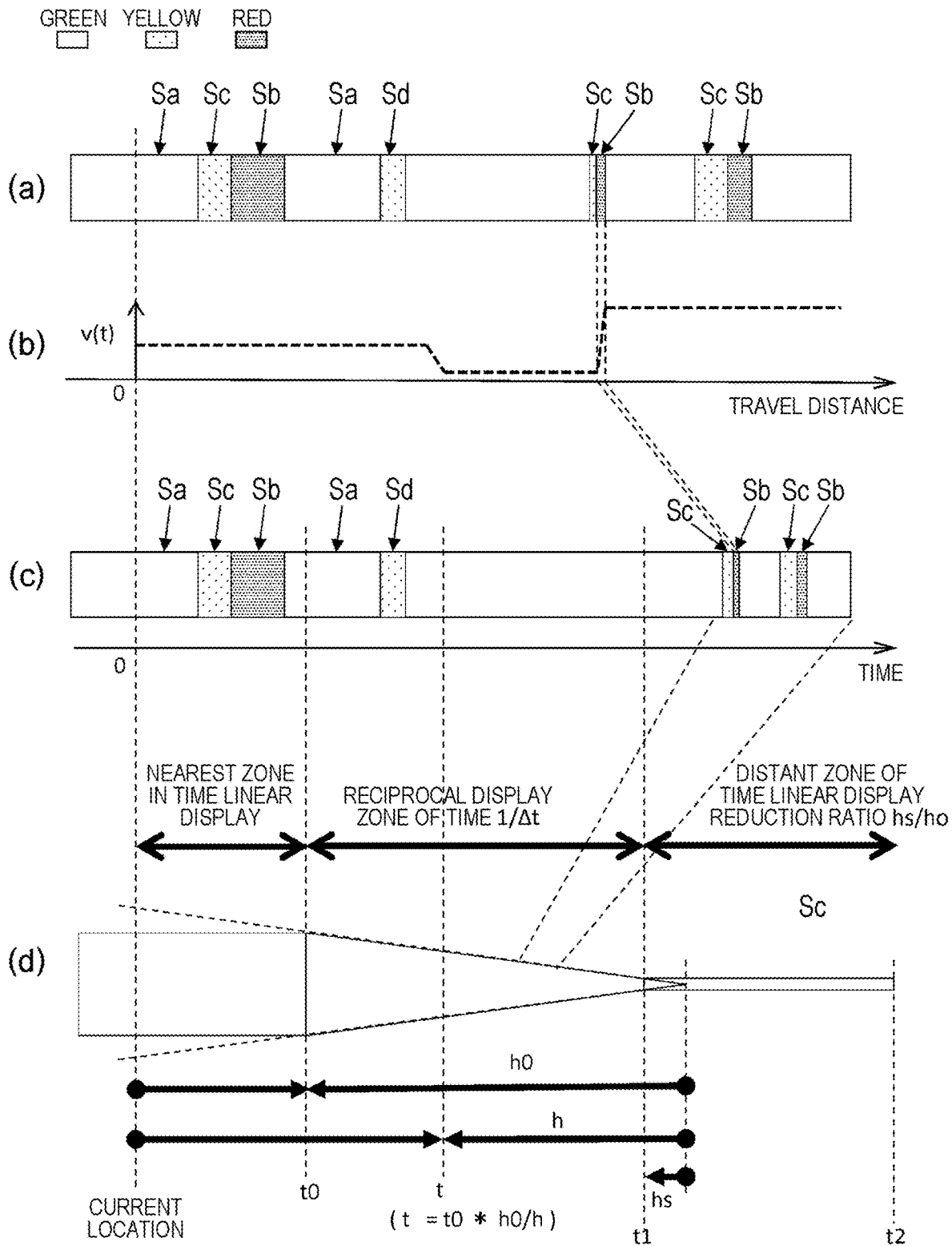
FIG. 14 is a diagram for explaining information processing for displaying traveling zones in a traveling route.

FIG. 14(*a*) shows the respective zones of the traveling route on a constant scale on the axis of travel distance from the current location. FIG. 14(*b*) shows the average road traffic flow velocity v(t) at each point. FIG. 14(*c*) shows each zone represented by the axis of travel distance converted into a time axis with the velocity v(t). As a result, each zone of the traveling route is represented by the axis of arrival time predicted from the current location. That is, each zone can be represented by the time axis obtained by dividing the physical distance of the traveling route by the average velocity in each corresponding zone.

In this embodiment, all the zones in the traveling zone display are divided into three zones as shown in FIG. 14(*d*), and the time axis of each zone is changed. Specifically, a first zone from the current location to a first point (time t0, after about 10 minutes, for example) is displayed with a first time axis as the nearest zone in the time linear display. For example, time t0 is set at a time necessary and sufficient for a general driver to finish a secondary task and return to driving. Since the nearest zone that is approaching during traveling has a visually intuitive effect equal to that shown on a map on which a vehicle travels at a constant velocity, the driver can start preparing for an accurate return to driving in conjunction with the approaching event, and intuitively recognize the point to start the return with a certain degree of accuracy, which is advantageous. That is, the purpose of this zone display is to provide the user with information for the driver to determine the accurate point to start returning.

Meanwhile, a second zone from the first point (time t0) to a second point (time t1, after about one hour, for example) is displayed as a reciprocal display zone of time with a time axis that gradually changes from the first time axis to a second time axis that is reduced at a predetermined ratio to the first time axis. The purpose of this second zone display is mainly to accurately provide the driver with a longer-term road condition in a narrow display, because long-term display in a narrow display space will be difficult if the second zone is displayed at a scale magnification equal to that for the foregoing first zone. With this arrangement, the driver can easily recognize how far driving intervention is not required in a certain zone ahead during traveling, and advantageously plan to engage in a secondary task. This plays a role of maintaining a good balance with driving intervention, and presenting important information in a plan or the like of releasing the driver from a secondary task or the like that accompanies an interaction with a third person, or the like.

Here, FIG. 14(*d*) illustrates a method for setting this second display zone. Where the height of a triangle is represented by h0, the time t at a point before its tip by h is calculated according to the following equation (1).

$$t = t0 * h0/h \qquad (1)$$

Further, the second time axis at the second point (time t1) is reduced by a ratio of hs/h0 with respect to the first time axis. For example, in a case where hs=h0/8, the reduction ratio is 1/8.

The display of the second display zone described above corresponds to a display in which a travel straight line extension display zone on a map is tilted obliquely in the traveling direction, or to a state in which the forward road plane is tilted, in a case where the vehicle is traveling at a constant velocity. In other words, the visual effect of this display zone is to enable one to intuitively recognize distances at the height of a display image, and accordingly, it can be said that a sensory distance can be easily recognized without display of an accurate position display scale or the like on the screen. Further, although distant zones are reduced, they are not points that will be reached immediately by traveling. Therefore, a rough prediction is important, but it is not necessary for the driver to intuitively recognize arrival time information as strict as that for the vicinity points. In view of this, the above display is also preferable in planning execution of a secondary task.

Further, a third zone from the second point (time t1) to a third point (time t2) is displayed as a time linear display distant zone with the second time axis (the reduction ratio: hs/h0). As the display is divided into three zones in this manner, the driver can know, with a limited display space, the details of information about the zone that is the nearest timewise, and know information about zones that are farther timewise. Note that, if a distant area is also displayed in the form of the second zone display, the visual resolution of the person and the display resolution of the system will become lower than the limits, and the information necessary for determining a secondary task plan cannot be recognized, which will nullify the meaning of the display function. Therefore, the reduction of the display scale is stopped at the stage where the sense of time zones can be intuitively recognized, and the necessary intervention zones and the unnecessary zones are appropriately displayed. As for the zones thereafter, display is returned to the constant scale. In this manner, the most effective display can be performed.

Note that the vehicle control system 100 has default values for times t0, t1, and t3. Since it is possible to have different values for times t0, t1, and t3 between long-distance driving and short-distance driving, the default value is not limited to one, but a plurality of default values may be prepared, and be selectively used by the driver (user) or the system, depending on the traveling route. It is also conceivable that the driver (user) can set the values of times t0, t1, and t3, as appropriate.

Figure 15:
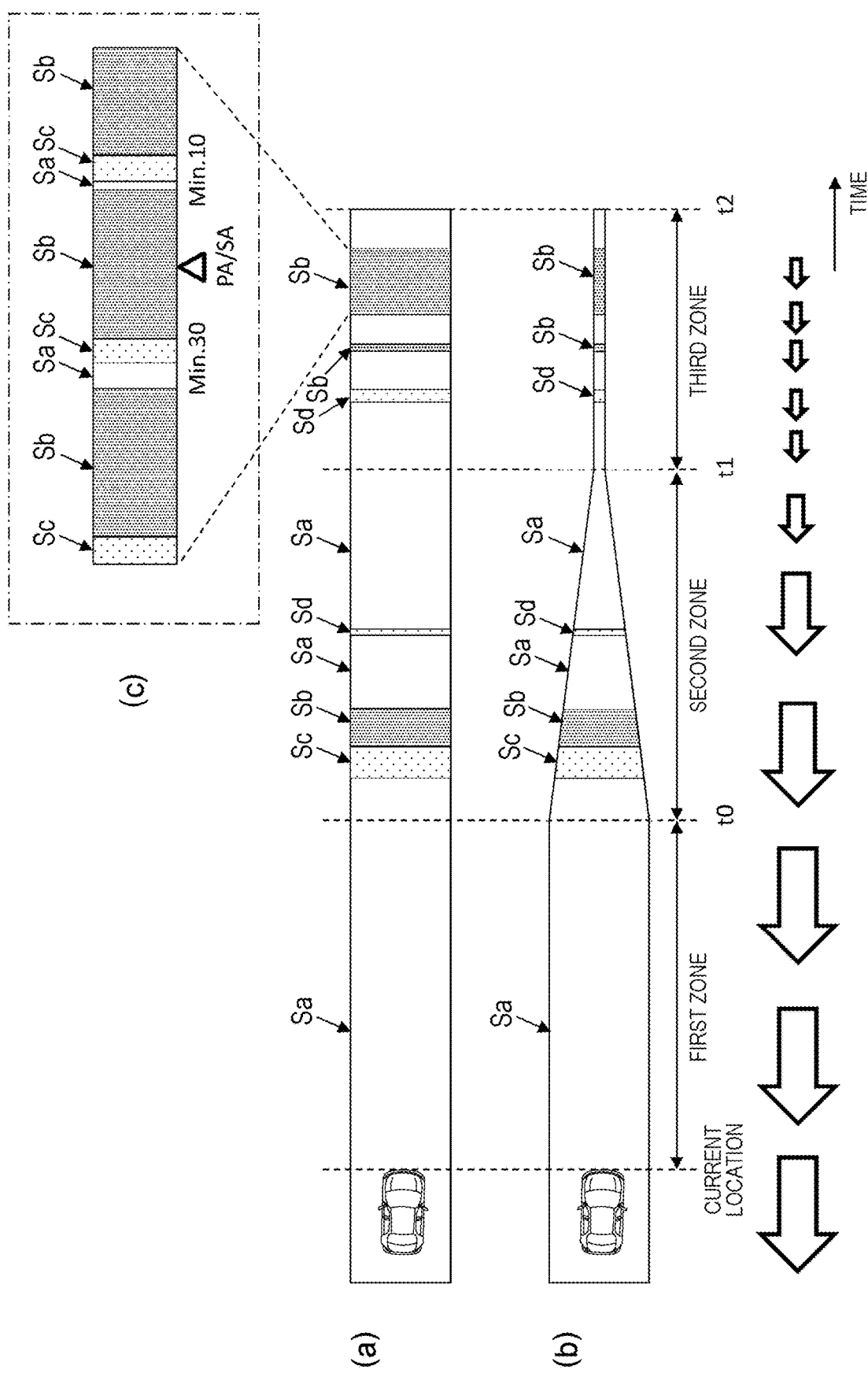
FIG. 15 is a diagram showing an example of a traveling zone display that is displayed eventually.
Figure 16:
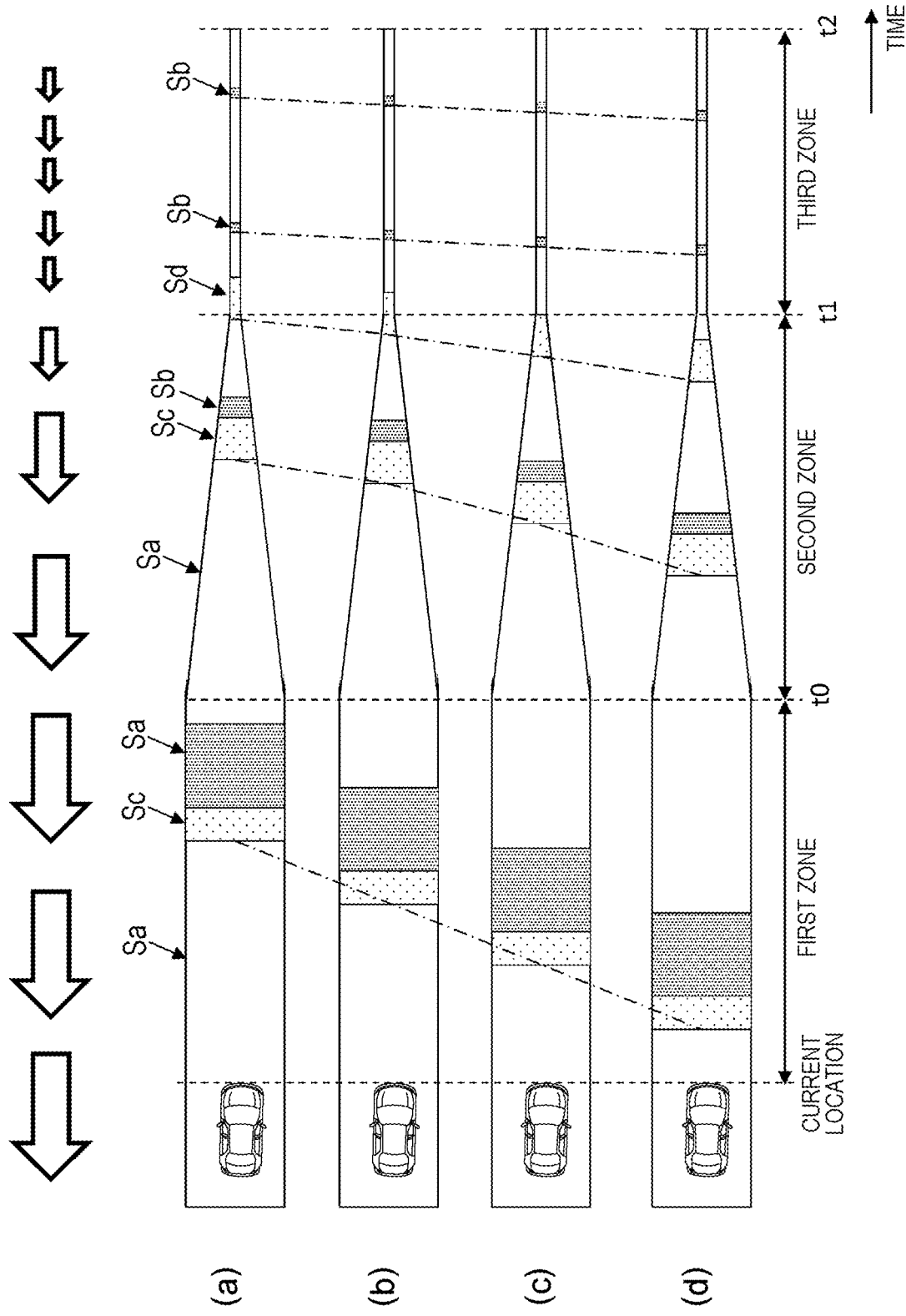
FIG. 16 is a diagram showing examples of changes (example scrolls) in traveling zone display with the passage of time.

FIGS. 15(*a*) and 15(*b*) show an example of the traveling zone display that is displayed eventually. Note that the lengths of arrows indicate whether or not the time axis is linear, and further, the changes in the reduction ratio for the time axis. In the case shown in FIG. 15(*a*), all the zones of the first zone, the second zone, and the third zone are displayed with a first width, without any change.

In the case shown in FIG. 15(*b*), on the other hand, the first zone from the current location to the first point (time t0) is displayed with the first width, the second zone from the first point (time t0) to the second point (time t1) is displayed with a width that gradually changes from the first width to a second width that is narrower than this first width, and the third zone from the second point (time T1) to the third point (time T2) is displayed with the second width. With this arrangement, the driver can visually recognize the degrees of reduction of the time axes of the second zone and the third zone with respect to the first zone. That is, the display form in FIG. 14 is a display that takes into consideration only the reduction ratio in the traveling direction. However, as the width of a cross-section of the display information with respect to the traveling direction is changed in a pseudo manner according to the perspective, the same perspective effect as that in the case of viewing in the infinite direction along the traveling on a road or a map can be achieved, and it is possible to easily and intuitively recognize the distribution of driving intervention required zones by a quick glance at the screen. In particular, in a case where one rotates and views only the second zone counterclockwise, it is possible to achieve the same road width and arrival time on the road ahead as those in a case where traveling is performed at a constant velocity. Accordingly, with this display form, it is possible to intuitively feel the arrival at each point without looking at the accurate location memory, and perform time allocation.

Note that, in an area where the reduction ratio hs/h0 is as low as that in the third zone, for example, if a zone with a short time length is displayed with the unchanged time length, the zone is displayed with a very small width, and it will be difficult for the driver to recognize the zone. Therefore, even in a case where driver intervention zones (a manual driving zone, a transition zones, and a cautionary traveling zone) are equal to or shorter than a certain time length in reality, the zones are displayed with the certain time length. In this case, if the transition zone and the manual driving zone are continuous, for example, the display of the transition zone may be omitted. In FIGS. 15(a) and 15(b), the display of the first manual driving zone Sb of the third zone indicates such a state. With this arrangement, in the third zone where the time axis is greatly reduced, the driver intervention required zones with short time lengths can be displayed so that the driver can recognize these zones.

Further, in an area where the reduction ratio hs/h0 is as low as that in the third zone, in a case where manual driving zones Sb repeatedly appear at short intervals, these manual driving zones Sb are displayed as an entirely continuous manual driving zone Sb. In FIGS. 15(a) and 15(b), the display of the second manual driving zone Sb in the third zone is in such a state in which short manual driving zones Sb are joined. As shown in FIG. 15(c), the manual driving zone Sb displayed in such a manner includes short-term transition zones Sd and automatic driving allowed zones Sa in addition to the manual driving zones Sb. Note that, as will be described later, by double-tapping the corresponding point in the traveling zone display on a tablet or the like, for example, it is possible to have a detailed display.

The above traveling zone display for the traveling route is updated on the basis of positional information about the subject vehicle and acquired LDM update information. As a result, the traveling zone display is scrolled so that each zone approaches the subject vehicle with the passage of time. FIGS. 16(a) to 16(d) show example changes in the traveling zone display over time. These examples are examples in which the second zone is displayed in a tapered manner, which is similar to that in a case where all zones are displayed with the same width.

In this case, in the first zone, each zone moves fast. Further, in the second zone, the reduction of the time axis is made smaller in the direction from the third zone side toward the first zone side, so that movement of each zone becomes faster. Further, in the third zone, the reduction of the time axis is increased, so that movement of each zone is slow.

Figure 17:
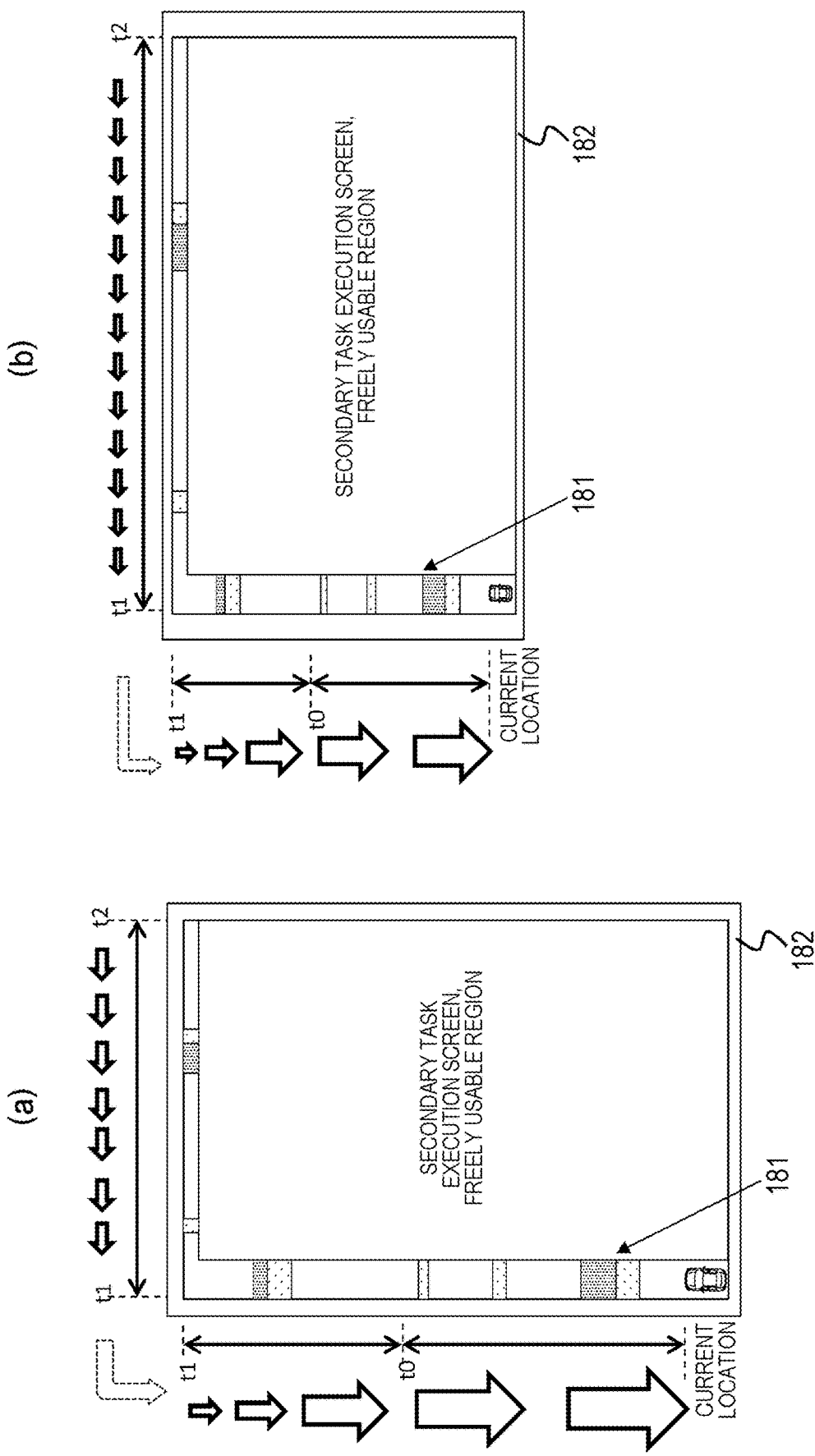
FIG. 17 is a diagram showing an example of traveling zone display in a traveling route displayed on the screen of a tablet terminal device (hereinafter, simply referred to as a "tablet").

FIGS. 17(a) and 17(b) each show an example of a traveling zone display 181 in the traveling route displayed on the screen of a tablet 182. FIG. 17(a) shows an example case where the tablet 182 is used in portrait orientation. In this case, the traveling zone display 181 is displayed in a bent state from the left side to the upper side, and is displayed in parallel with a work window that is the execution screen for a secondary task to be performed on the tablet 182. FIG. 17(b) shows an example case where the tablet 182 is used in landscape orientation. In this case, the traveling zone display 181 is also displayed in a bent state from the left side to the upper side, and is displayed in parallel with a work window that is the execution screen for a secondary task to be performed on the tablet 182. Note that, in the examples shown in the drawing, the traveling zone display 181 is disposed in a bent state on the screen of the tablet 182. However, in a case where a sufficient space can be secured, the traveling zone display 181 may be disposed linearly.

Figure 18:
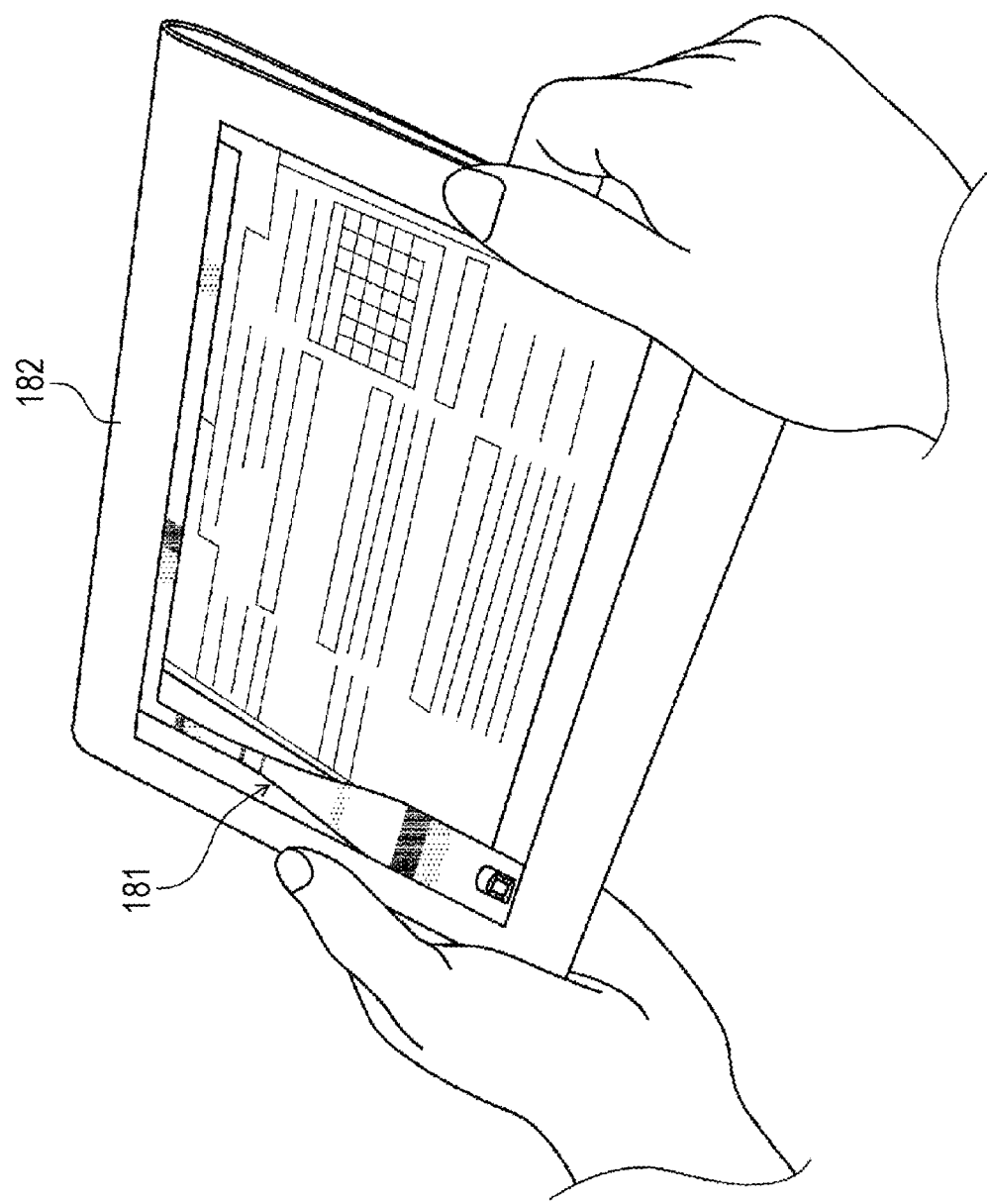
FIG. 18 is a diagram showing an example state in which the driver is actually performing a secondary task using a tablet.

FIG. 18 shows an example state in which the driver is actually performing a secondary task using the tablet 182. In this example, the tablet 182 is used in landscape orientation. On the screen of the tablet 182, the traveling zone display 181 is displayed in a bent state from the left side to the upper side. Note that the driver (user) may selectively determine whether or not to allow the traveling zone display 181 to appear on the screen. In that case, in a case where the traveling zone display 181 is not displayed on the screen, and a driver intervention required zone comes in within a certain period of time to issue a notification to the driver, for example, the traveling zone display 181 may be automatically displayed on the screen.

In a case where a new driver intervention required zone appears while the traveling zone display 181 is displayed on the screen of the tablet 182, the new driver intervention required zone is newly displayed. In this case, the new driver intervention required zone is displayed in a blinking manner for a certain period of time so as to be distinguishable from the others, for example. This blinking display may be accompanied by a cautionary alarm sound. Here, the case where a driver intervention required zone newly appears may be a case where a cautionary traveling zone or a manual driving zone newly appears, or a case where a cautionary traveling zone changes to a manual driving zone.

Figure 19:
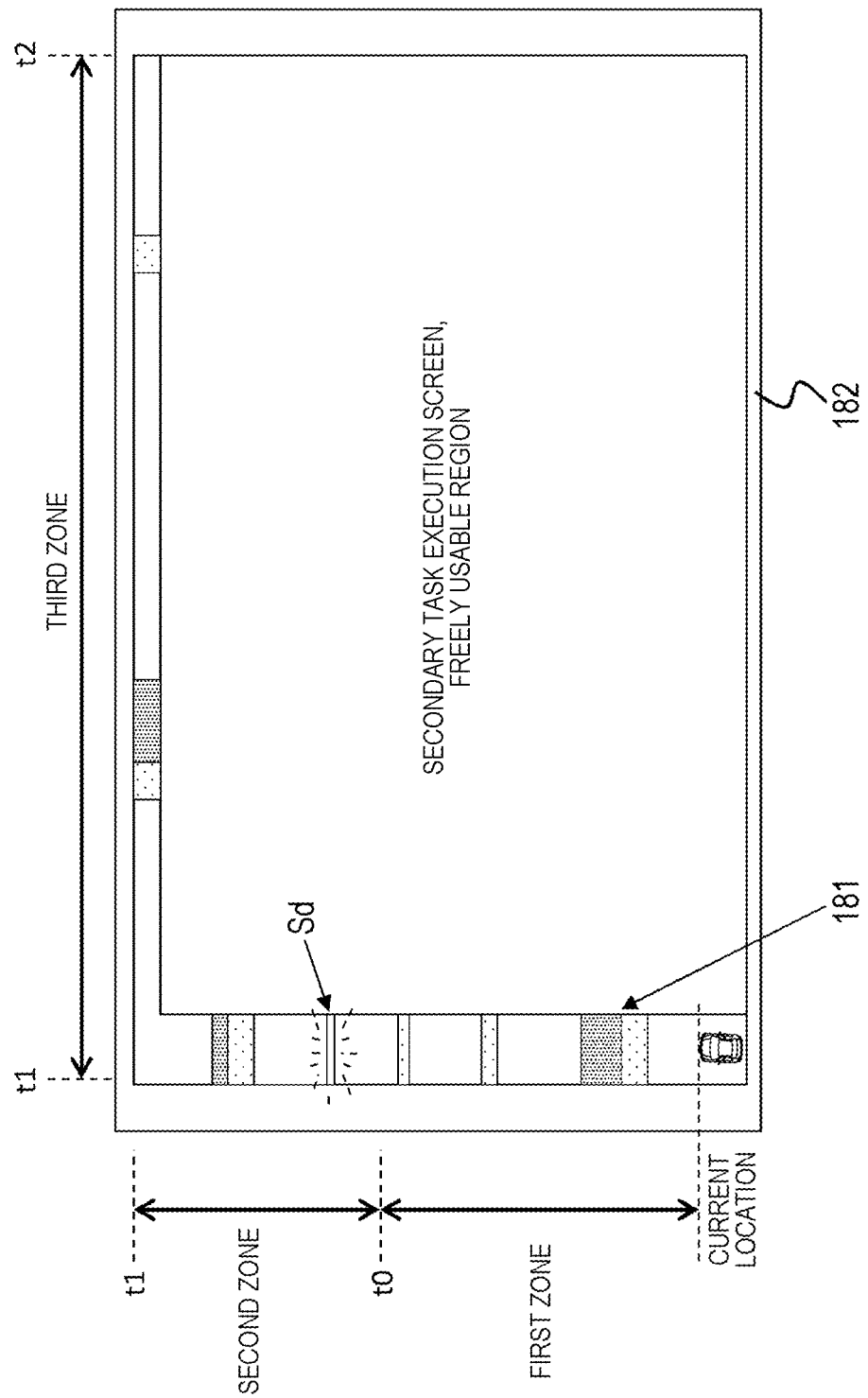
FIG. 19 is a diagram showing a state in which a cautionary traveling zone Sd newly appears in a second zone, and is displayed in a blinking manner to warn the driver.

FIG. 19 shows a state in which a cautionary traveling zone Sd newly appears in the second zone, and is displayed in a blinking manner to warn the driver. Note that, in this case, the driver may be able to stop the blinking, or the warning state, by touching the display portion of this cautionary traveling zone Sd that is blinking. Alternatively, the driver may be able to cause a small window to be displayed on a pop-up manner by touching the display portion of this blinking cautionary traveling zone Sd, and stop the blinking, or the warning state, by touching an "agree" button on the screen.

Figure 20:
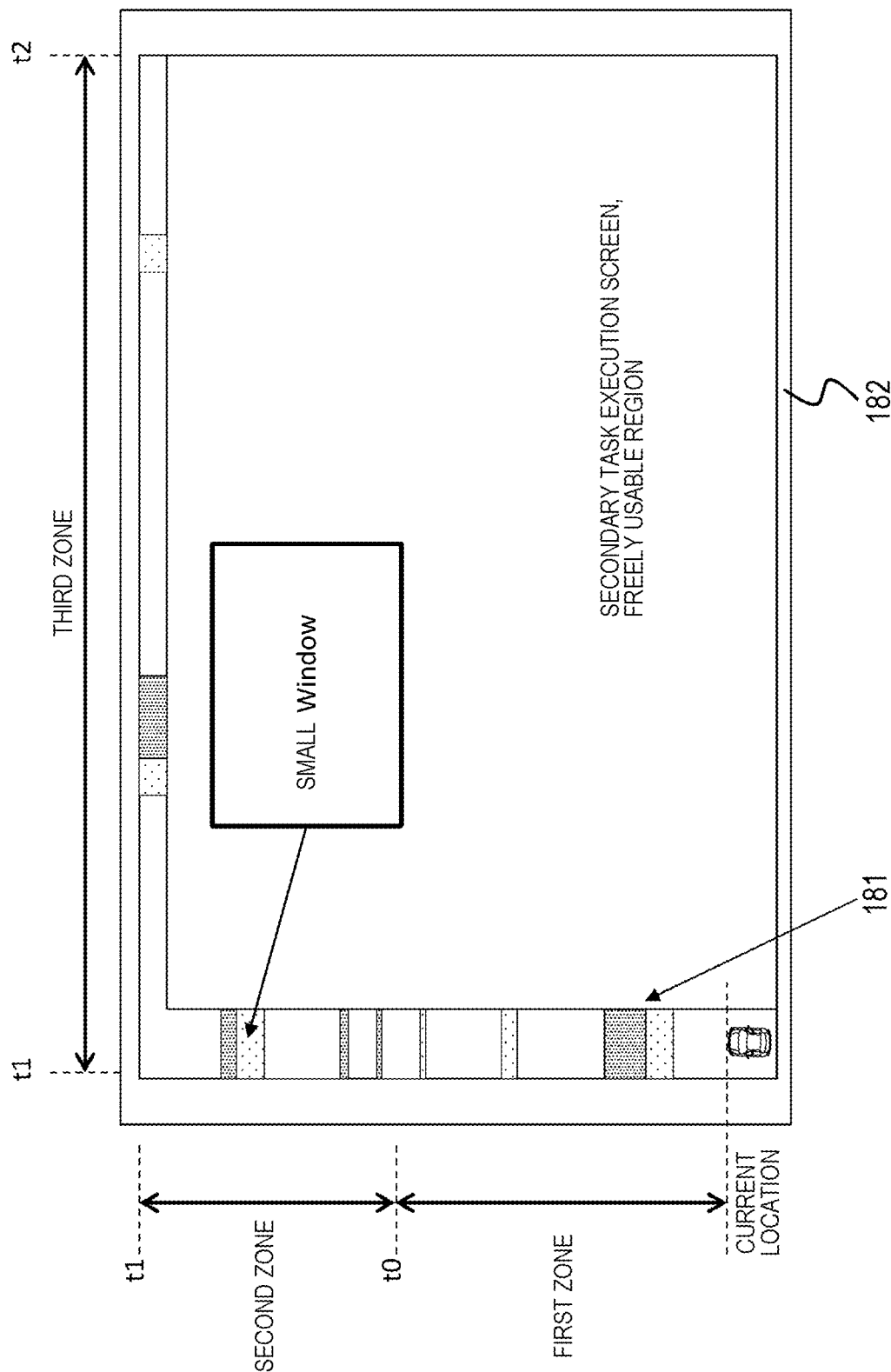
FIG. 20 is a diagram showing a state in which a small window is displayed in a pop-up manner on the screen of a tablet.

Further, in a case where the driver designates a desired point by double-tapping the corresponding point while the traveling zone display 181 is displayed on the screen of the tablet 182, a small window is displayed in a pop-up manner, and a display concerning the point is made as shown in FIG. 20, for example.

[5. Safety Determination Process and Manual Driving Resumable Time Estimation Process to be Performed by a Moving Apparatus]

Next, a safety determination process and a manual driving resumable time estimation process to be performed by a moving apparatus are described.

These processes are performed mainly by the safety determination unit 155 formed in the automatic-driving control unit 112 of the moving apparatus 100 described above with reference to FIG. 8.

As described above, the safety determination unit 155 learns the optimum return timing depending on the driver's return behavior pattern, the vehicle characteristics, and the like, and supplies the learned information to the situation recognition unit 153 and the like. As a result, it becomes possible to present to the driver the statistically determined optimum timing required for the driver to appropriately return from automatic driving to manual driving at a predetermined ratio or higher, for example.

Figure 21:
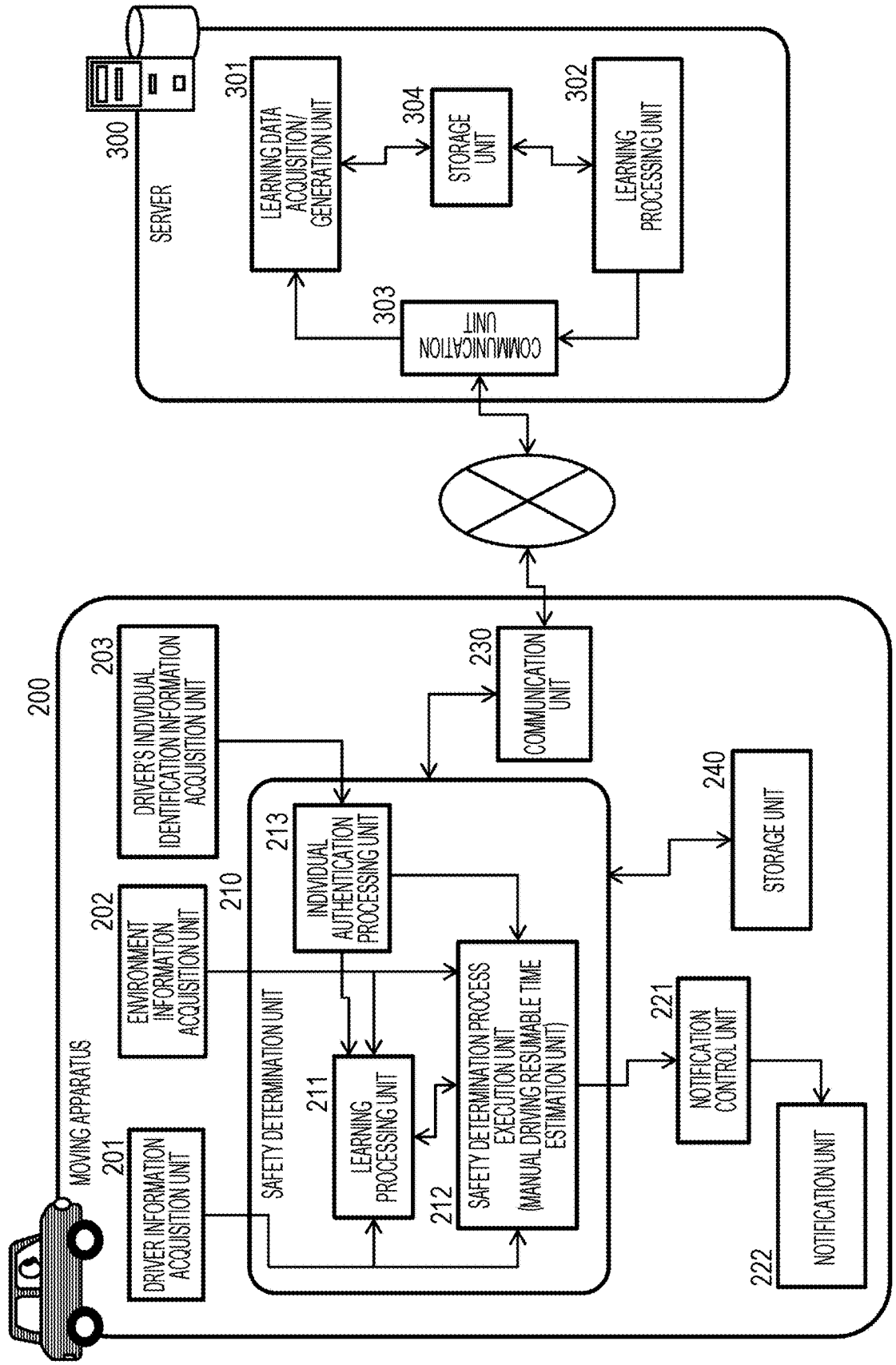
FIG. 21 is a diagram for explaining a specific example configuration of a safety determination unit and the processes to be performed.

FIG. 21 is a diagram for explaining a specific example configuration of the safety determination unit 155 and the processes to be performed.

The left side shows a moving apparatus 200 such as an automobile, and the right side shows a server 300 that communicates with the moving apparatus 100 via a network.

The moving apparatus 200 includes a driver information acquisition unit 201, an environment information acquisition unit 202, a driver's individual identification information acquisition unit 203, a safety determination unit 210, a notification control unit 221, a notification unit 222, a communication unit 230, and a storage unit 240.

Note that the safety determination unit 210 corresponds to the safety determination unit 155 formed in the situation analysis unit 133 shown in FIG. 8.

The safety determination unit 210 includes a learning processing unit 211, a safety determination process execution unit (manual driving return time estimation unit) 212, and an individual authentication processing unit 213.

The server 300 includes a learning data acquisition/generation unit 301, a learning processing unit 302, a communication unit 303, and a storage unit 304.

First, the processes to be performed by the respective components of the moving apparatus 200 are described.

The driver information acquisition unit 201 is formed with a camera and various sensors, and acquires driver information.

The driver information to be acquired by the driver information acquisition unit 201 is the line-of-sight, the eye movement, and the pupil diameter acquired from an image including the eye region, and the facial expression and the like acquired from an image including the face region, for example.

These pieces of information acquired by the driver information acquisition unit 201 are used as information for determining the level of alertness of the driver, for example.

Note that, although the example described above is a simplified description, the determination of the level of alertness of the driver includes not only determining the specific state of the driver from acquisition of simple information about the eyes, the face, and the like, but also conducting specific analysis of advance history information and behaviors of the eyes, the face, and the like, and comprehensively determining the inner alertness required for the driver to return to manual driving, hierarchically from the observable values. In the description below, some examples of biometric information to be used for the determination are described.

A means of observing the alert state of the driver as the activity status of a cognitive target or a determination target through observation of the active region in the brain may be large-scale measuring instruments that conduct brain wave observation through electrical potential detection, head surface blood flow observation using infrared rays, brain internal function evaluation by fMRI, and the like. However, those instruments are much sophisticated than devices that can be installed for general use in vehicles by today's technology, and the use of offline learning based on correlations with other living bodies and biological information such as heartbeat waveforms and EOG is limited in experimental environments.

Other than that, there is information that can be used for predicting alertness recovery beforehand through continuous acquisition of mid- to long-term advance log information, though it is difficult to directly use the information for determining a short-term alert state when transition unexpectedly becomes necessary. The time required for recovery after receipt of a return notification from the system depends on various factors and individual characteristics, such as the depth of sleep, the degree of fatigue accumulation, and the time elapsed since the start of napping, at the time of receipt of the notification. Although it is difficult to allow a direct recovery time, these pieces of advance information serve as influencing factors of alertness recovery. Therefore, observable information that can be acquired is used in learning as influencing factors of alertness recovery time estimation.

The driver information to be acquired by the driver information acquisition unit 201 is obtained by performing log acquisition depending on the state of the driver, and observing the alert state in accordance with a trigger such as receipt of a return notification or an approaching target transition event. Long-term log observation may include the life log before the driver enters the vehicle in a case where the driver wears and uses an observable device such as a wristwatch, for example. In that case, advance information such as a rest state and an excessive/insufficient sleep state can also be used to help the determination. In the normal use in a case where the log acquisition cannot be used in advance, the user gets in the vehicle, and various sensors mounted in the vehicle can measure the degree of distraction such as fatigue and drowsiness from Lorentz plot evaluation of the electrocardiogram, for example. It is also possible to estimate the state of tension and fatigue from heartbeat, pulse wave, blood flow information, and the log of mid- to long-term changes in blood pressure, breathing, expiration, and body odor. It is also possible to estimate the driver's state by analyzing the user's utterance tone and response delay in verbal communication (questions and answers) with the system. Further, a behavior analysis means to analyze facial expressions, the occurrence of downward- or side-looking states, and the like can also be adopted.

It is also possible to perform state determination by evaluating agility on the basis of gestures observed in instruction response characteristics or by evaluating activity based on an activity amount or the like.

The driver information to be acquired by the driver information acquisition unit 201 needs to include highly accurate internal alertness determination, to perform eventual transition determination while performing advance monitoring of alertness recovery influencing factors through the advance log observation. When the driver's alertness and returning from automatic driving to manual driving is viewed from another viewpoint, the situation of the driver changes chronologically in accordance with the following sequence.

1) The driver recognizes that an event requiring transition has occurred.

2) The driver performs necessary situation acknowledgement accompanying the necessity of transition.

3) If the situation acknowledgement notification is a voice notification, there is a response to the notification, and the response may be waking up, confirmation of the recognition using a switch, confirmation of the response by a gesture, detection of action recognition of touching the steering wheel, or detection of returning to the driver's seat.

4) Before starting operating the steering devices such as the steering wheel, the brake, or the accelerator, the driver who has finally returned to the returning posture after receipt of the return notification normally starts operating the devices after understanding the situation and performing the checking process necessary for returning to manual driving. Therefore, a principal information acquisition means is visual information acquisition.

5. When the driver can visually recognize the situation, he/she starts operating the appropriate steering devices. However, for a safety reason, the system does not instantaneously transfer all the steering operations to the driver, but carry out the procedures to gradually perform the transfer to the stage where the system can confirm that the driver is in an appropriate steering state and a steering response state in terms of muscular strength.

The driver information to be acquired by the driver information acquisition unit 201 includes the functions of performing observation in this series of processes.

The driver information to be acquired by the driver information acquisition unit 201 further involves the visual situation recognition as described above. In this process 4), recognition, determination, and planning are further performed as visual operations, so that the preparation for manual steering is completed. The driver cannot perform the necessary steering action determination and planning only by capturing the necessary information in the central visual field in the line of sight. Therefore, the line of sight is directed to the target necessary for risk determination, and the central visual field, which is the line of sight, is directed to the direction of the peripheral visual field. Therefore, agile turning-back movement of the eyes due to saccade appears. When the target enters the central visual field of the line of sight, fixation is started to understand the target. The knowledge information in the brain is then referred to while the features of the target are observed. When the target determination is completed, the understanding is triggered. When the understanding of the target is completed, an eye saccade operation in a new direction is performed to understand the next target to be captured at the same tine and in parallel, or pursuit following rotation is performed to cancel relative movement in the direction, to determine the action of the captured target.

That is, determination is made in the following cycle: a wide-area saccade search that appears as visual information search behavior of the eyes, a pursuit motion that follows the flow accompanying traveling, microscopic movement that occurs during fixation in which the line of sight stays until recognizing the target object to which the line of sight is directed, initial visual acquisition of the range, fluctuations, stability, and saccade to the point of interest, and the like, knowledge recognition, and micromovement of fixation for checking the recognition confirmation. That is, the short time delay caused by the trigger of determination is affected by the amount of activity in the brain, and the influence might be observed in a short time. In particular, it is assumed here that the visual reflex behavior is to start risk determination from information the driver has started to capture visually by referring to the visual memory of his/her own, and to supplement additional supplementary information necessary for confirming determination unconsciously while continuing fixation micromovement until risk determination is made. Therefore, immediately after the eyes are turned by the saccade, the initial visual information is evaluated, and the driving behavior determination is unconsciously repeated in a complicated manner, to make the determination necessary for continuing driving. The saccade is then repeated to acquire the information to be next checked. This sequence is intermittently repeated. Further, this series of eye movements and the information acquisition operation necessary for driving and steering are actions when the user is alert and aware. Therefore, these behaviors appear as minute behaviors of the eyes that strongly reflect the level of recovery of the inner alert state necessary for returning the driving to manual driving.

Further, the driver information acquisition unit 201 also includes operation information acquisition units that acquire operation information about the driver. These are formed with a camera that captures an image of the driver's face, operation information acquisition units of the respective operation units (such as the steering wheel, the accelerator, and the brake), and the like, for example.

The environment information acquisition unit 202 acquires various kinds of environment information.

The environment information to be acquired by the environment information acquisition unit 202 is an image captured by an imaging unit installed in the moving apparatus 200, for example, depth information, three-dimensional structural information, topographical information obtained by a sensor such as LiDAR installed in the moving apparatus, positional information obtained by GPS, and information supplied from communication devices installed in the infrastructures including roads, such as the states of traffic lights and information about traffic signs.

The driver's individual identification information acquisition unit 203 acquires information that can be used for individual authentication such as iris authentication, fingerprint authentication, vein authentication, or voiceprint authentication, for example.

Note that the configurations of the driver information acquisition unit 201, the environment information acquisition unit 202, and the driver's individual identification information acquisition unit 203 shown in FIG. 21 correspond to the respective configurations of the data acquisition unit 102 and the detection unit 131 in the configuration shown in FIG. 8.

The safety determination unit 210 includes a learning processing unit 211, a safety determination process execution unit (manual driving return time estimation unit) 212, and an individual authentication processing unit 213.

The individual authentication processing unit 213 receives an input of individual authentication information acquired by the driver's individual identification information acquisition unit 203 for iris authentication, fingerprint authentication, vein authentication, or voiceprint authentication, for example, and performs an individual authentication process.

The registration information required for this authentication process is acquired from the storage unit 240 or the server 300.

For example, when the driver gets into an automobile that is a moving apparatus, individual authentication is performed as an individual identification process. The driver information after the individual identification, and the environment information such as time, a drive input, and the road are recorded constantly or periodically, and are transmitted to the server 300.

Note that the Information that is input from the driver's individual identification information acquisition unit 203 and can be used for individual authentication such as iris authentication, fingerprint authentication, vein authentication, and voiceprint authentication may be transmitted to the server 300, for example, and an individual authentication process may be performed in the server 300 with the use of the information registered in the server 300.

The learning processing unit 211 receives inputs of the driver information acquired by the driver information acquisition unit 201, the environment information acquired by the environment information acquisition unit 202, and the like, and performs a learning process for safety determination using these inputs of information.

Specifically, a learner capable of calculating a "safety index value" and an "estimated manual driving resumable time value" corresponding to the "driver information" and the "environment information" is constructed, for example. Note that the learner not only learns to perform determination limited to driver-specific characteristics, but also learns characteristics depending on vehicle characteristics, environmental characteristics, and the like. For example, drivers identified as the same driver greatly differ in steering characteristics such as the steering start point and the amount of braking between when driving an automobile for commuting and when driving a heavy combination vehicle while taking into consideration safety of the vehicle behaviors. Therefore, the learner learns the factors of changes contributing to the safety, and thus, is optimized, with situations and vehicle characteristics being taken into consideration.

Note that the learner is a set of models, algorithms, parameters, and the like that are capable of learning input-output relationships through machine learning. There are various names such as statistical learner, learning model, machine learning model, statistical learning model, predictor, prediction model, estimator, and estimation model, but all of them have essentially the same meaning. Therefore, the name "learner" is adopted herein. There also are names such as classifier, classification model, identifier, identification model, regression learner, regression learning model, and generation model, but the name, "learner", is a higher-level concept that includes all of those concepts.

The safety determination process execution unit 212 receives inputs of the driver information acquired by the driver information acquisition unit 201, the environment information acquired by the environment information acquisition unit 202, and the like, and further calculates a safety index value on the basis of the current driver information and environment information, using a learner that is a result of learning at the learning processing unit 211, or a learner acquired from the server 300.

The safety determination process execution unit 212 further estimates the time required for safe return to manual driving (=the manual driving resumable time).

Note that the time required for safe return to manual driving is calculated on the basis of the time required for the driver to start manual driving at a constant high rate until the arrival at the point where transition is required, but is not the time for directly evaluating and calculating safety. The timing at which preparation for return to manual driving is required is affected by various factors such as the motion characteristics of the vehicle, the road environment and conditions, and the weather. Therefore, it is possible to maximize safety by taking these factors into account.

On the basis of the manual driving resumable time estimated by the safety determination process execution unit 212, the notification control unit 221 controls the notification timing for issuing a manual driving start request notification as described above with reference to FIG. 2, and issues the manual driving start request notification via the notification unit 222.

Note that the notification unit 222 is formed with an alarm, a display in a window, a vibration process execution unit of the steering wheel or a seat, or the like, for example.

The communication unit 230 performs communication with an external device such as the server 300.

Next, the processes to be performed by the respective components of the server 300 are described.

The server 300 includes a learning data acquisition/generation unit 301, a learning processing unit 302, a communication unit 303, and a storage unit 304.

The learning data acquisition/generation unit 301 acquires or generates learner input/output data necessary for constructing a learner. Specifically, "driver information" and "environment information" are acquired from various moving apparatuses connected to the network, for example. Further, learning data based on various kinds of acquirable data such as map data, accident occurrence data, and traffic jam data is generated, for example. Note that the learner input/output data is mentioned herein, but this is called teacher data, training data, or the like in supervised learning. As long as the desired input/output relationship can be learned, learning possibilities by other methods such as unsupervised learning, semi-supervised learning, and reinforcement learning are not excluded, and therefore, the general term, "learner input/output data", is used herein.

These pieces of data are stored into the storage unit 304.

The learning processing unit 303 performs a learning process using the learner input/output data that has been acquired or generated by the learning input/output data acquisition/generation unit 301, and has been stored into the storage unit 304.

Through this learning process, the input/output data for the learner capable of calculating a "safety index value" and an "estimated manual driving resumable time value" corresponding to the "driver information" and the "environment information" is constructed, for example.

Next, the processes to be performed by the safety determination unit 210 of the moving apparatus 200 are described in detail.

The safety determination unit 210 includes a learning processing unit 211, a safety determination process execution unit (manual driving return time estimation unit) 212, and an individual authentication processing unit 213.

The learning processing unit 211 receives inputs of the driver information acquired by the driver information acquisition unit 201, and the environment information acquired by the environment information acquisition unit 202, and performs a learning process for safety determination using these inputs of information.

The safety determination process execution unit (manual driving return time estimation unit) 212 receives inputs of the driver information acquired by the driver information acquisition unit 201, the environment information acquired by the environment information acquisition unit 202, and the like, and further calculates a safety index value on the basis of the current driver information and environment information, using a learner that is a result of learning at the learning processing unit 211, or a learner acquired from the server 300.

The safety determination process execution unit 212 further estimates the time required for safe return to manual driving (=the manual driving resumable time).

Note that, in the initial state where any learner input/output data does not exist, and a learner that has already learned cannot be acquired from the learning processing unit 211, the safety determination process execution unit (manual driving return time estimation unit) 212 acquires, from the storage unit 240, a learner that has learned using a large amount of unspecified data acquired experimentally in advance, for example, and performs a safety index value calculation process and a manual driving resumable time estimation process, using this learner.

Alternatively, a fixed manual driving resumable time that has been set beforehand is output as an estimated value.

Note that a learner generated through a learning process using a large amount of unspecified data can also be acquired from the server 300.

After the learning process at the learning processing unit 211 is completed, the learner is used in a process of calculating a safety index value based on the input driver information and environment information, and a process of estimating a manual driving resumable time.

For example, the learning processing unit 211 performs a learning process for constructing correspondence relationship between information (a) and information (b):

(a) the driver information acquired by the driver information acquisition unit 201, and the environment information acquired by the environment information acquisition unit 202, and (b) operation information indicating whether or not the driver was able to drive in a safe state after the notification for switching from the automatic driving mode to the manual driving mode.

Note that, as described above, the driver information acquisition unit 12 has not only the function of performing a process of acquiring information for determining the level of alertness of the driver, but also a function of acquiring operation information about the driver, which is information about the respective operation units (the steering wheel, the accelerator, the brake, and the like), for example.

That is, the learning processing unit 211 acquires the driver information and the environment information, and, at a certain timing, acquires driving operation information about the driver after a manual driving return request notification is issued, as described above with reference to FIG. 2, to determine whether or not safe driving is being performed.

If safe driving is being performed, it is determined that the timing of the manual driving return request notification can be further delayed in a case where the same driver information and environment information is obtained.

If safe driving is not being performed, it is determined that the timing of the manual driving return request notification should be advanced in a case where the same driver information and environment information is obtained.

In the learning process at the learning processing unit 211, a learner for determining the timing of such a manual driving return request notification is constructed.

Note that, in the learning process at the learning processing unit 211, not only the data to be used for determining the timing of the manual driving return request notification, but also a learner that can be used in a process of determining whether or not the driver can perform safe manual driving in a case where certain driver information and environment information is obtained, or a learner that associates the "driver information and environment information" with a "safety index value", is constructed.

The learner characteristically acquires teacher data that is (b) the operation information indicating whether or not the driver can drive in a safe state, while acquiring transition from the driver's characteristics prior to the return notification that occurs every time an even occurs. Thus, the system includes a self-contained learner that performs success/failure determination and transition quality evaluation, and can achieve a higher degree of accuracy.

As described above, in the learning process at the learning processing unit 211, safety index value data associated with the driver information acquired by the driver information acquisition unit 201 and the environment information acquired by the environment information acquisition unit 202 can be obtained.

Further, the manual driving resumable time (the time required before a return to safe manual driving) corresponding to the driver information acquired by the driver information acquisition unit 201 and the environment information acquired by the environment information acquisition unit 202 can be calculated.

On the basis of this manual driving resumable time, the time to issue a manual driving start request notification to the driver can be determined.

The data of the result of the learning process at the learning processing unit 211 is stored into the storage unit 240.

The data (the learner and/or the learner input/output data) stored in the storage unit 240 includes the following data, for example:

the safety index value data associated with the driver information and the environment information;

the manual driving resumable time (the time required before a return to safe manual driving=the optimum advance notification time for a manual driving start request) associated with the driver information and the environment information;

the abnormality in the driver information, the abnormality in the environment information, and the required return time, after the manual driving start request notification; and a learner.

These pieces of data can be stored in the storage unit 240.

The data stored in the storage unit 240 is periodically transmitted to the server 300.

The server 300 stores the data received from the moving apparatus 200 into the storage unit 304, and the learning data generation unit 301 further performs a learning process based on the received data.

The server 300 receives a large amount of data from a large number of moving apparatuses (automobiles), and becomes able to perform a learning process based on the large amount of data. As a result, it becomes possible to obtain input/output data (a learner) with higher versatility and higher reliability.

The server 300 updates the learner through a learning process based on a large amount of data, and stores the learner into the storage unit 304 of the server 300.

The learner stored in the storage unit 304 of the server 300 includes data similar to the data stored in the storage unit 240 of the moving apparatus 200 described above. That is, the following data is stored in the storage unit 304 of the server 300:

the learner;

the safety index value data associated with the driver information and the environment information;

the manual driving resumable time (the time required before a return to safe manual driving=the optimum advance notification time for a manual driving start request) associated with the driver information and the environment information; and the abnormality in the driver information, the abnormality in the environment information, and the required return time, after the manual driving start request notification.

The learner stored in the storage unit 304 of the server 300 is supplied to the moving apparatus 200 as needed, and is used by the safety determination processing unit 212 of the safety determination unit 210 of the moving apparatus 200 to calculate the safety index value based on the driver information acquired by the driver information acquisition unit 201 and the environment information acquired by the environment information acquisition unit 202, the manual driving resumable time, and the like.

Note that the learning processing unit 211 incorporates individual identification information, vehicle type information, time information, and the like into the learning data, to generate a learner capable of predicting a safety index value associated with an individual, an automobile (a vehicle type or the like), or time, and a manual driving resumable time.

The individual identification information can be acquired via the individual authentication processing unit 213.

The vehicle type information can be acquired from the environment information acquisition unit 202. Alternatively, data stored beforehand into the storage unit may be used.

The safety determination process execution unit (manual driving return time estimation unit) 212 acquires the manual driving resumable time by using the learner calculated as a result of the learning processing at the learning processing unit 211, and issues a manual driving return request notification based on the acquired manual driving resumable time.

Further, the learning processing unit 211 acquires driving operation information about the driver from the driver information acquisition unit 201 and the environment information acquisition unit 202 after this notification, and determines whether or not normal driving is being performed.

On the basis of this determination, the learner is updated and/or is made to relearn, so that the notification time is advanced in a case where an abnormality is often observed, and the notification time is delayed in a case where an abnormality is rarely observed, for example. Through this update and/or relearning process, it is also possible to control the notification time.

Next, a specific example of a manual driving resumable time estimation process to be performed at the safety determination processing unit 212 of the safety determination unit 210 of the moving apparatus 200 is described.

As described above, during automatic driving, the driver can perform various processes (secondary tasks), and the level of alertness greatly varies depending on the secondary task being performed.

For example, there are cases where the driver has simply taken his/her hands off the steering wheel but is carefully looking ahead of the automobile in a manner similar to that during driving, there are cases where the driver is reading a book, and there are cases where the driver is napping. The driver's level of alertness (consciousness level) varies depending on the differences among these processes.

For example, napping lowers the level of alertness of the driver. That is, the level of consciousness becomes lower. In such a state where the level of alertness is lowered, normal manual driving cannot be performed. If the mode is switched to the manual driving mode in that state, an accident might occur in the worst case.

Therefore, to enable the manual driving resumable time estimation process at the safety determination processing unit 212, the driver information acquisition unit 201 preferably acquires information that allows checking of the secondary task execution state of the driver during automatic driving, and the learning processing unit 211 then preferably performs a learning process using the acquired data.

For this purpose, the driver information acquisition unit 201 preferably includes a camera installed for observing the inside of the vehicle, and a pressure sensor, a temperature sensor, a biological signal acquisition unit, and the like installed on the steering wheel or the seat.

Using images obtained from the camera, the learning processing unit 211 calculates the results of face authentication, head posture estimation, line-of-sight estimation, body posture estimation, and action identification, and uses these pieces of data in the learning process.

When a secondary task is being performed, additional information is added to input information, so that it will be clear that the input information is acquired during automatic driving. When the driver returns from a secondary task, information needs to be presented to the driver, with a resumable time calculated by some method being allowed. In this manner, the driver can return to manual driving in time. When sufficient data for estimating the manual driving resumable time has not collected, it is necessary to issue a return notification at a time that enables a reliable return. Since the individual characteristics have not been learned, information is presented using a fixed definition time that does not depend on the characteristics information. This fixed definition time is as follows: the usage record data of various driver populations is statistically evaluated, and the time at which a certain proportion of the evaluated users have succeeded in transition is acquired in advance, for example. The average return delay time among the drivers in the collected data is then learned offline or the like in advance, so that statistical data is obtained. On the basis of this statistical data, the definition time for returning at a target success rate may be set.

Also, when this definition time is used, a user who uses the system for the first time is cautious, and therefore, offset setting may be performed, with such characteristics being taken into consideration.

At that time, the time from the presentation of information to the return to manual driving is measured every time a transition event occurs, and is recorded and collected as a manual driving resumable time in a record log.

Also, when a check is made to determine whether the driver has returned to manual driving, it is possible to refer to the results of learning performed in advance. After procedures similar to the above are repeated, it is possible to collect data for estimating a resumable time, with respect to a specific individual and a specific vehicle.

In a case where sufficient data for estimating a safety index value and a manual driving resumable time has been collected, a learner that predicts a safety index value and an optimum resumable time can be constructed through a machine learning process using the following input/output data, for example.

Inputs: driver information, environment information, and the like

Outputs: a safety index value and a manual driving resumable time

Further, uniquely authenticated specific return characteristics may have different return times depending on the driver's driving experience in the past and environmental conditions. For example, the time required for starting a return and the time required for completing the return are not uniquely determined depending situations, such as poor visibility in rainy weather, nighttime conditions, visibility obstruction under backlight, cumulative fatigue in the early morning or in the evening, the behaviors at the time of use of a private car for commuting, the vehicle characteristics of a large passenger bus or a cargo-loaded vehicle, even though the driver is the same. Many of these situation factors are examples in the description below, and these factors are roughly classified into two types that will be collectively referred to as "driver information" and "environment information".

Figure 22:
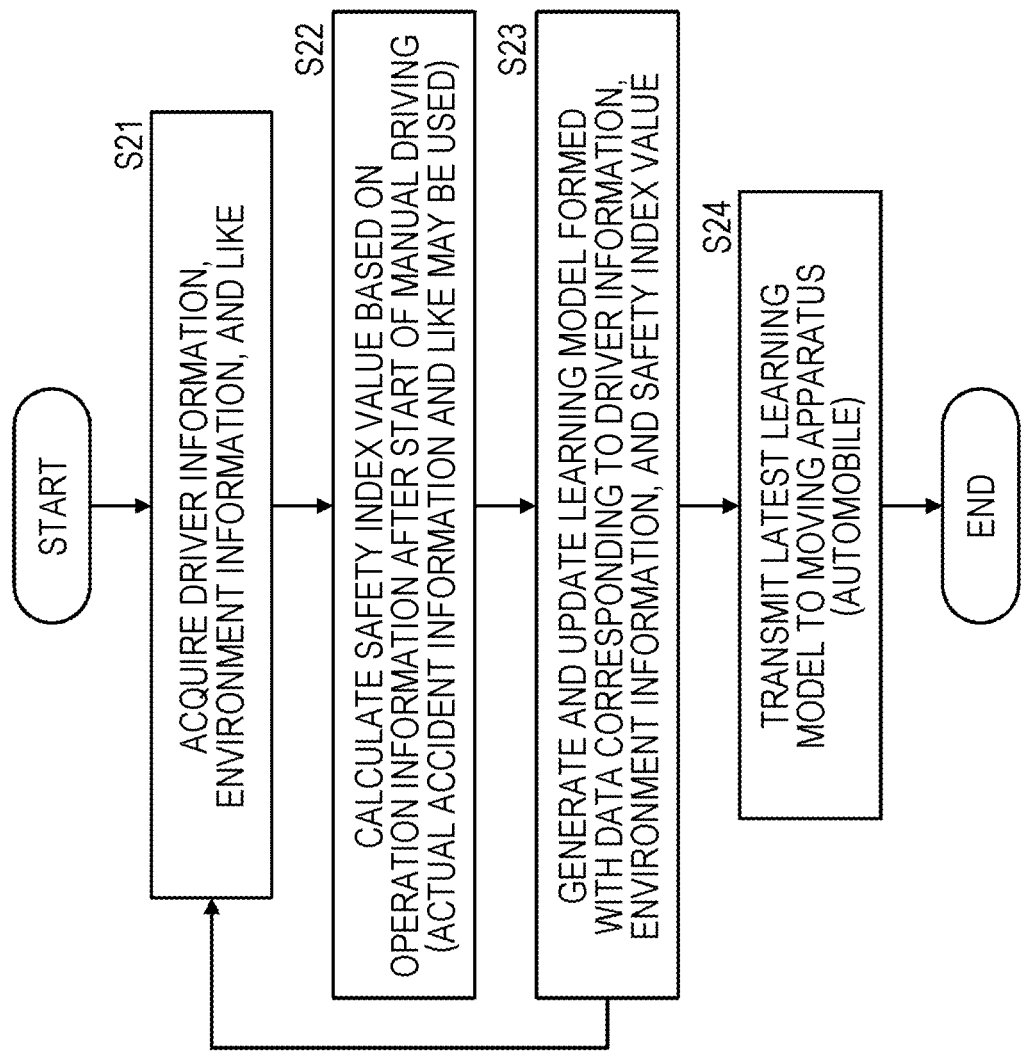
FIG. 22 is a diagram showing a flowchart for explaining an example of a learning process sequence.

Next, an example sequence in the learning processes to be performed by the learning processing unit 211 of the moving apparatus 200 and the learning processing unit 302 of the server 300 is described, with reference to the flowchart shown in FIG. 22.

As described above, the learning processing unit 211 of the moving apparatus 200 and the learning processing unit 302 of the server 300 construct learners capable of calculating a "safety index value" and an "estimated manual driving resumable time value" corresponding to "driver information" and "environment information".

First, in step S21, inputs of "driver information" and "environment information" are received.

Next, in step S22, operation information about the driver is acquired from the driver information acquisition unit after the start of manual driving, which is started with a manual driving start request notification, and a safety index value depending on whether or not a safe operation is being performed is calculated.

As described above, the driver information acquisition unit 12 has not only the function of performing a process of acquiring information for determining the level of alertness of the driver, but also a function of acquiring operation information about the driver, which is information about the respective operation units (the steering wheel, the accelerator, the brake, and the like).

Note that, in the safety index value calculation process in step S22, a process of calculating a safety index value may be performed using not only the operation information about the driver, but also specific event handling information and accident information, for example. For example, the safety index value may be calculated using event handling information and the like corresponding to time and road information, in addition to the "driver information" and the "environment information". The event handling information is obtained as the driver's accurate steering judgment evaluation level through continuous monitoring of the driving/steering conditions. For example, when the vehicle starts deviating from the lane, a check is made to determine whether the steering wheel is handled to correct the deviation at an appropriate time. Also, checks are made to determine whether a delay has occurred during observation in a steady state, whether overcorrection is being performed, whether intervals of correction are becoming irregular, and the like. Thus, comprehensive steering stability evaluation on variable amplitude, changes in acceleration at the time of steering correction, and the like is continuously performed.

When the system starts entrusting the vehicle system control to the driver, the driver makes steering intention inputs with the steering wheel, the brake, and the accelerator. Thus, the system can start evaluating the differences between the system's ideal velocity drive control considered desirable in steering and the control being performed by the driver, as is seen from the example of the above correction steering. Accordingly, it becomes possible to quantitatively evaluate the driver's level of alertness recovery, from the steering validity of the driver. The system completes the steering intervention when the system control is entrusted to the driver. As a result, the system obtains a log data set, such as the history and the success/failure records of the so-called "driver information" and "environment information" such as the driver state, the vehicle state, and the environmental state prior to the transfer, or a quality evaluation log of the actual delay time required for proper transfer and the steering at the time of the transfer, and a curve indicating characteristic changes in the recovery behavior required for complete recovery.

In the next step S23, the input/output data formed with the data corresponding to the input information (the driver information, the environment information, and the like) and the safety index value is generated, and the learner is updated. It is not always necessary to distinguish between an event that occurs during scheduled transfer at the time of travel planning and an event that newly occurs during the travel time, and a set of logs of evaluation on the advance observation values acquired prior to returns accompanying repetitive use of a vehicle and the results of transfer, and logs of success, avoidance, and quality determination is acquired as a learning data set.

The processes in steps S21 to S23 are repeatedly carried out, and the learner formed with the data corresponding to the input information (the driver information, the environment information, and the like) and the safety index value is sequentially updated using a large amount of learning data.

The process in step S24 is a process in a case where the learner is constructed at the learning processing unit 302 of the server 300.

In step S24, the latest learner generated in the server 300 is transmitted to the moving apparatus (automobile).

Note that, the flow shown in FIG. 22 is the flow in the process of generating a learner formed with the data corresponding to the "driver information, environment information, and the like" and the "safety index value". Further, a sequence of processing to be performed in a case where a learner formed with input/output data that associates the "driver information, environment information, and the like" with a "manual driving resumable time" is described, with reference to a flow shown in FIG. 23.

First, in step S31, inputs of "driver information" and "environment information" are received.

Next, in step S32, the time from the manual driving start request notification time to the manual driving start is measured.

Next, in step S33, operation information about the driver after the manual driving start is acquired from the driver information acquisition unit, and a safety index value depending on whether or not a safe operation is being performed is calculated.

Note that, in the safety index value calculation process in step S33, a process of calculating a safety index value may be performed using not only the operation information about the driver, but also specific accident information, for example. For example, the safety index value may be calculated using accident information and the like corresponding to time and road information, in addition to the "driver information" and the "environment information".

In the next step S34, the elapsed time (manual driving resumable time) from the notification time to the manual driving start time is calculated. The elapsed time is necessary for keeping the safety index value based on the operation information after the manual driving start at a certain value or higher (for maintaining safety).

In the next step S35, the input/output data formed with the data corresponding to the input information (the driver information, the environment information, and the like) the safety index value, and the manual driving resumable time is generated, and the learner is updated.

The processes in steps S31 to S35 are repeatedly carried out, and the learner formed with the data corresponding to the input information (the driver information, the environment information, and the like), the safety index value, and the manual driving resumable time is sequentially updated using a large amount of learning data.

The process in step S36 is a process in a case where the learner is constructed at the learning processing unit 302 of the server 300.

In step S36, the latest learner generated in the server 300 is transmitted to the moving apparatus (automobile).

FIG. 24 shows examples of the input/output data of the learner generated through this learner construction process.

The data shown in FIG. 24 is the learner input/output data, which is formed with the data corresponding to input information (driver information, environment information, and the like), safety index values, and manual driving resumable times.

Note that the driver information and the environment information include a plurality of observation values (parameters) acquired by a plurality of different sensors.

That is, the driver information and the environment information are formed with sets of a plurality of parameters.

The safety index values in the examples shown in FIG. 24 are examples set with values from 0 to 1 (0 (danger) to (safety)).

These are merely examples, and, as described earlier, it is possible to adopt binary settings of 0 (danger) and 1 (safety), or some other numerical range.

Figure 23:
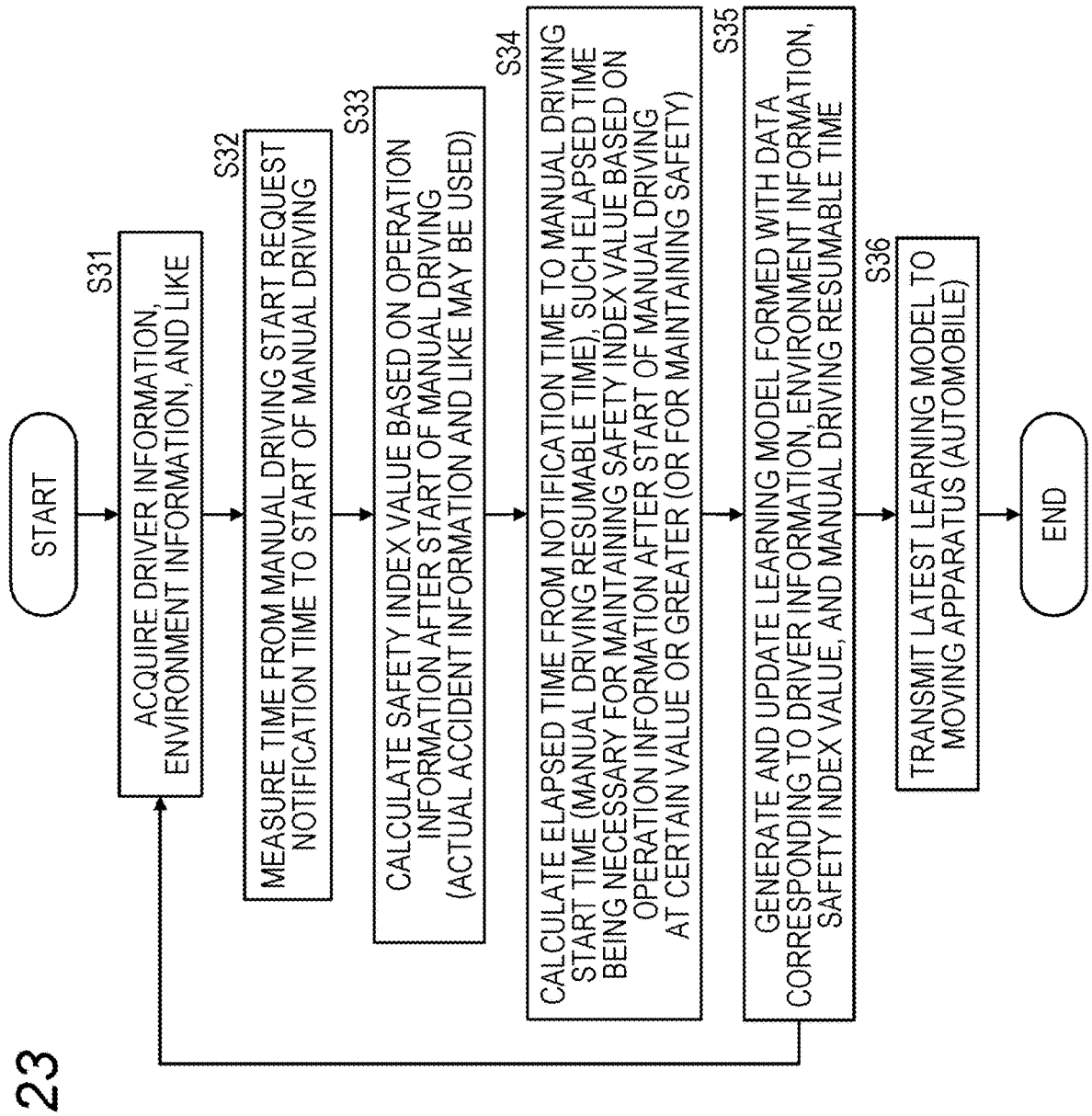
FIG. 23 is a diagram showing a flowchart for explaining an example of a learning process sequence.

The estimated manual driving resumable time value is the time calculated in the process in step S34 in the flow shown in FIG. 23 described above. In other words, this is the calculated value of the elapsed time (manual driving resumable time) from the notification time to the manual driving start time. The elapsed time is necessary for keeping the safety index value based on the operation information after the manual driving start at a certain value or higher (for maintaining safety).

The safety determination process execution unit (manual driving return time estimation unit) 212 of the safety determination unit 210 shown in FIG. 21 uses such a learner, to estimate the safety index value and the manual driving resumable time corresponding to input information such as driver information and environment information.

The process of estimating the manual driving resumable time by using a learner is performed as the following process, for example.

The safety determination process execution unit (manual driving return time estimation unit) 212 receives inputs of the driver information acquired by the driver information acquisition unit 201, the environment information acquired by the environment information acquisition unit 202, and the like.

Further, a learner that is a result of learning at the learning processing unit 211, or a learner acquired from the server 300, which is a learner that has learned using input/output data having the data configuration shown in FIG. 24, is used to estimate the time (=the manual driving resumable time) required before a return to safe manual driving, on the basis of the current driver information and environment information.

Note that the data shown in FIG. 24 is formed with the data corresponding to "driver information and environment information" and "safety index values and manual driving resumable times". However, these are merely examples, and individual identification information, vehicle type information, time information, or the like can be incorporated into the data, for example, to generate a learner that has safety index values and manual driving resumable times associated with individuals, automobiles (vehicle types or the like), or times.

Further, in a case where the same person drives different vehicles of different vehicle types or the like, it is possible to estimate a manual driving return time in a manner similar to the above, by obtaining correspondence relationship in input information about each vehicle. However, information at each vehicle is newly collected and additionally learned, so that prediction accuracy can be further increased. The present technology can be used not only in resumable time prediction applied to individuals, but also in manual driving resumable time prediction applied to vehicles.

Further, in a case where a plurality of persons gets in one vehicle, a learner that calculates an estimated resumable time associated with the driver and the passenger(s) in the vehicle may be constructed.

With such a configuration, it is possible to predict the optimum manual driving resumable time for the driver and the passenger(s) in the vehicle.

In this manner, a process that takes into consideration the driver's driving history, accident history, driving operation information after the start of manual driving, automobile type information, and the like as the individual information about the driver, and a learning process that uses information about the number of passengers and the cargo loaded on the vehicle are performed, so that a learner that copes with various situations can be generated.

Note that, in a case where many kinds of information are used, the information may be used separately for preliminary learning and online learning, depending on data characteristics.

[6. Sequence of Processes to be Performed by a Moving Apparatus and an Information Processing Device of the Present Disclosure]

Next, a sequence of processes to be performed by a moving apparatus and an information processing device of the present disclosure is described.

Figure 25:
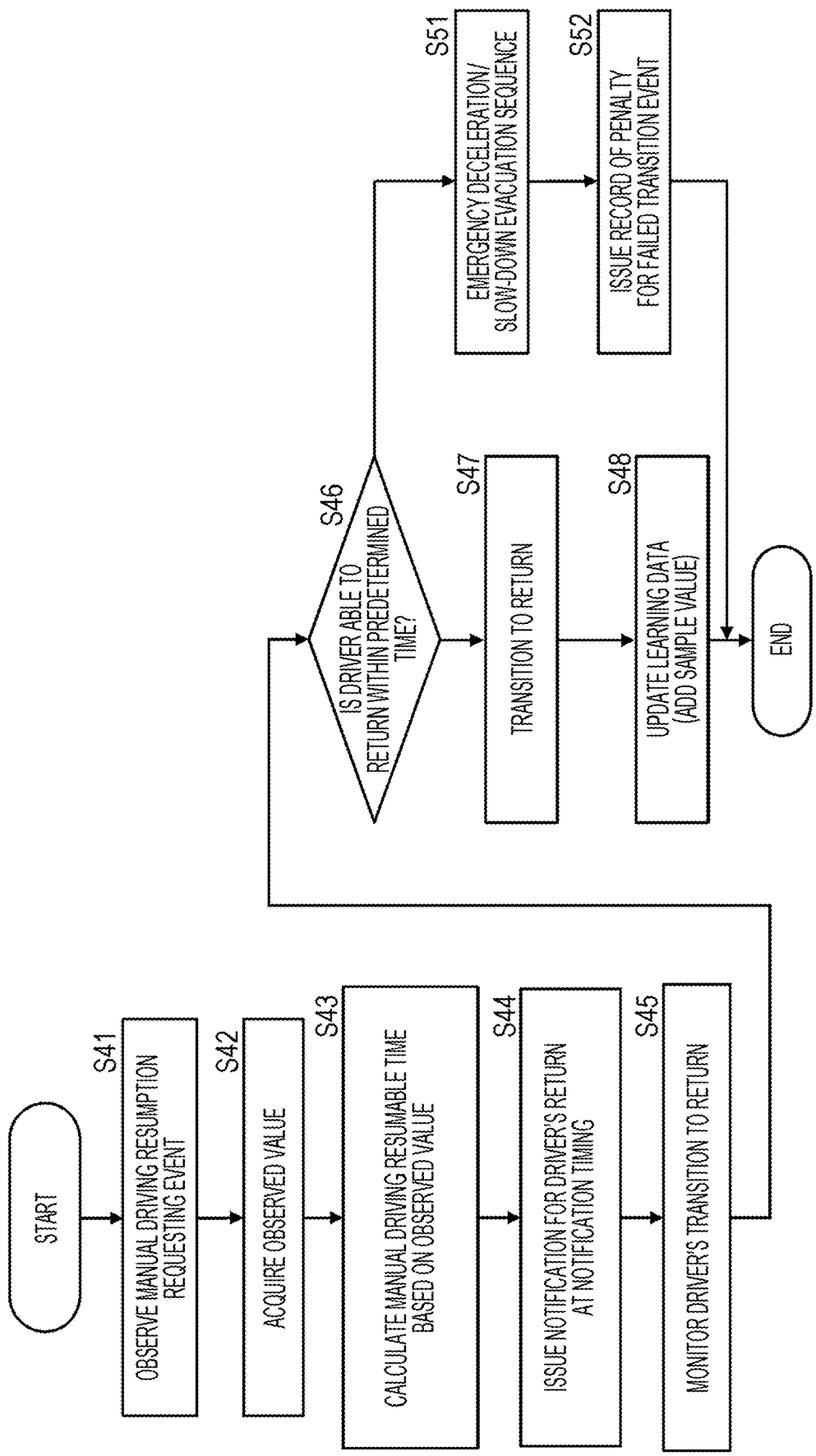
FIG. 25 is a diagram showing a flowchart for explaining an example sequence of processes to be performed at a time of switching from an automatic driving mode to a manual driving mode.

The flowchart shown in FIG. 25 is a flowchart for explaining an example sequence of processes to be performed when an automobile that is a moving apparatus of the present disclosure switches from the automatic driving mode to the manual driving mode.

In step S41, the moving apparatus observes the occurrence an event of a request for switching from the automatic driving mode to the manual driving mode.

This observation information is acquired on the basis of LDM information about the road environment, for example.

That is, the observation information is acquired on the basis of so-called local dynamic map (LDM) information that is obtained by constantly updating, with high density, the travel map information about the road on which the vehicle is traveling.

In a specific example, an expressway is assumed to be an automatic driving allowed zone, and a general road is assumed to be in a road environment that does not allow automatic driving, for example. In a case where a plan to start entering from an expressway to a general road is acquired on the basis of an LDM, an event is determined to be a request for switching from the automatic driving mode to the manual driving mode. Note that, in reality, there is a possibility that more complicated and diverse operations than the limited divisions such as expressways and general roads will be performed.

Next, in step S42, observation values are acquired. This observation value acquisition process is performed by the driver information acquisition unit 201, the environment information acquisition unit 202, and the driver's individual identification information acquisition unit 203 shown in FIG. 21, for example. Note that, these components correspond to the respective components of the data acquisition unit 102 and the detection unit 131 in the configuration shown in FIG. 8.

As described above, the driver information acquisition unit 201 is formed with a camera and various sensors, and acquires information about the driver, such as information for determining the level of alertness of the driver, for example. The information is the line-of-sight, the eye movement, and the pupil diameter acquired from an image including the eye region, and the facial expression and the like acquired from an image including the face region, for example. The driver information acquisition unit 201 further acquires operation information about the driver on the respective operation units (the steering wheel, the accelerator, the brake, and the like).

The environment information acquisition unit 202 acquires an image captured by an imaging unit installed in the moving apparatus, for example, depth information, three-dimensional structural information, topographical information obtained by a sensor such as LiDAR installed in the moving apparatus, positional information obtained by GPS, and information supplied from communication devices installed in the infrastructures including roads, such as the states of traffic lights and information about traffic signs.

Next, in step S43, a manual driving resumable time is calculated on the basis of the acquired observation values.

This process is a process to be performed by the safety determination process execution unit (manual driving return time estimation unit) 212 of the safety determination unit 210 shown in FIG. 21.

The safety determination process execution unit (manual driving return time estimation unit) 212 receives inputs of the driver information acquired by the driver information acquisition unit 201, the environment information acquired by the environment information acquisition unit 202, and the like. Further, a learner that is a result of learning at the learning processing unit 211, or a learner acquired from the server 300 is used to estimate the time (=the manual driving resumable time) required before a return to safe manual driving, on the basis of the current driver information and environment information.

Here, the learner to be used is the learner that has learned using the input/output data described above with reference to FIG. 24, for example.

Note that, as described above, the data shown in 12 is the learner input/output data that is formed with the data corresponding to "driver information, environment information, and the like" and "safety index values and manual driving resumable times".

FIG. 24 shows an example of a table formed with combinations of specific parameters based on combinations of driver information and environment information that are assumed to be combinations of input information. However, each specific combination of events does not occur very often, but a combined event occurs as a combination of various circumstances and states every time an event occurs. Therefore, the information is multidimensional input information, and there is not always a log of information indicating the preliminary state of the driver. Further, even if the observation values are of the same biological information, there are many individual differences in the determination delay before determination from acquired visual information, due to the individual's physical characteristics, gestures, experiences, memories, and the like.

To perform determination more accurately under various conditions, a safety discriminator is updated through learning using a data group formed with sets of driver information and a safety index. A possible learning method involves a support vector machine, boosting, a convolutional neural network, a deep belief network, a long short-term memory, or the like, for example. At a time of updating, a newly acquired data group may be added to a pre-learning data group for re-learning, or online learning may be used.

The safety determination process execution unit (manual driving return time estimation unit) 212 performs prediction by outputting driver information and environment information as inputs, using a learner that has learned using the data shown in FIG. 24. Alternatively, a simplified method may be used as follows: an entry having a parameter closest to each parameter of the driver information acquired by the driver information acquisition unit 201 and the environment information acquired by the environment information acquisition unit 202 is selected from the data shown in FIG. 24, and the estimated manual driving resumable time value set in the selected entry is acquired.

Note that the learner to be used in the process of estimating the manual driving resumable time can be designed to have observation information including each driver or the type of a secondary task during automatic driving.

In this case, a process (a manual driving resumable time estimation process) is performed using observation information that is individual identification information about the driver who is currently driving, and information about the type of the secondary task that is being performed.

Figure 26:
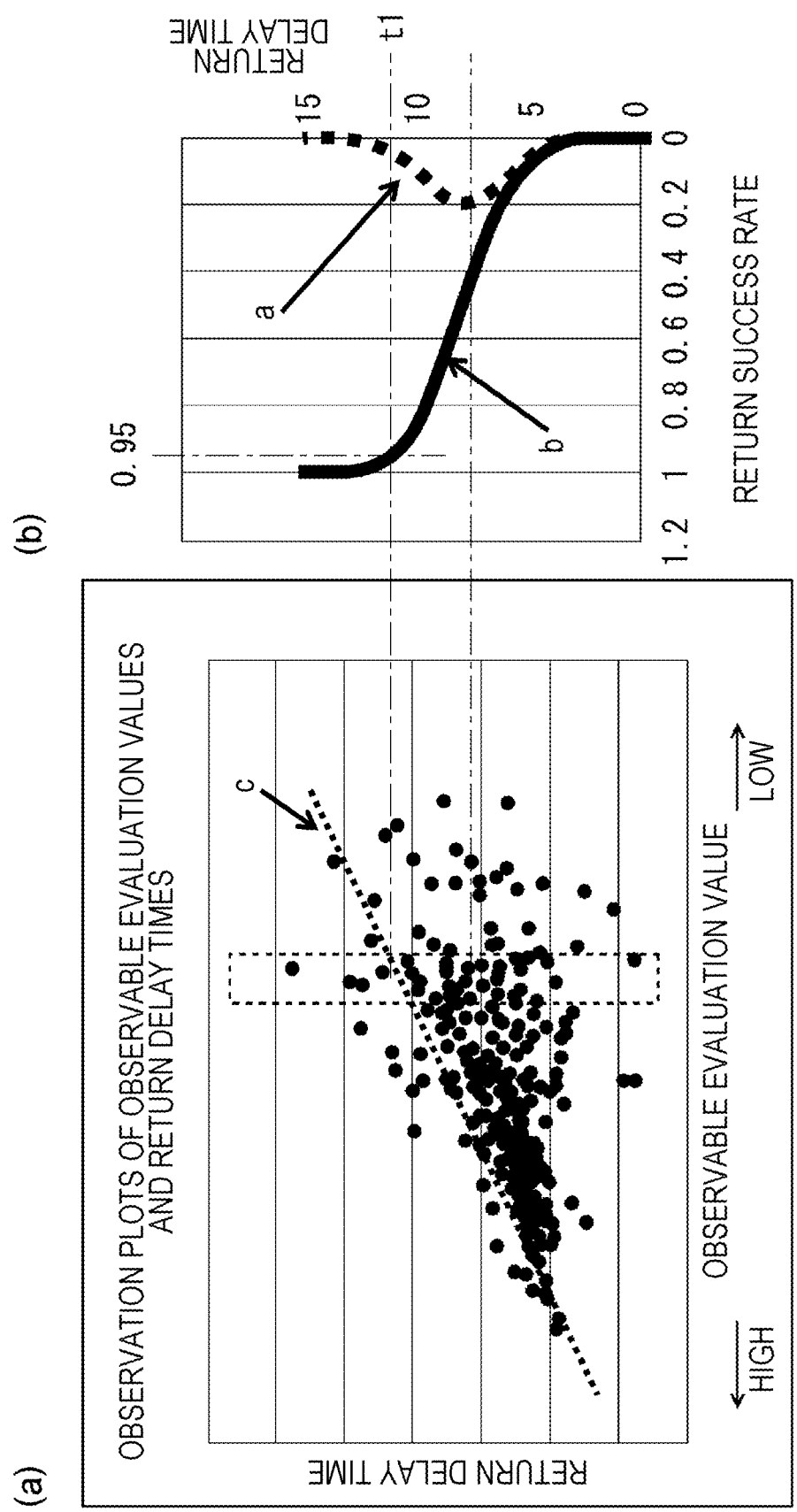
FIG. 26 is graphs for explaining an example distribution of a plurality of pieces of relation information (observation plots) about observable evaluation values corresponding to observation values and return delay times (=manual driving resumable times), and return success rates.

FIG. 26(a) shows an example distribution of a plurality of pieces of relation information (observation plots) about observable evaluation values corresponding to observation values and return delay times (=manual driving resumable times). This example corresponds to the type of a certain secondary task of a certain driver. To calculate a return delay time from the plurality of pieces of relation information (observation plots), the relation information (observation plots) in a region (indicated by a dashed-line rectangular frame) having a certain width in the evaluation value direction corresponding to acquired observation values is extracted. A dotted line c in the graph represents the boundary line at a time when a return delay time having a return success rate of 0.95 in FIG. 26(b) described later was observed with different observation values of the driver.

In this region, it is possible to guarantee a successful return of the driver from automatic driving to manual driving at a rate of 0.95 or higher by issuing a return notification or a warning for switching from automatic driving to manual driving to the driver, with a longer extra time than the dotted line c or with an earlier extra time being allowed. Note that the target value (Request for Recovery Ratio) at which the driver appropriately returns from automatic driving to manual driving in each case is determined from the necessity in the road infrastructure, for example, and is supplied to each passing vehicle in the zone.

Note that, in a case where the vehicle does not become a hindrance to the surroundings even when the vehicle stops on the road, the vehicle is only required to stop and decelerate to a velocity the system can cope with. Normally, it is not preferable to stop a vehicle on a road. Therefore, a high return rate is desirable in the default setting, and, in some cases, an extremely high return success rate is set as the default value even when update information has not been supplied from the infrastructure in a specific route such as the Metropolitan Expressway.

FIG. 26(b) shows the relationship between the return delay times and the return success rates obtained from the plurality of extracted pieces of relation information (observation plots). Here, a curve a indicates the independent success rates with the respective return delay times, and a curve b indicates the cumulative success rates with the respective return delay times. In this case, a return delay time t1 is calculated on the basis of the curve b, so that a predetermined success rate can be achieved, or the success rate becomes 0.95 in the example shown in the graph.

This calculation process is performed at the safety determination unit 210 described above with reference to FIG. 21, for example. For example, the calculation process is performed at the safety determination unit 210 using distribution information about a plurality of pieces of relation information (observation plots) about the observable evaluation values and the return delay times acquired in the past and stored in the storage unit 240.

Figure 27:
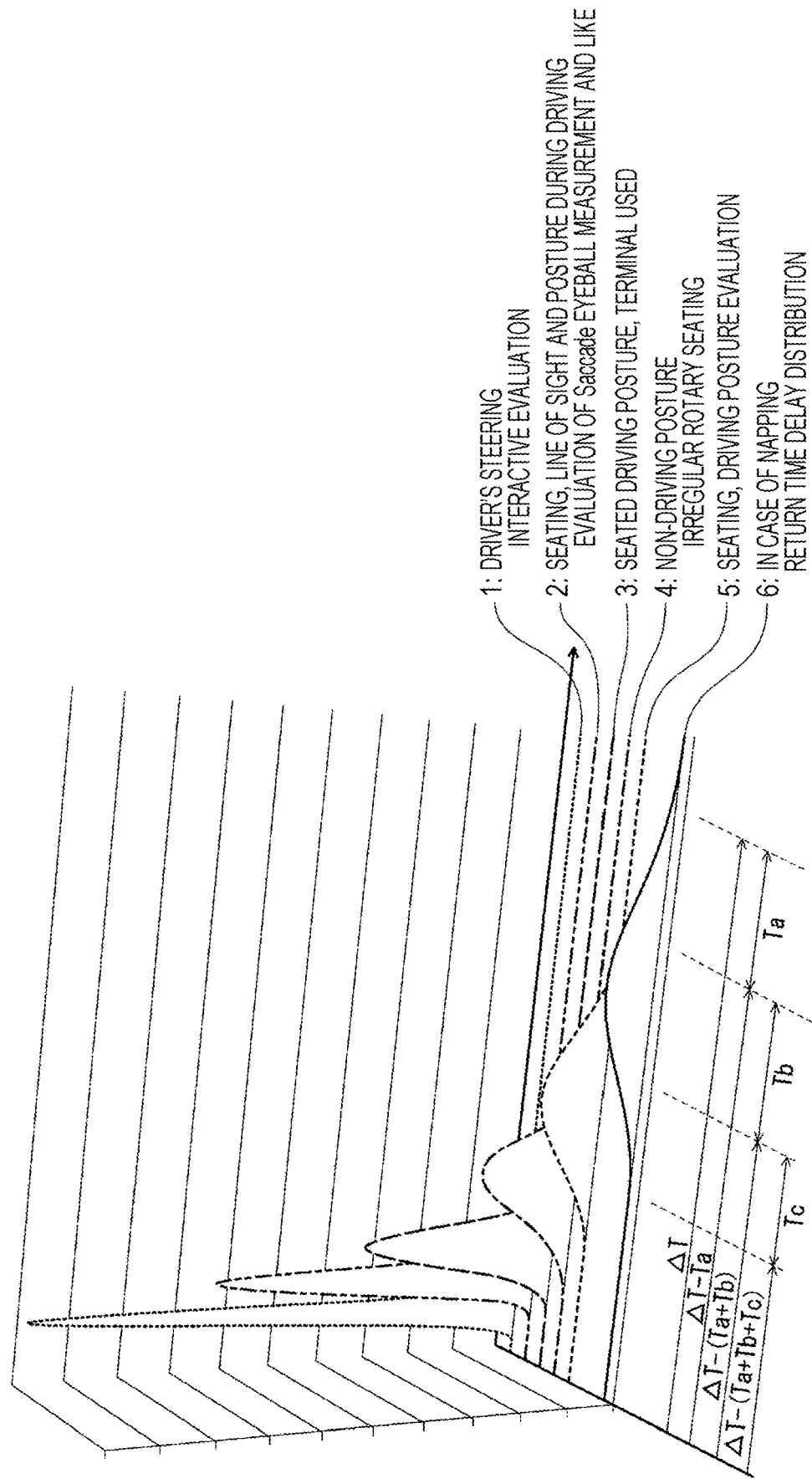
FIG. 27 is a diagram for explaining a manual driving resumable time that depends on the type of the process (secondary task) being performed by the driver in an automatic driving mode.

FIG. 27 is a diagram for explaining a manual driving resumable time that depends on the type of the process (secondary task) being performed by the driver at a time when he/she is in a state of withdrawal from the driving/steering operation in the automatic driving mode.

Each distribution profile corresponds to the curve a predicted on the basis of observation values or the driver's state, as shown in FIG. 26(b). That is, to complete transition from automatic driving to manual driving at the transfer point with the required return probability, monitoring is performed to determine whether a state in which an actual return becomes necessary has been reached at each return stage on the basis of time t1, at which the profile (the return success rate profile in FIG. 26(b)) has a desired value, referring to the past characteristics required for the driver to return to manual driving, from observation values with which the driver's alertness level detected at each stage can be evaluated.

For example, the initial curve in the case of napping is the average distribution of cumulative totals obtained by estimating the level of sleep from observation information such as respiration and pulse waves passively monitored during the napping period in the automatic driving mode, and observing the return delay characteristics of the driver after issuance of a wake-up alarm. Each distribution on the way is determined in accordance with the driver's state observed after the waking up and during the procedure for moving and returning thereafter. "6. The case of napping" shown in the drawing is observed, and the right timing is determined so that a wake-up alarm is issued in time. The intermediate process thereafter is the return time distribution in the return budget predicted from the observable driver state evaluation value at a prediction intermediate point.

At intermediate points, no violation of the remaining transition time limit that gradually becomes shorter is observed. In a case where there is a risk of violation, measures such as deceleration and generation of an extra time are taken. Note that, in "6. the case of napping", for example, the step of "5. seating" is skipped, and a return starts from "4. non-driving posture and irregular rotary seating". In that case, the process of returning starts from recognizing and understanding the initial situation. Therefore, even for the same item, the posture of "4. non-driving posture and irregular rotary seating" as the development from "6. the case of napping" is the same, but the thought process is in the process of recovering consciousness. In a case where a return starts from situation recognition in the posture of "4. non-driving posture and irregular rotary seating", the distribution becomes longer, because time is required for the situation recognition.

Note that, in some cases, the relation information about observable evaluation values and return delay times of the driver who is currently driving is not sufficiently stored in a storage unit. In that case, the return characteristics information that has been generated on the basis of information collected from the driver population of the same age, for example, and has been stored in the storage unit is used as preset return expected distribution information, so that the return delay time t1 can be calculated. This return information may be used with the same return probability, or a higher return success rate may be set on the basis of the information, because the driver-specific characteristics have not yet been sufficiently learned. Note that, ergonomically, a user who is unfamiliar with use is more cautious, and therefore, an early return is expected at an early stage of use. As the user becomes more familiar with use, the driver adapts himself/herself to actions in accordance with notifications from the system. Note that, in a case where different vehicles are used in logistics business that operates a large number of vehicles, bus or taxi services, or car sharing or rental business, driver individual authentication is performed, and observable information and return characteristics of driving are centrally or dispersedly managed and learned by a remote server or the like. The data of the return characteristics is not necessarily stored in each vehicle, but a remote learning process and storing may be performed.

Further, because the notification timing is important, a return success rate is the time required before a certain level of success is achieved as described above. However, the level of success in switching from automatic driving to manual driving is not limited to binary determination, but the determination may be further extended to return transition quality. That is, a delay time in the return process transition to actual return confirmation, a delay in a return state in response to a notification, a stop in an intermediate return operation, and the like may be further input as the evaluation values of quality of return within an allowed time, to the learner.

Referring back to FIG. 25, in step S44, a notification for prompting the driver to return to driving is issued at the notification timing determined by the return delay time calculated in step S43, which is a time at which the transition event (a transition zone from automatic driving to manual driving, or a cautionary traveling zone from automatic driving) approaches the return delay time. This notification is made as a display process as described above with reference to FIG. 2, for example. Alternatively, the notification may be made in the form of a voice output or vibration of the steering wheel or the seat. For example, in a case where the driver is napping, a notification method for waking the driver from the sleeping state is selected. The process of waking up the driver who is napping is to force the driver to consciously return to a lighter sleep. Although it is possible to ring an alarm without warning, a light notification process may be first performed, and a process of ringing a wake-up alarm may be performed only in a case where there are no reactions, for example.

Next, in step S45, the driver's return transition is monitored. In step S46, a check is then made to determine whether or not a return to driving is possible within the return delay time, on the basis of the result of the monitoring performed in step S45. If it is determined that a return to driving is possible, the driver returns to driving in step S47. After that, in step S48, the learning data is updated. That is, one sample value of relation information (observation plot) about the observable evaluation value and the actual return delay time regarding the type of the secondary task of the driver at the beginning when the above return to driving is performed is added. After that, in step S50, the process comes to an end. Note that, in this embodiment, learning is limited to plotted data generated at each event. In reality, however, learning is determined greatly depending on the previous state (history) before an event occurs. Therefore, multidimensional learning may be performed to further increase the accuracy of estimation of the required return delay time from driver's state observation values.

If it is determined in step S46 that a return to driving is not possible, on the other hand, a deceleration/slow-down evacuation sequence is started until the vehicle stops in step S51. Next, in step S52, a record of a penalty for a failed transition event is issued, and the process then comes to an end.

Note that the record of this penalty is left in the storage unit. There are various modes of penalties, and penalties are not limited to any particular method. Its main purpose is to build an incentive mechanism to encourage the driver to response or react, at an early stage, to a high-quality system notification without a delay or negligence.

For example, in a case where a drop in the quality of the driver's transition is detected, the following penalties will be imposed on the basis of the record:

limiting the maximum velocity of the traveling vehicle;
forcible guidance to an evacuation site;
temporary evacuation to a service area, and forced acquisition of break time;
generation of rumble strips pseudo-vibration at the steering wheel or the seat;
warning sound output;
increase in insurance premium burden;
unpleasant feedback such as a foul odor; and
a penalty fee.

The above penalties are imposed, for example.

When such short-, mid-, and long-term penalty feedback is constantly made in this manner, the feedback acts on the human behavioral psychology from an ergonomic point of view, and avoidance behaviors become habitual or turn into an important mechanism for increasing safety.

Note that, if the records for improving the behavioral characteristics of the driver are tampered with and invalidated, the function cannot be utilized. Therefore, it is preferable to provide the record data with a tamper-proof configuration.

[7. Observation of the Driver's States Before and after Execution of Notification Processes from the System to the Driver, and a Process of Recording Observation Information]

Next, observation of the driver's states before and after execution of various notification processes from the system (the information processing device) of the vehicle to the driver, such as a manual driving return request notification, for example, and a process of recording observation information are described.

An example sequence of mode switching from the automatic driving mode to the manual driving mode has been described earlier with reference to FIG. 11. However, the timing to issue a manual driving return request notification to the driver varies depending on the state of the driver. For example, as described earlier with reference to FIGS. 3 and 4, in a case where the driver is napping or is away from the driver's seat, a notification at an earlier timing is required. The description below concerns a configuration that enables more appropriate notification issuance by observing the driver's states before and after execution of a notification process from the system to the driver, and performing an observation information recording process that is a process of storing observation information into a storage unit.

As described above, the autonomous driving technology is a technology that enables automatic driving on the road by using various sensors such as a position detecting means provided in a vehicle (automobile). However, to enable this automatic driving, it is necessary to improve the infrastructures such as installing sensing marks on the road.

It will take a considerable amount of time to improve these infrastructures on all roads, and it is expected that automatic driving allowed zones and manual driving zones continue to coexist for the time being.

For example, on a straight road with a sufficient road width such as an expressway, driving is performed in the automatic driving mode. However, in a case where a vehicle leaves an expressway and stops at a desired position in a parking lot, or on a narrow mountain road or the like, it is predicted that it will be necessary to switch the mode to the manual driving mode to perform driving according to an operation being performed by the operator (driver).

While a vehicle is performing automatic driving, the driver does not need to look ahead in the traveling direction of the vehicle, and can take a desired action such as taking a nap, watching TV, reading a book, or sitting backward and talking with a person in the back seat, for example.

In a vehicle that switches between automatic driving and manual driving, in a case where it becomes necessary to switch from the automatic driving mode to the manual driving mode, it is necessary to make the driver start manual driving.

The system of an autonomous driving vehicle distinguishes between the automatic driving allowed zones and the manual driving zones. In a case where a manual driving zone is approaching, the system issues a manual driving transition request to the driver. For example, a notification is made with an alarm or the like.

With the notification from the system, the driver promptly ends the secondary task, which is an operation other than driving, for example, and starts a manual driving return process. However, if the manual driving return process by the driver is delayed, the system determines that it is not possible to entrust the vehicle control to the driver, and decelerates, slows down, or stops and evacuates the vehicle in an emergency process, for example.

This emergency process such as deceleration, slowing down, or stop and evacuation can guarantee safety, and be regarded as a reasonable measure to be taken only for the vehicle. However, if an emergency stop or deceleration is allowed without limitation, for example, the traveling of the vehicles in the vicinity will be hindered, and there is a possibility of a rear-end collision with the vehicle behind, or a traffic jam.

Further, in a case where an accident occurs, or where an incident that might result in an accident occurs, it is necessary to analyze the cause. For those vehicles that are used in social infrastructures, evaluation and analysis of the quality of returns by the drivers in response to requests and the return request timing is important as a great clue for reducing incidents and reviewing the return timing.

In a case where a manual driving zone is approaching, the system of an autonomous driving vehicle can increase the manual driving return success rate by issuing a manual driving return request to the driver at an earlier timing. However, a notification that is issued too early hinders a secondary task that is an operation other than the driving by the driver during automatic driving.

Therefore, it is important to issue a notification (a manual driving return request) to the driver at a timing that is not too early and at a timing with which a sufficiently high manual driving return success rate can be achieved.

There are various kinds of information that can be used in determining this optimum notification timing.

For example, there are various kinds of information, such as past history information such as notifications of return to manual driving and notifications of determined warnings to the driver, (learning) records of driver return characteristics, records of return transition intermediate observable states at the times of event occurrences, records of active responses of the driver to notifications and warnings, records of transition result quality evaluation. Note that these pieces of information are data to be recorded (stored) as observation information acquired by the data processing unit of the information processing device, into a storage unit.

Even if an accident occurs, the factor of the return delay at the time of the occurrence of the accident is analyzed and recorded, so that a large amount of useful information that will lead to correction of errors in behaviors of the driver and improvement of the timings of notifications and warnings by the system can be acquired from the record data stored in the storage unit.

Conventional drive recorders put priority on event data recorders (EDRs) and images captured before and after driving. In autonomous driving vehicles, however, information recording that differs from the simple recording by the conventional drive recorders is expected to be necessary.

An autonomous driving vehicle system will record the return behaviors of the driver during automatic driving, or more particularly, records details of notifications, recognition of notifications, and actual transition from passive monitoring. The autonomous driving vehicle system also advantageously acquires and analyzes information including human behavior characteristics over a long period of time. In this manner, autonomous driving vehicle systems are expected to acquire more analysis information about drivers' behaviors than conventional EDRs and drive recorders.

Also, in the future, automatic driving allowed zones are expected to increase gradually. As a result, automatic driving zones that do not require long-time intervention of drivers are expected to become gradually longer. However, in a case where such long-time automatic driving is performed, the driver's consciousness level drops, or a quick response from the driver cannot be obtained. For example, a typical example of such a situation is a situation where the driver is away from the driver's seat and is napping. Also, there is a light withdrawal from the driving/steering operation, such as watching the scenery while sitting in the driver's seat.

As described above, the state of the driver during automatic driving varies, and the optimum timing for requesting a return to manual driving differs depending on the state. If the state of the driver at the time of issuance of a return request is the initial state, the time required from the initial state to the return to manual driving greatly depends on the initial state. Therefore, it is necessary to constantly observe (monitor) the position and the state of the driver on a regular basis, and determine the notification timing on the basis of the results of the observation.

Note that the monitoring information and the driver's state at the time of the notification can also be used as information for estimating the quality of the return to manual driving when the driver returns to manual driving.

There are various factors related to the quality of the driver's return from automatic driving to manual driving.

For example, the information that can be used in the processes of estimating and evaluating the quality of the driver's return to manual driving includes the information described below.

1. Health management states at the time of (or before) getting in the vehicle
   a. Medical history, epilepsy, seizures, anemia, palpitation, shortness of breath, apnea syndrome, . . .
   b. Sleep quality (pulse, breathing, and roll-over information) and the like
2. Steady observation states in the vehicle
   a. Level 0, Level 1, Level 2, or an equivalent level in an automatic driving/traveling mode in which the driver is constantly prohibited from taking his/her attention away from driving; a driver monitoring system (fatigue evaluation, blink evaluation by PERCLOS (eye opening ratio) or the like, facial expression evaluation)
   b. Biological information observation (pulse, respiration, body odor, exhalation, blood flow, . . . ); in the case of sleep depth observation (REM sleep observation, biological observation, perspiration observation, respiration, pulse wave, eyelids, roll-over, and alpha wave observation)
   c. Behavior observation (napping in a private room, arrangement of deliveries outside the cabin, conference calls away from the seat, . . . )
   d. Response observation (regular and irregular response response request notifications to tablets and the like, new course event occurrence notifications from the LDM, and driver's responses to notifications)

Note that the LDM is so-called local dynamic map (LDM) information that is obtained by constantly updating, with high density, the travel map information about the road on which the vehicle is traveling.

3. Perception, recognition, reactions, and the like with respect to a notification after an approaching transfer point is confirmed
   a. Secondary task suspension, mobile terminal operation suspension, button operation, movie watching suspension, and conference call suspension
   b. Response button operation
4. Responses to notifications and warnings (alarms)
   a. Agile response confirmation
   b. Excessive response confirmation (that occurs in a state of lowered alertness when suppression control is insufficient among nerve reflexes)
   c. Prompt start of return, or acceleration of return procedures when the return process is in progress
   d. No reactions (sleeping or playing a game)
5. Appearances and accuracy of posture recovery behaviors in response to instructions for the driver to return to the driving posture in the driver's seat, and detection of presence/absence of expected behaviors
6. Accuracy of behavior analysis of routine confirmation procedures such as pointing and calling, response speed, and presence/absence of repeated pointing
7. Accuracy of responses to semantic tasks, such as eyesight, sound, visual, and verbal tasks, and detection of presence/absence of expected responses
8. Accuracy of steering correction of noise in vehicle system steering, response speed, and detection of presence/absence of expected reactions 9. Physical and functional inputs to the steering devices
   a. Gripping the steering wheel
   b. Operating the accelerator and the brake pedal
   c. Operating the response pedal (such as a pedal with operability similar to that of the clutch pedal installed in a conventional car with manual transmission, for example)
10. Steering stability after start of manual driving As described above, there is a lot of information that can be used in the process of estimating or checking the quality of the driver's return to manual driving. However, it is difficult to acquire all of the information, and the system is only required to use available information for acquisition and analysis at each time.

The data processing unit of the system (the information processing device) of the vehicle acquires observation information about the driver, and determines the level of alertness, which is the level of consciousness, of the driver, on the basis of the acquired observation information. Further, depending on the level of alertness of the driver, the system controls the notification timing to issue a manual driving return request notification that is a notification of a request for a return of the driver from automatic driving to manual driving.

The driver information that can be acquired by the system can be chronologically classified into the three types described below.

(1) Driver information that can be acquired before the driver gets in the vehicle (2) Driver information that can be acquired after the driver gets in the vehicle (3) Driver information that can be acquired after issuance of a notification to the driver (a manual driving return request notification or the like)

In the description below, the driver information that can be acquired at each of these timings is sequentially described.

[7-(1) Driver Information to be Acquired Before the Driver Gets in the Vehicle]

First, the driver information to be acquired before the driver gets in the vehicle is described. Note that the driver information to be acquired is information that can be used in the processes of estimating and evaluating the quality of the driver's return to manual driving, and further, is information that can be used for determining and updating the notification timing or the like.

Many of the factors that affect the quality of the driver's return to manual driving are derived from the characteristics specific to the driver, such as the driver's fatigue. For example, history information about the physical strength and fatigue before the driver's getting in the vehicle or the like is also information useful in evaluation of return quality.

Therefore, the information listed below is acquired as the information before the driver gets in the vehicle, and is recorded and saved in a storage unit in the system (the information processing device) of the autonomous driving vehicle.

(1) Medical history information (medical history, epilepsy, seizures, anemia, palpitation, shortness of breath, apnea syndrome, . . .

(2) Sleep quality information (pulse, breathing, and rollover information)

(3) Excessive sleep debt (chronic or temporary lack of sleep) till the previous day (sleep quality log information about a sleep support device such as a wearable device and a sleep support application as typical examples)

(4) Fatigue state information (continuous work information, vacation state during a predetermined period such as the last week, observable fatigue information)

(5) Drinking state information (drinking state on the previous day, information about obligation to report to a commercial vehicle driver, and the like)

(6) Working condition information about professional operators (drivers)

(6a) Awakening quality observable information on the day of driving (6b) Daytime action records before driving (6c) Inspection before the start of work The system (the information processing device) of the autonomous driving vehicle records and saves these pieces of biological information about the driver as a pre-driving driver log in a storage unit in the system (the information processing device).

[7-(2) Driver Information to be Acquired after the Driver Gets in the Vehicle]

Next, the driver information to be acquired after the driver gets in the vehicle is described. Note that the driver information to be acquired is information that can be used in the processes of estimating and evaluating the quality of the driver's return to manual driving, and further, is information that can be used for determining and updating the notification timing or the like.

The driver information to be acquired after the driver gets in the vehicle will be described in the following two types.

(a) Driver information to be acquired before issuance of a manual driving return request notification to the driver (b) Driver information to be acquired after issuance of a manual driving return request notification to the driver

[7-(2) (a) Driver Information to be Acquired Before Issuance of a Manual Driving Return Request Notification to the Driver]

First, the (a) driver information to be acquired before issuance of a manual driving return request notification to the driver is described.

After the driver gets into the vehicle and starts driving, the system (the information processing device) of the vehicle continuously observes various states of the driver depending on the travel conditions of the vehicle.

It is expected that the driver's state and the secondary task that is an operation to be performed by the driver during automatic driving will change depending on the steering performance of the autonomous driving vehicle and the allowable automatic driving level.

That is, if fully automatic driving is possible, the driver can sleep, or performs an operation away from the driver's seat. However, in settings that require the driver to monitor automatic driving, look ahead, and hold the steering wheel or the like, the driver is not allowed to sleep or leave the driver's seat.

Driving modes of the vehicle can be classified into driving modes 1 to 7 as shown below, for example.

(Driving mode 1) Manual driving equivalent to a conventional state without any automatic driving support function (Driving mode 2) Manual driving in a state where a function with which the system assists some functions such as a lane keeping assist system (LKAS) and a safe driving support system (ACC: auto cruise control) is enabled.

(Driving mode 3) Automatic driving in an alert state, including following only at a time of driving at low speed such as a traffic jam, and a departure from a stop.

(Driving mode 4) Automatic driving in the full-velocity range in an alert and cautious state, which is limited to use in specified zones such as expressways (Driving mode 5) Fully automatic driving without intervention of the driver in zones where the hardware and software aspects of the infrastructure are constantly managed (Driving mode 6) Automatic driving in automatic driving/traveling zones where automatic driving is allowed with guide driving by a pairing leading vehicle, despite the lack of constant management of the hardware and software aspects of the infrastructure (Driving mode 7) Automatic driving on roads provided with lanes that autonomously enable automatic driving by reducing the traveling velocity to low velocity (including a stop) and using the limited environment recognition function of the vehicle, despite the lack of constant management of the hardware and software aspects of the infrastructure For example, driving levels of the vehicle can be classified as above.

For example, in the case of a vehicle equipped with devices that can be used in (driving mode 1) to (driving mode 3) described above, the driver's state after he/she gets into the vehicle is constantly evaluated in a continuous manner, so that evaluation of fatigue, decrease in the level of alertness, and drowsiness of the driver who is driving can be performed by a driver monitoring process that is performed by the system of the vehicle during manual driving. By this monitoring process, the quality of driving during manual driving, such as detection of microsleep and inattentive driving, is recorded and saved in a storage unit in the system (the information processing device), for example.

While driving is performed under the responsibility of the driver in a zone where conventional, so-called level-2 automatic driving can be conducted, the driver is obliged to pay attention to driving, and is not allowed to be in an unconscious state such as a sleep state. The driver voluntarily performs steering, depending on road conditions and driving conditions. Therefore, it is possible to monitor the driver's conscious state by evaluating the quality of this steering operation.

That is, the driver monitoring system detects a decrease in the driver's attention and consciousness level due to fatigue, drowsiness, or the like during manual driving and semi-automatic driving, evaluates the risk of an accident on the basis of the result of the detection, and further performs a process of issuing a notification to prompt the driver to return to an alert state or to take a break at an early stage on the basis of the result of the evaluation. These are the principal functions of the driver monitoring system.

Processes other than the above functions can also be performed, when an advanced driving assist system (ADAS) that enables partially automatic driving that plays a part in vehicle control, such as a lane keeping assist system (LKAS), a constant inter-vehicle distance maintaining system of ACC (auto cruise control), or an automatic emergency braking system (AEBS), is used.

For example, in a case where influence of an increase in fatigue and drowsiness of the driver, such as a delay in driving/steering, is detected, it is possible not only to prompt the driver to return to an alert state or to take a break at an early stage as described above, but also to perform the control described below as a process for lowering a risk of delay in an accident avoidance behavior of the driver when the driver is driving in a normal alert state without drowsiness.

(a) Lowering the obstacle detection threshold of the obstacle detection function (b) Lowering the collision avoidance determination threshold (c) Changing the settings to make the inter-vehicle distance longer during ACC control (d) Changing the settings for starting a braking operation of the automatic emergency braking system (AEBS) at an earlier stage Note that, when an advanced driving assist system (ADAS) or the like is used, it is necessary to prevent excessive dependence of the driver, and some systems have a dependency prevention function. For example, control is performed to start a braking operation of an automatic emergency braking system (AEBS) at an earlier stage to perform smooth deceleration, but to perform unpleasant sudden deceleration in the latter half of deceleration control. In this manner, the driver is prompted to pay attention and avoid depending on the automatic deceleration function. In a case where such dependence on use is detected, a feedback process may be performed to give the driver a feeling of physical discomfort, and thus, a penalty is imposed on the driver, to cause the driver to avoid the dependence on use. This is also effective as a means of reducing dependence on use. However, sudden deceleration that causes discomfort is merely a means of reducing dependence on use of the automatic deceleration function, and a hierarchical, short-, mid-, and long-term penalty mechanism is necessary. The driver is made to feel various kinds of inconvenience when depending too much on use of the automatic deceleration function, so that an instinctive and intuitive dependence avoidance behavior develops in the driver.

The system (the information processing device) for vehicles records use information about various driving support systems provided in these vehicles, and functional operation history information at the time of use. That is, the information is recorded and saved in a storage unit in the system (the information processing device).

This recorded information is information that will be useful in the later estimation of the driver's state. This information is information about the driver's state while the vehicle is not traveling in a zone where fully automatic driving is allowed. However, being recorded and saved, this information will be useful in the later estimation of the driver's state.

In a case where automatic driving in (driving mode 4) and (driving mode 5) described above can be performed, there is a possibility of existence of an automatic driving allowed zone that lasts over a certain period of time during traveling of the vehicle.

In this case, depending on the road environment and the on-board functions of the vehicle, the driver might stop performing driving/steering and paying attention to driving in an automatic driving allowed zone, and perform a secondary task that is not a driving operation, without paying attention to the surroundings of the road as required during driving/steering.

While the driver is performing the secondary task, the system (the information processing device) of the vehicle can prompt the driver at an appropriate time to return to manual driving, or present information indicating at which timing the vehicle approaches the return point or the like, before the end of the automatic driving allowed zone.

The notification modes, such as the notification timing, choice of a simplified notification, a notification such as a warning to prompt the driver to be alert or attentive, are preferably changeable depending on the state of the driver, the degree of danger in the road zone the vehicle is about to enter, and the like.

In view of this, it is necessary to constantly monitor the driver's state during automatic driving in (driving mode 4) and (driving mode 5) described above.

In (driving modes 1 to 3) described above, with the use of the driver monitoring system, steering information or the like about the driver can be acquired, and a decline in the consciousness level of the driver can be checked. During automatic driving in (driving mode 4) and (driving mode 5), however, it is basically impossible to check the state of the steering and the like being performed by the driver. Therefore, it is necessary to further acquire various kinds of different driver information from the information acquired with the driver monitoring system used in (driving modes 1 to 3) described above.

During automatic driving in (driving mode 4) and (driving mode 5), the driver is in one of the following four types of driver states (states 1 to 4).

(Driver state 1) A state in which the driver is not in the driver's seat (Driver state 2) A state in which the driver is in the driver's seat, but is not in the driving posture (Driver state 3) A state in which the driver is in the driver's seat and maintains the driving posture, but is not able to return to driving immediately (Driver state 4) A state in which the driver is in the driver's seat, maintains the driving posture, and is able to return to driving immediately The system (the information processing device) of the vehicle performs observation to determine which of the driver states 1 to 4 the driver is in, and determines the degree of alertness of the driver in accordance with each driver state.

Specific examples of the respective states, and the driver's states of alertness to be determined by the system (the information processing device) on the basis of the specific driver states are now described.

(Driver state 1) A state in which the driver is not in the driver's seat

Specifically, this driver state 1 is any of the states described below, for example, and, in each state, the system (the information processing device) determines the state of alertness of the driver in the manner described below.

1a. A state in which the driver is napping, lying down in a napping space

The system (the information processing device) determines that the driver's state of alertness in this state indicates a state of complete withdrawal from paying attention to steering, and that the driver is in light sleep or deep sleep.

1b. A state in which the driver is not in the driver's seat, but is in the rear deck and is organizing deliveries and packages The system (the information processing device) determines that the driver's state of alertness in this state indicates a state of great withdrawal from paying attention to steering, and that it is possible to determine whether or not the driver can make situation determination or maintains consciousness, depending on responses from the driver to information notifications (a manual driving return request notification and the like) issued to the driver.

Note that the information notifications to the driver include various notifications other than the manual driving return request notification. For example, the information notifications include various notifications, such as a travel allowed mode change notification accompanying update of the LDM information corresponding to the traveling direction of the vehicle, regular and irregular notifications for prompting the driver to pay attention, and a notification for prompting the driver to consciously make a response. The modes of notifications are not limited to voice notifications such as an alarm, but various notifications such as an output to the display unit of the tablet terminal being carried by the driver are made.

1c. A state in which the driver is engaged in PC work or a conference call in an office space extended from the driver's seat in the vehicle, or is in a relaxed state The system (the information processing device) determines that the driver's state of alertness in this state indicates a state of great withdrawal from paying attention to steering, and that it is possible to determine whether or not the driver can make situation determination or maintains consciousness, depending on responses from the driver to information notifications (a manual driving return request notification and the like).

1d. A state in which the driver is not in the driver's seat, and is chatting with the other passenger(s)

The system (the information processing device) determines that the driver's state of alertness in this state indicates a state of great withdrawal from paying attention to steering, and that it is possible to determine whether or not the driver can make situation determination or maintains consciousness, depending on responses from the driver to information notifications (a manual driving return request notification and the like).

(Driver state 2) A state in which the driver is in the driver's seat, but is not in the driving posture Next, specific examples of (driver state 2), and the driver's states of alertness to be determined by the system (the information processing device) on the basis of the specific driver states are described.

Specifically, this driver state 2 is any of the states described below, for example, and, in each state, the system (the information processing device) determines the state of alertness of the driver in the manner described below.

2a. A state in which the driver is checking pay slips, recording pay slips, writing, taking a break, eating or drinking, or the like The system (the information processing device) determines that the driver's state of alertness in this state indicates a state of great withdrawal from paying attention to steering, and that it is possible to determine whether or not the driver can make situation determination or maintains consciousness, depending on responses from the driver to information notifications (a manual driving return request notification and the like).

2b. A state in which the driver is sorting pay slips on a tablet, conducting operation management, texting such as e-mailing or texting on an SNS site, or net browsing The system (the information processing device) determines that the driver's state of alertness in this state indicates a state of great withdrawal from paying attention to steering, and that it is possible to determine whether or not the driver can make situation determination or maintains consciousness, depending on responses from the driver to information notifications (a manual driving return request notification and the like).

2c. A state in which the driver is watching a video

The system (the information processing device) determines that the driver's state of alertness in this state indicates a state of great withdrawal from paying attention to steering, and that it is possible to determine whether or not the driver can make situation determination or maintains consciousness, depending on responses from the driver to information notifications (a manual driving return request notification and the like).

2d. A state in which the driver is playing a game

The system (the information processing device) determines that the driver's state of alertness in this state indicates a state of great withdrawal from paying attention to steering, and that it is possible to determine whether or not the driver can make situation determination or maintains consciousness, depending on responses from the driver to information notifications (a manual driving return request notification and the like).

(Driver state 3) A state in which the driver is in the driver's seat and maintains the driving posture, but is not able to return to driving immediately Next, specific examples of (driver state 3), and the driver's states of alertness to be determined by the system (the information processing device) on the basis of the specific driver states are described.

Specifically, this driver state 3 is any of the states described below, for example, and, in each state, the system (the information processing device) determines the state of alertness of the driver in the manner described below.

3a. A state in which the driver is checking pay slips, recording pay slips, writing, taking a break, or eating or drinking The system (the information processing device) determines that the driver's state of alertness in this state indicates a state of great withdrawal from paying attention to steering, and that it is possible to determine whether or not the driver can make situation determination or maintains consciousness, depending on responses from the driver to information notifications (a manual driving return request notification and the like).

3b. A state in which the driver is sorting pay slips on a tablet, conducting operation management, texting such as e-mailing or texting on an SNS site, or net browsing The system (the information processing device) determines that the driver's state of alertness in this state indicates a state of great withdrawal from paying attention to steering, and that it is possible to determine whether or not the driver can make situation determination or maintains consciousness, depending on responses from the driver to information notifications (a manual driving return request notification and the like).

3c. A state in which the driver is watching a video

The system (the information processing device) determines that the driver's state of alertness in this state indicates a state of great withdrawal from paying attention to steering, and that it is possible to determine whether or not the driver can make situation determination or maintains consciousness, depending on responses from the driver to information notifications (a manual driving return request notification and the like).

3d. A state in which the driver is playing a game

The system (the information processing device) determines that the driver's state of alertness in this state indicates a state of great withdrawal from paying attention to steering, and that it is possible to determine whether or not the driver can make situation determination or maintains consciousness, depending on responses from the driver to information notifications (a manual driving return request notification and the like).

(Driver state 4) A state in which the driver is in the driver's seat, maintains the driving posture, and is able to return to driving immediately Next, specific examples of (driver state 4), and the driver's states of alertness to be determined by the system (the information processing device) on the basis of the specific driver states are described.

Specifically, this driver state 4 is any of the states described below, for example, and, in each state, the system (the information processing device) determines the state of alertness of the driver in the manner described below.

4a. A state in which the driver is engaged in a hands-free telephone conversation The system (the information processing device) determines that the driver's state of alertness in this state indicates a state in which the attention to steering is partially lowered, or that the driver is physically capable of return but in a state of withdrawal from consciousness or in a so-called inattentive conscious state in terms of mentality (judgment ability).

4b. A state in which the driver is SNS texting or e-mailing with one hand

The system (the information processing device) determines that the driver's state of alertness in this state indicates a state in which the attention to steering is partially lowered, or that the driver is physically capable of return but in a state of withdrawal from consciousness in terms of mentality.

In this manner, the system (the information processing device) mounted in the vehicle estimates and determines the state of alertness of the driver in accordance with the detected status (driver state).

Note that the driver monitoring values during automatic driving, which are the depth of sleep and the quality (for example, the speed and the accuracy) of cognitive responses to information notifications are acquired as state detection variable values that affect the driver from awakening to recovery.

Note that, as explained above, the information notifications to the driver include not only a manual driving return request notification, but also various notifications to be issued from the system to a terminal or the like not installed in the vehicle in a case where the driver is operating a tablet, is engaged in a conference call, or is sorting packages on the rear deck, for example. For example, the information notifications include a travel allowed mode change notification to be issued with a change accompanying update of the LDM information about the traveling direction, regular and irregular notifications for prompting the driver to pay attention, a notification for prompting the driver to consciously make a response, and the like. The modes of notifications are not limited to voice notifications such as an alarm, but also include display information to be output to the display unit of a tablet terminal being carried by the driver, wearable devices such as wristwatches, and the like.

The system (the information processing device) analyzes the driver's responses to such various notifications. For example, to notify that the driver has recognized a notification, the driver can return a response indicating the recognition to the system, by performing an operation on the display screen of the terminal being carried by the driver, such as double-tapping the icon of a screen notification response, for example. A response input is not necessarily double-tapping, but an input of a ticking gesture, a clockwise or counterclockwise rotating gesture, or the like may be made to increase detection accuracy, for example.

In a case where the timing of response from the driver is delayed after transmission of a notification, and the lag as a temporal vacancy is long, it can be determined that the driver has opened his/her terminal, but the actual level of consciousness has dropped due to drowsiness.

Note that, in a case where the driver needs to be notified while playing a game, watching a movie, or the like using a terminal, the reproduction of the game or the movie is suspended, and a notification is made. What is important to the system is detection of responses from the driver to notifications and the quality of the responses, and, to analyze the detection and the quality, the system acquires information about response time delays and operation quality.

The tablet terminal described above with reference to FIG. 18 and others can execute secondary tasks such as game playing and movie watching. The tablet terminal can also display the traveling zone approach status. The driver who is performing a secondary task such as playing a game or watching a movie in the main work window can also check the traveling zone approach status.

In this manner, the secondary task execution terminal being used by the driver is preferably a multitask execution device capable of displaying the traveling zone approach status as well. Many tablet terminals and smartphone terminals that are available today can perform multitasking by using sub windows. Further, a video player, a game terminal, a videophone conference system, and the like may be used.

As such a multitask execution terminal is used, it is possible to inform the driver performing a secondary task of the road conditions in the traveling direction, and determine the level of consciousness of the driver or the level of alertness by observing and analyzing the response information.

As described above, the driver information that can be acquired after the driver gets in the vehicle, which is the driver information that can be used in the processes of estimating and evaluating the quality of the driver's return to manual driving, is formed with information that is roughly classified into two types as follows.

(1) Information about passive monitoring performed when a secondary task is detected while the driver is unconscious, such as during sleep (2) Recorded information about evaluation of responses to notifications for checking responses to the system at a time of secondary task detection performed when the driver is conscious, changes in the point of a manual driving return request according to update information obtained from the LDM, and the like The driver information is formed with these pieces of information.

Note that the driver can sleep and perform a secondary task while the vehicle is performing automatic driving. In such a situation where withdrawal of consciousness is allowed, and a point of transition from an automatic driving allowed zone to a manual driving zone is approaching, the system (the information processing device) of the vehicle needs to notify the driver that a return point is approaching, or needs to issue a manual driving return request notification with high precision without delay.

For this purpose, the system (the information processing device) of the vehicle reviews, at any appropriate time, the periodic monitoring cycles and the like for checking the driver's stage. For example, the system reviews the monitoring check intervals and the detection means.

Specifically, if the driver is sleeping, biological signals of the driver are monitored and detected, and thus, the depth of the sleep can be measured. During this light sleep period, which is the so-called REM sleep period, the driver's brain activity is in an awake state. In REM sleep, rapid eye movement, which is the origin of the name, is observed, and such a state can be passively detected with a plurality of observation means. As a return notification or a warning is issued during the light sleep period, the quality of awakening can be improved.

The system further performs control to complete transition beforehand in a zone that is considered safer, in accordance with the safety of the entering road zone, the necessity of intervention of the driver, and the like obtained from the LDM of the itinerary of the vehicle.

For example, in a case where the driver is in deep sleep, and the transition execution zone from an automatic driving allowed zone to a manual driving zone and the road zone that follows are winding roads or the like, it is determined that driving at the lowered alertness level is dangerous, and control is performed to complete transition in a zone that is before the entrance to such road zones and is considered safe.

Note that the system (the information processing device) of the vehicle selects different means depending on determined driver's states and recognizes situations even while the driver is unconscious in sleep or the like. By doing so, the system calculates the notification timing suitable in each situation. At the point where the system determines the notification timing to be appropriate, the system outputs a driver notification, a wake-up alarm, or the like, to issue a notification.

The system further analyzes the driver's behavior in response to this notification.

In the description below, this process is explained in detail.

[7-(2) (b) Driver Information to be Acquired after Issuance of a Manual Driving Return Request Notification to the Driver]

Next, the driver information to be acquired after issuance of a manual driving return request notification to the driver is described. Note that the driver information to be acquired is information that can be used in the processes of estimating and evaluating the quality of the driver's return to manual driving, and further, is information that can be used for determining and updating the notification timing or the like.

In a case where the system (the information processing device) of the vehicle issues a return notification or a wake-up warning to the driver, and the driver then perceives and recognizes the notification, the driver is expected to make some responsive reaction.

Note that the system (the information processing device) of the vehicle issues a notification suitable for the driver state, using the monitoring information about the driver. For example, if the driver is sleeping, a warning with vibration or sound is issued to prompt the driver to wake up. Further, the system recovers some monitoring functions that were stopped while the driver was sleeping, such as a ToF sensor and a camera function that analyze the driver's eye movement and behaviors, from a standby state or a suspended state, for example, and thus, resumes monitoring the driver in detail.

In a case where the driver wakes up from napping, and performs some action such as standing up after waking up and resuming walking, for example, the system (the information processing device) of the vehicle acquires these behaviors of the driver as the monitoring information. On the basis of the acquired information, the system performs an analysis process (alertness analysis) to determine whether the driver is performing an active operation, whether the driver is performing an inactive operation, or the like.

When observing return and transition from napping, the system uses a camera or the like having a three-dimensional measurement function, such as a ToF sensor, for example, and acquires and analyzes information about transition of the upper body standing up, movement of the body position, movement and transition of the driver's seat, transition of seating, seatbelt fastening motion, front road checking motion, and the like.

If the driver is performing a secondary task such as work using a terminal that can respond to the system, such as a tablet terminal, information about responses to notifications from the system, and the checking states of the driver in response to the notifications are acquired and recorded. The acquired information is recorded and saved in a storage unit in the system (the information processing device). Further, responses such as pointing and calling to the front traveling road, pointing confirmation, and attention prompting pointing, for example, can be detected as responses from the driver.

As the modes of notifications from the system (the information processing device), the various methods can be used as follows, for example.

There are notifications by sound, blinking and lighting of a simple light source, and presentation of symbols by matrix display or the like.

As the confirmation responses from the driver who understands these notifications, the various response modes listed below can be used, for example.

a. Grip and pedal operations for haptic inputs to contact media such as the seat and the steering wheels b. Operation inputs via a response pedal or an existing steering device c. Special-purpose button operations, and the like d. Further, operations using a driver-mounted HMI device such as a wristwatch that is wirelessly connected to a device installed in the vehicle by wireless communication, gesture operations using hands, feet, the neck, and facial expressions, for example The system (the information processing device) detects any of these behaviors of the driver, and records the cognitive response of the driver to a notification, for example. The acquired information is recorded and saved in a storage unit in the system (the information processing device). This process makes it possible to check and evaluate the degree of the driver's recognition of the return request. The degree of the driver's recognition of the notification from the system can be evaluated with a reactive response delay amount such as a reaction delay time or posture recovery in response to the notification.

The system (the information processing device) needs to determine whether or not the alertness recovery necessary for the driver to return to manual driving is delayed. This determination is performed as a process of evaluating the quality of the driver's return.

The evaluation criteria for the return quality evaluation include a method of referring to a quantified standard response behavior delay amount statistically derived on the basis of the return characteristics of the average driver population. However, behavior characteristics vary with each driver, and there are vehicles that require immediate measures to be taken in view of the past experience, the vehicle design characteristics, and safety, while other vehicles do not need such measures.

Therefore, a notification process and a return quality evaluation process are ideally performed as processes that match the characteristics specific to each driver and each vehicle. For this reason, it is preferable to perform a learning process by taking into consideration the characteristics specific to the driver and the vehicle, and perform a notification process and a return quality evaluation process suitable for the characteristics specific to the driver and the vehicle, using the learning results.

Further, the system may perform the process described below as a process for evaluating the alert state at a time of the driver's return.

For example, the driver is presented with a visual task as a manual driving return determination task, and the cognitive reactive response in the brain obtained from analysis of minute eye movement in response to the task is analyzed. The cognitive evaluation value obtained from the analysis is recorded. The acquired information is recorded and saved in a storage unit in the system (the information processing device). The method for evaluating the quality of alertness recovery in the brain on the basis of visual behaviors will be described later in detail.

[8. Driver's State Changes and Observation Information at a Time of Transition from Automatic Driving to Manual Driving, and a Return Quality Evaluation Process]

Next, the driver's state changes and the observation information at a time of transition from automatic driving to manual driving, and a return quality evaluation process are described.

Figure 28:
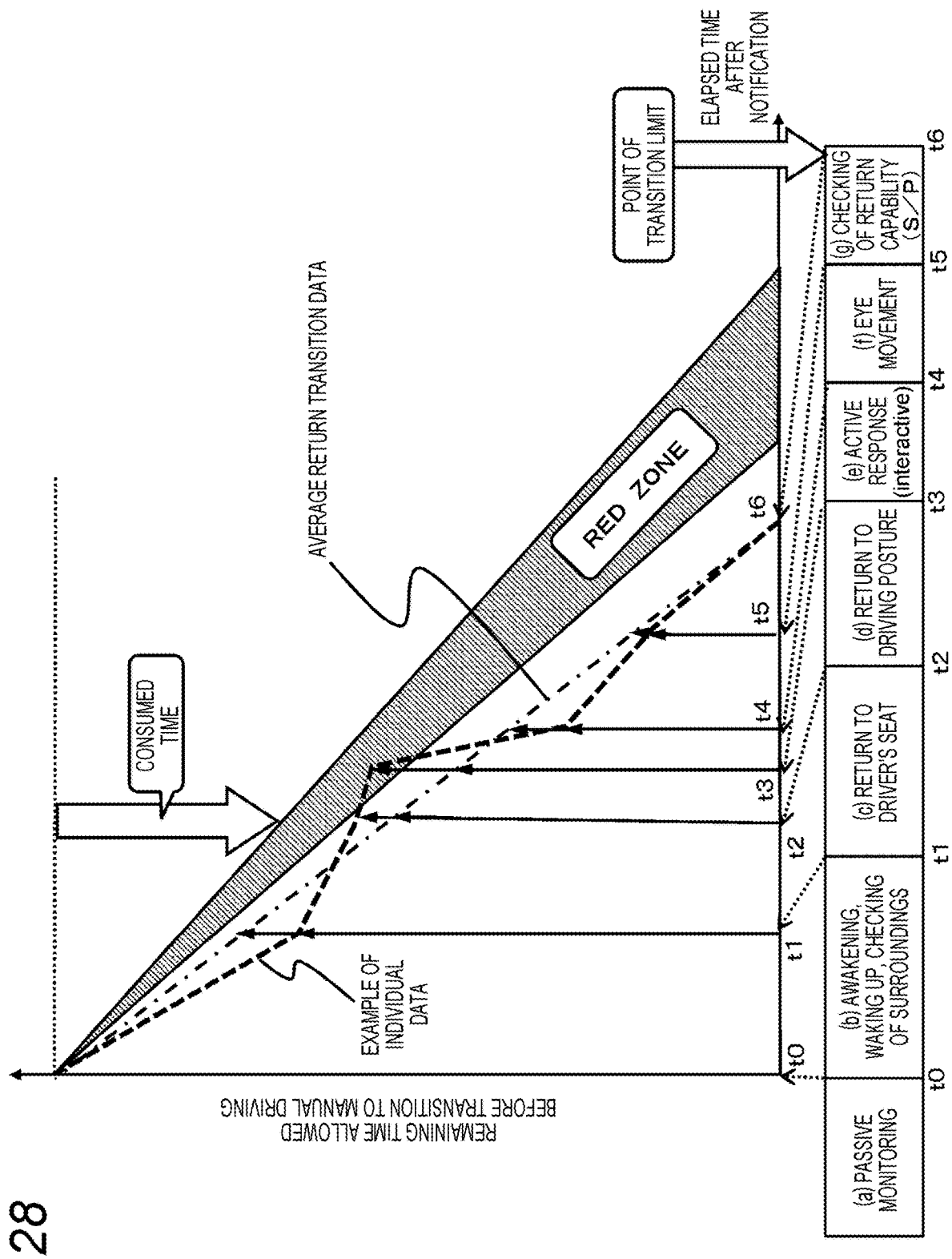
FIG. 28 is a diagram showing a graph for explaining the remaining allowed time before completion of transition from automatic driving to manual driving.

FIG. 28 is a diagram showing a graph for explaining the remaining allowed time before completion of transition from automatic driving to manual driving. The ordinate axis indicates the remaining allowed time before the "point of transition limit", shown at the right end, after the system issues a notification (a manual driving return request notification) to the driver at time t0. The remaining allowed time is shown in conjunction with the elapsed time indicated by the abscissa axis serving as the time axis.

The example in FIG. 28 shows the remaining allowed time in a case where the vehicle supposedly moves smoothly from an automatic driving allowed zone to a manual driving zone, and is traveling at a constant velocity. Note that the ordinate axis in FIG. 28 is the remaining allowed time during constant velocity driving, and accordingly, the ordinate axis can also be regarded as the distance to the actual point of transition limit.

The graph shows the two lines of "example individual-specific data" and "average return transition data".

Example individual-specific data is an example of data based on learning data specific to a certain individual.

The average return transition data is the average value based on a large number of pieces of observation data.

Both are lines that realize transition at a predetermined expected success rate (RRR: Requested Recovery Rate) in a case where transition to manual driving is conducted at the point of transition limit.

On the basis of the monitoring information about the driver, the system calculates the point of notification for causing the driver to perform transition to manual driving at the point of transition limit at the predetermined expected success rate (RRR: Requested Recovery Rate), using a learning dictionary of driver-specific recovery characteristics.

The expected success rate (RRR: Requested Recovery Rate) is now described. The expected success rate (RRR) is data specified in the local dynamic map (LDM) provided by a road information provider, for example. That is, the expected success rate is the rate of success in switching to manual driving expected at each point of switching from an automatic driving allowed zone to a manual driving zone.

The time of arrival at a point of transition from automatic driving to manual driving is represented by t (ToR_point: Take over Request point), and the calculated transition budget (time) for transition at the expected success rate RRR (Requested Recovery Rate) at this arrival time is represented by ΔtMTBT (Minimum Transition Budget Time).

On the assumption of the above, it is necessary to issue a transition notification or a warning before {t (ToR_point)–

ΔtMTBT (Minimum Transition Budget Time)}, prior to the predicted time t (ToR_point) of arrival at the ToR point.

That is, to achieve the expected success rate (RRR) at the approaching transition point, it is necessary to issue a notification (a manual driving switch request notification) to the driver at the monitoring time t(n), which satisfies $$\{t(n+1)-\{t(\text{ToR\_point})-\Delta t\text{MTBT (Minimum Transition Budget Time)}\}\}<0,$$

where t(n+1) represents the next monitoring time, which is Δt later than the monitoring time t(n). This is because it is too late to issue the notification at t(n+1).

In short, to achieve the RRR specified in the local dynamic map (LDM) provided by the road information provider, it is necessary to set the timing of the notification (manual driving switch request notification) at an earlier timing than the time when the minimum transition delay tolerance budget (time) becomes longer than the monitoring cycle period of the driver.

The transition between monitoring states (observation states) shown in FIG. 28, or the change points t0 to t6 between the monitoring states (observation states) (a) to (g) listed below are the points of notification for causing the driver to perform transition to manual driving at the point of transition limit at the predetermined expected success rate (RRR).

For example, when the driver is away from the driver's seat and is taking a nap (before time t0), the system confirms that the driver is taking a nap by passive monitoring.

After the system issues a notification (a manual driving return request notification) to the driver at time t0, the driver's state and the driver's observation state being observed by the system change as shown below in (a) to (g).

(a) Passive monitoring (the system observes that the driver is taking a nap by passive monitoring)

(b) Awakening, waking up, and checking of the surroundings (c) Return to the driver's seat (d) Return to the driving posture (e) Active response (f) Eye movement (g) Checking of the physical return capability (S/P)

The two lines of the "example individual-specific data" and the "average return transition data" shown in the graph are the lines formed by connecting the change points between (a) to (g) listed above after the system issues a notification (manual driving return request notification) to the driver at time t0.

The graph further shows "RED ZONE" in the shaded region. This "RED ZONE" is the zone in which a notification (manual driving return request notification) needs to be issued again to prompt the driver to return to manual driving at an early stage, in a case where the "observation data" of the actual driver enters this zone, for example. This zone is defined in advance.

Note that, as described above, the example shown in FIG. 28 is a graph showing the remaining allowed time before completion of transition from automatic driving to manual driving in a case where the vehicle is traveling at a constant velocity.

Depending on the design of the infrastructure, for example, it is possible to increase the number of lanes in the manual driving switch preparation zones so that the road settings will not cause a decrease in the traffic flow of the entire road even if the vehicle velocity is lowered. It can be said that the tollhouses on expressways and the like are designed based on that concept.

The graph shown in FIG. 28 is changed depending on infrastructure conditions. For example, in a case where the velocity is lowered to perform deceleration control before the transition point, and control is performed to extend the time of arrival at the transition point, it is necessary to generate and use a graph that reflects the control.

The zone shown as "checking of the physical return capability (S/P: (Somatic/Physical))" immediately before the "point of transition limit" at the right end is the period during which the driver starts partial steering of the actual vehicle, and somatic/physical actual steering evaluation is performed in this zone. The system completes the entrusting of the transition to the driver when it is confirmed that numbness in the driver's limb and the steering device to be corrected are actually controlled within an expected range.

As described above, the example shown in FIG. 28 is an example case where the driver is supposedly away from the driver's seat and is supposedly taking a nap. This example shows the remaining time in a case where the vehicle travels at a constant velocity until reaching the point of transition to manual driving. Since the graph is drawn with a constant velocity as described above, it is possible to regard the remaining time as the distance to the point of the actual transition limit.

In the description below, specific state changes of (a) to (g) are explained.

(a: before t0)

First, during the passive monitoring period before time t0, the system (the information processing device) of the vehicle performs monitoring to determine at what timing the notification and awakening should be conducted, and whether to issue a notification or to ring a wake-up alarm.

In this example case, the driver has completely withdrawn from the driving in an automatic driving allowed zone. Specifically, the driver is supposedly taking a nap.

In a case where the system detects that the driver is asleep during the passive monitoring period before time t0, the system needs to calculate the optimum timing to ring the wake-up alarm at a stage before the transition process.

It is preferable to cause the driver to be wide awake and perform transition in a zone that is safe for transition. In view of this, the system selects the optimum transition execution zone, on the basis of the LDM information about the road environment, which is the so-called local dynamic map (LDM) information obtained by constantly updating, with high density, the travel map information about the road on which the vehicle is traveling.

For example, the system acquires, from the LDM, zone information for completing transition in a straight road zone where safe transition from automatic driving to manual driving can be performed, or in a zone where the influence on the other traveling vehicles in the vicinity can be reduced even if deceleration, emergency evacuation, or stopping is performed when transition is not smoothly performed.

For example, the system comprehensively detects a low degree of risk, a low impact, and a light sleep zone, and then determines the notification timing for issuing a notification.

That is, the actual notification and the actual warning point are determined in the last road safety zone segment where the driver has a light REM sleep in the traveling route, in the last zone where the risk of traffic congestion is low even if an emergency stop is made, or the like. This is because, even if the transition point is not in a straight zone on a road but in a narrow mountain road zone where vehicles cannot pass each other, or even if an awakening notification or a warning is made in a zone where the driver has entered deep sleep past the REM sleep, for example, it is possible to avoid a dangerous situation caused by bad awakening or poor road choice made immediately after awakening.

(b: t0 to t1)

On the basis of the monitoring information about the driver, the system calculates the point of notification for causing the driver to perform transition to manual driving at the point of transition limit at the predetermined expected success rate (RRR: Requested Recovery Rate), using a learning dictionary of driver-specific recovery characteristics.

After the system issues a notification to the driver at time t0, the driver awakens and starts waking up after time t0.

The system detects the driver's awakening with a ToF sensor or a camera, and this detection information enables evaluation of the driver's behaviors.

The length between time t0 and t1 is a budget allocated from the data calculated by a learning process of calculating the time required for awakening and waking up to achieve the predetermined expected success rate (RRR), and is the maximum allowable time. The average return transition data is indicated by a dot-and-dash line. A thick dashed line (example observation data) shown in the graph is an example of observation data.

If this example observation data is along the average return time indicated by the dot-and-dash line, there is no delay.

Since the remaining allowed time indicated by the ordinate axis decreases with time, it becomes difficult to perform a return to achieve the predetermined expected success rate (RRR) if a recovery delay equal to or longer than a certain length occurs. In a case where the return is delayed to "RED ZONE" indicated by the shaded region, it is necessary to issue a return warning to the driver again to prompt an early return. In combination with observable driver return status information, information for prompting an early return also serves as effective return quality evaluation information.

(c: t1 to t2)

The zone shown between time t1 and t2 is the zone where the driver is expected to move the driver's seat. If there is a delay into the "RED ZONE" indicated by the shaded region, a warning alarm or the like is issued to prompt an early return. The system observes the driver's return to the driver's seat, on the basis of the information acquired by a ToF sensor or a camera, for example.

(d: t2 to t3)

After moving to the driver's seat and sitting down, the driver needs to adjust the driving posture. In a case where the driver will develop a habit of frequently leaving the driver's seat and returning to the driver's seat in the future, the use of a rotating seat as the driver's seat will be expected in the form of a more flexible seating posture so that the driver will be able to quickly return to the driving posture and will not be restricted by the steering posture in the driver's seat.

The system performs monitoring to determine whether the necessary return procedures, such as returning to the seat that has rotatively moved from the driving position, rotating the seat back to the driving orientation, and fastening the seatbelt, are appropriately taken by the driver. This return procedure evaluation is performed by detection of the rotating seat's return to the driving position, a seating sensor, detection of a body temperature distribution and biological signals, a fastened seatbelt sensor, and the like, in addition to posture tracking by a ToF sensor and a camera. On the basis of chronological detection information, return quality can be evaluated.

(e: t3 to t4)

Between the driver and the system, interactive checking and responding operations are performed, such as a visual check of attention information about the manual driving entry zone and the forward moving direction, which are expected after the driver returns to the seating posture required for manual driving and past the transition point at which the return request has been received. Through this process, the system determines whether or not the driver is responding by following a correct thinking process.

In a case where the driver is not fully alert or is unconscious, it is difficult for the driver to respond correctly to the system. Even if the driver who has not fully regained consciousness responds, the response result is far from the expected response.

The interactive response checking processes to be performed by the system include various processes, such as a check as to whether or not the driver is holding the steering wheel with an appropriate grip strength, a check as to whether or not the appropriate pedal is being pressed, and meaningful questions and answers by audio AI recognition, for example.

Note that a response method that troubles the user is disliked, and therefore, a means for obtaining a simplified and early response result is desirable.

As an interactive response checking method, evaluation of gestures is also useful. For example, the driver visually checks the front road direction while pointing a finger forward for a visual check as in a pointing and calling operation, and such a gesture is evaluated.

A delay in the driver's movement, the accuracy of pointing and calling for evaluating the positional relationship between the eyes and the pointing finger and the front road, and the like can be acquired and recorded as the return quality. That is, the information can be recorded and saved in a storage unit in the system (the information processing device).

(f: t4 to t5)

The eye movement between time t4 and time t5 is "saccadic", and the zone is for evaluating overall high-speed movement of the eyes and particularly relates to vision among the response characteristics of the driver.

The eyes have movement caused by a reflexive behavior that cancels their rotational movement or the like accompanying movement of the semicircular canals, and saccade movement that moves the central visual field at high speed in response to risk information about a moving object captured in the peripheral visual field.

Further, judgment is made on the basis of the memory in the process of perceiving, recognizing, and determining an object captured substantially in central visual field. Therefore, fixation and behaviors in the vicinity such as microsaccade, tremors, and drifting develop. Further, if the stimulus priority on events that attract attention is below a certain level, the driver finishes determining visual information and recognizes the information, and as a result, the driver directs the line of sight to the object while reaching a required conclusion.

In particular, the latter behavior is often involved in comprehension and judgment in the brain, and accordingly it is possible to estimate an alert state on the basis of this observation result. The factors that cause saccade movement to move the line of sight to a new target include various kinds, such as other risk factors that enter the peripheral visual field, stimuli associated with sounds such as sirens, impacts, and stimuli associated with memory. As a result, the detection, the occurrence frequency, and the duration of this eye movement vary greatly among individuals, through there are tendencies depending on situations, driving experiences, degrees of fatigue, and the like. On the other hand, the quality of recovery of the driver's level of alertness is evaluated on the basis of stable behaviors of the driver who is in an alert state, and thus, the driver's level of alertness can be evaluated.

When the driver turns his or her line of sight to check the surrounding environment information while the vehicle is performing automatic driving, it is necessary to pay attention to various risk factors. To analyze the driver's line of sight, it is possible to use a method of generating a semantic saliency map (a predicted attention distribution map of each object included in the scene) from the front scene in the traveling direction of the vehicle, and analyzing movement of the driver's line of sight on the map, for example. However, the roads on which the vehicle travels are diverse, and movement of the driver's line of sight often differs from expected movement, which makes stable observation of behaviors difficult.

There is a limit to the time allowed for determining the level of alertness at a time of transition from automatic driving to manual driving. Therefore, it is effective to artificially present a certain task in a short period of time, prompt eye movement at the time of checking the task, and perform stable evaluation of eye movement. That is, what is to be analyzed is not the movement of the eyes with respect to the scenery that accidentally appears ahead while traveling, but the movement of the eyes with respect to a task mechanically presented by the system. By the evaluation method, it is possible to present transition attention information to a matrix information presenting device, and the movement of the eyes of the driver with respect to the presented information is analyzed. Thus, the level of alertness of the driver can be evaluated.

(g: t5 to t6)

The zone shown as "checking of the return capability (S/P)" between time t5 and time t6 is the period during which the driver starts partial steering of the actual vehicle, and somatic/physical actual steering evaluation is performed in this zone.

When the system determines that the driver can substantially start a return to manual driving, the vehicle starts traveling in accordance with the driver's steering on the steering devices. Alternatively, while evaluating the quality of the driver's steering on the steering devices and the actual steering validity, the system performs control to gradually reduce intervention in automatic driving control, and increase the dependence on the driver's manual driving.

Note that, as the final check before the return of the driver to consciousness, the system may inject noise so that the driver needs to perform corrective steering.

Specifically, the system intentionally performs an incorrect steering operation or the like, and then determines whether the driver can perform corrective steering properly. In a case where a delay in corrective steering is observed, or where appropriate corrective steering is not observed, the driver is still in a confused state of thinking. That is, the driver is evaluated as being in an insufficiently alert state. In a case where transition to manual driving/steering has been started, the driver needs to avoid performing half-hearted, system-dependent manual driving.

Although not described in the above procedures that are not return procedures, one of the important steps from the viewpoint of acquisition of the observation information to be recorded and saved in the storage unit in the system (the information processing device) is an operation of checking whether the system's status switching from automatic driving to manual driving has been completed by the driver.

Normally, in a case where the driver makes a stats check to determine whether the vehicle is in the automatic driving mode or the manual driving mode, the driver visually checks a symbol notification mark or the like displayed on the control panel or the like.

If automatic driving is frequently used in the future, there is a possibility that, in a case where the vehicle is in the manual driving mode, the driver will wrongly think that the vehicle is in the automatic driving state, and abandon the manual driving. In such a case, a serious accident might occur. Therefore, even in the "checking of the return capability (S/P)" zone between time t5 and time t6, the driver observation is preferably continued, and the driver's state, the driver's operation information, and other event observation are preferably acquired and recorded. That is, it is preferable to record execution/non-execution of the driver's operation to check whether the driver clearly understands the traveling mode in which he/she is engaged during manual driving. That is, the information is preferably recorded and saved in a storage unit in the system (the information processing device).

Particularly, when partially automatic driving such as conventional level-2 automatic driving is frequently used, there is a possibility that the driver lacks awareness of manual driving. It is necessary to minimize the possibility, and, according to the delay in the return procedures and the quality record, execution/non-execution of the driver's operation to check the current traveling mode status is recorded and managed during traveling in a mode other than fully automatic driving at level 4 or higher. When the driver fails to perform the checking operation, stepwise penalties are imposed. As such control is introduced, the driver grows to voluntarily and regularly check the usage status of the automatic driving mode. Accordingly, the checked status record is kept, and various penalties are generated on the basis of the record. Thus, the driver becomes accustomed to use manual driving by regularly checking the vehicle's traveling mode in an instinctive and intuitive manner, and becomes able to use both safe automatic driving and safe manual driving.

In other words, at first glance, automatic and seamless switching from automatic driving to manual driving, and automatic and seamless switching from manual driving to automatic driving appear convenient, because the driver does not need to take trouble to switch traveling modes in accordance with the conditions suitable for each traveling mode in the road zones. In other words, such automatic switching is likely to be considered preferable in terms of convenience and from an ergonomic point of view.

However, if such automatic switching is used without any notification to the driver and any check on the driver's recognition of the notification, the driver might not notice that the automatic driving system is not functioning in some cases. In other words, such automatic switching might lead to negligence of the duty of paying attention to the front and the surroundings as required in manual driving, and there is a possibility that a dangerous situation is suddenly caused at any moment. That is, such a transition process seems very driver-friendly in a case where any emergency does not happen. However, when the vehicle is approaching a zone where control accompanying determination by manual driving is required, negative aspects of such a transition process might cause an extremely dangerous situation. To reduce such negative aspects, it is important to record the system state recognition by the driver and use management based on the record as described in the present disclosure. In other words, what is important is the observation information recorded and saved in the storage unit in the system (the information processing device), and its use management. A penalty is an example mode of usage of the record.

Note that the example described above with reference to FIG. 28 is an example in which smooth transition from automatic driving to manual driving is performed while the vehicle is traveling at a constant velocity, and the transition does not disturb the traffic flow in the surroundings of the road.

The system (the information processing device) may perform a process based on road conditions obtained from LDM information about the road environment, or from so-called local dynamic map (LDM) information to constantly update, with high density, the travel map information about the road on which the vehicle travels.

For example, in a case where there are vehicle lanes with different cruising velocities, the process is to move to a low-speed lane before reaching a transition point.

Further, in a case where the density of surrounding vehicles is low, and deceleration does not have influence, the deceleration may be performed to gain an extra time, and control may be performed to enable a safer return. Returning at a constant velocity, which is the surrounding cruising velocity, is not the control to be always performed. For example, in a case where it is determined that the driver's return at the expected success rate (RRR) as expected is difficult even in the middle of the return, the vehicle should be decelerated to put safety first.

In other words, in a case where it is determined that a safety problem will occur, the velocity of the vehicle is lowered even if the deceleration affects the other vehicles in the vicinity. It is also preferable to perform control to put safety first, such as a process of delaying arrival at the point of transition limit, or a process of early evacuation.

Regardless of whether the vehicle performs returning during constant-velocity traveling, or whether the vehicle decelerates and performs returning in accordance with the degree of margin of the road, the system observes return transition, and acquires and records observation values and return quality evaluation values. That is, the information is recorded and saved in a storage unit in the system (the information processing device). On the basis of the recorded data, it is possible to perform analysis to determine whether the driver is performing system-dependent driving or there is an intentional return delay. The result of this analysis process is a great clue to investigate the cause of an accident and the like, for example, and serves as useful data for realizing safe vehicle traveling. Further, the mechanism for repeatedly imposing a penalty for degradation of return quality is effective for the driver to acquire the habit of taking voluntary measures at early stages, and can reduce excessively system-dependent use.

As described above, the example shown in FIG. 28 is a graph in which the system issues a notification (a manual driving return request notification) to the driver at time t0 while the driver is away from the driver's seat and is napping, and the change points between the driver states and the driver observation states ((a) to (g)) observed by the system are connected.

In a case where the system issues a notification (a manual driving return request notification) to the driver at time t0 while the driver is napping, the driver's state and the driver's observation state being observed by the system change as shown below in (a) to (g).

(a) Passive monitoring (the system observes that the driver is taking a nap by passive monitoring)
(b) Awakening, waking up, and checking of the surroundings
(c) Return to the driver's seat
(d) Return to the driving posture
(e) Active response
(f) Eye movement
(g) Checking of the return capability (S/P)

These state changes (a) to (g) are state changes specific to a case where the initial state of the driver is a napping state.

The transition of the driver's state and the observation state of the driver being observed by the system varies depending on the initial state of the driver.

FIG. 29 is a diagram showing examples of transition of state changes and transition timings corresponding to different initial states of the driver.

FIG. 29 shows examples of transition of state changes corresponding to the four different initial states of the driver listed below.

(1) A case where the driver is taking a nap in a napping space
(2) A case where the driver is not in the driver's seat and is awake (in an awake state)
(3) A case where the driver is in the driver's seat but not in the driving posture
(4) A case where the driver is performing a secondary task while in the driving posture The case (1) where the driver is taking a nap in a napping space corresponds to the example described above with reference to FIG. 28. That is, the driver's state and the driver's observation state being observed by the system change as shown below in (a) to (g).

(a) Passive monitoring (the system observes that the driver is taking a nap by passive monitoring)
(b) Awakening, waking up, and checking of the surroundings
(c) Return to the driver's seat
(d) Return to the driving posture
(e) Active response
(f) Eye movement
(g) Checking of the return capability (S/P)

In the case (2) where the driver is not in the driver's seat and is awake (in an awake state), the driver's state and the driver's observation state being observed by the system change as shown in FIG. 29 and as shown below in (h) to (g).

(h) A state in which the driver is not in the driver's seat (the system observes, by passive monitoring and active monitoring, that the driver is not in the driver's seat)
(c) Return to the driver's seat
(d) Return to the driving posture
(e) Active response
(f) Eye movement
(g) Checking of the return capability (S/P)

That is, (a) passive monitoring and (b) awakening, waking up, and checking of the surroundings in the case (1) where the initial state is a napping state are changed to (h) a state in which the driver is not in the driver's seat (the system observes, by passive monitoring and active monitoring, that the driver is not in the driver's seat).

Further, the transition time (t11) from the state (h) to "(c) return to the driver's seat" becomes ahead of the transition time (t1) from "(b) awakening, waking up, and checking of the surroundings" to "(c) return to the driver's seat" in the case (1) where the initial state is a napping state.

This is because the state (h) is an awake state in which the driver's consciousness is clearer than in "(b) awakening, waking up, and checking of the surroundings".

In the case (3) where the driver is in the driver's seat but not in the driving posture, the driver's state and the driver's observation state being observed by the system change as shown in FIG. 29 and as shown below in (i) to (g).

(i) A state in which the driver is in the driver's seat and in an irregular posture (the system observes, by passive monitoring and active monitoring, that the driver is in the driver's seat and in an irregular posture)

(d) Return to the driving posture (e) Active response (f) Eye movement (g) Checking of the return capability (S/P)

That is, (a) passive monitoring to (c) return to the driver's seat in the case (1) where the initial state is a napping state are changed to (i) a state in which the driver is in the driver's seat and in an irregular posture (the system observes, by passive monitoring and active monitoring, that the driver is in the driver's seat and in an irregular posture).

Further, the transition time (t22) from the state (i) to "(d) return to the driving posture" becomes ahead of the transition time (t12) from "(c) return to the driver's seat" to "(d) return to the driving posture" in the case (2) where the initial state is an off-seat state.

This is because the state (i) is a state in which the driver is already in the driver's seat, and the action to return to the driver's seat is unnecessary.

In the case (4) where the driver is performing a secondary task while in the driving posture, the driver's state and the driver's observation state being observed by the system change as shown in FIG. 29 and as shown below in (j) to (g).

(j) A state in which the driver is performing a secondary task in the driver's seat (the system observes, by passive monitoring and active monitoring, that the driver is performing a secondary task in the driver's seat)

(e) Active response (f) Eye movement (g) Checking of the return capability (S/P)

That is, (a) passive monitoring to (d) return to the driving posture in the case (1) where the initial state is a napping state are changed to (j) a state in which the driver is performing a secondary task in the driver's seat (the system observes, by passive monitoring and active monitoring, that the driver is performing a secondary task in the driver's seat).

In this manner, the transition of the driver's state and the observation state of the driver being observed by the system varies depending on the initial state of the driver.

[9. Specific Examples for Checking the Driver's Responses to Notifications from the System]

Next, specific examples for confirming the driver's responses to information notifications from the system of the vehicle are described.

Note that, as described above, information notifications to the driver include various notifications other than a manual driving return request notification. For example, the information notifications include various notifications, such as a travel allowed mode change notification accompanying update of the LDM information corresponding to the traveling direction of the vehicle, regular and irregular notifications for prompting the driver to pay attention, and a notification for prompting the driver to consciously make a response. The modes of notifications are not limited to voice notifications such as an alarm, but various notifications such as an output to the display unit of the tablet terminal being carried by the driver are made.

In the description below, specific examples for checking the driver's responses to these notifications are explained.

(1) Specific Example 1 of a Response Check

Figure 30:
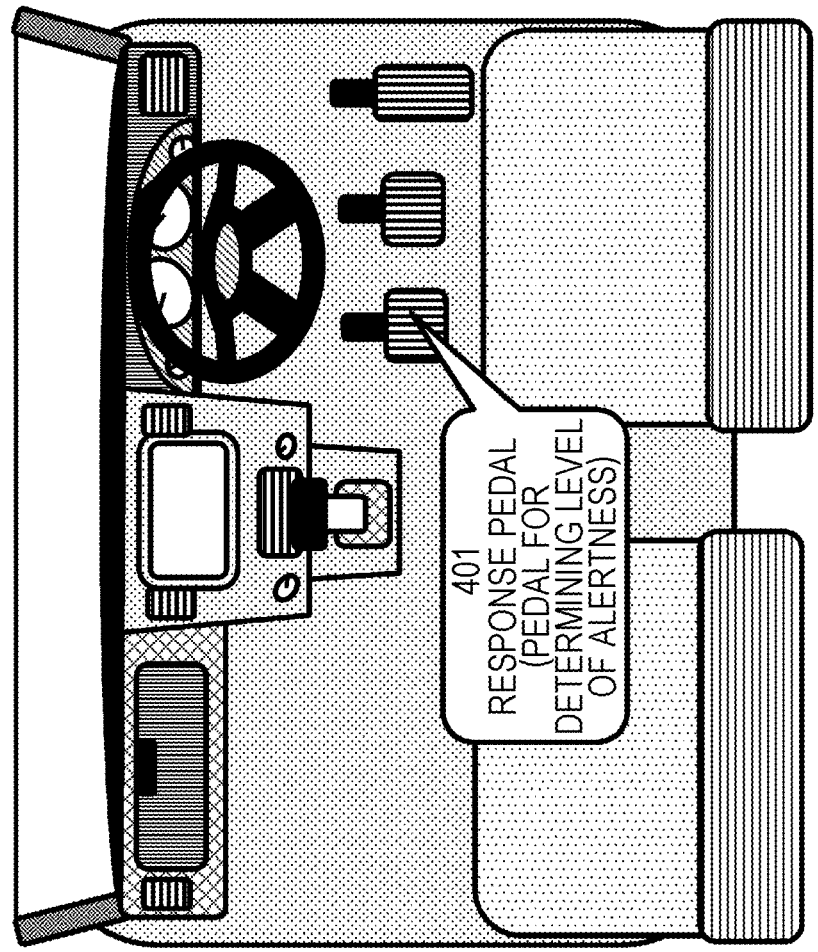
FIG. 30 is a diagram for explaining an example configuration for checking the driver's response to a notification with the use of a pedal.

First, reference to FIG. 30, an example configuration for checking the driver's response to a notification with the use of a pedal is described.

In the case of a conventional car with manual transmission, when changing the gear of the transmission, the driver presses the clutch pedal, disconnects the drive device as the engine and the drive wheel of the vehicle from each other, and then changes the gear. The switching is an indispensable procedure for changing to another gear ratio without damaging the gear in the gearbox.

For example, the system of the vehicle observes the driver's gear changing, to check the degree of consciousness and alertness of the driver. For example, the system causes the driver to perform an operation similar to the gear change as a response to various notifications such as a notification for transition from automatic driving to manual driving. By observing this driver's operation, the system can check the level of alertness of the driver.

Specifically, as a process of responding to a notification from the system to the driver, the driver is made to step on a response pedal (an alertness determination pedal) 401 shown in FIG. 30. That is, the driver is made to step on a pedal with the left foot, and carry out a pedal pressing process, as with a clutch pedal or as in a foot-push parking brake operation.

As the driver is made to operate a pedal in this manner as part of the process specified in a return notification or a return warning, it is possible to notify the system of the situation where the driver has accepted a request for return from automatic driving to manual driving. It is also possible to check whether or not the driver is in a sufficiently alert state, by determining whether or not the driver has performed a correct operation.

Note that specific examples of observation data of operations performed by the driver include measurement values in mechanical operation states, such as the torque generated by pressing a pedal and the operation speed, for example. Alternatively, it is possible to adopt a non-contact optical measurement method for acquiring foot motion analysis data with a stereo camera, ToF, a structured light technique, or the like.

Note that, in a case where optical non-contact observation is conducted, it is preferable to use IR light whose principal components are infrared rays. Using infrared light, it is possible to reduce visibility interference by light that enters the driver's field of view from the direction of the feet.

Further, in the example shown in FIG. 30, the response pedal (the alertness determination pedal) 401 is disposed adjacent to the brake pedal. However, if the driver mistakes the response pedal 401 as the brake pedal, the vehicle is suddenly braked, resulting in a possibility of a rear-end collision with the vehicle behind.

To avoid such a situation, the driver is notified that the correct manner of stepping on the response pedal (the alertness determination pedal) 401 is slowing pressing the response pedal 401 to almost the middle point of the entire pressing amount, for example. Here, notifications are not necessarily temporary notifications during use, and may include a usage guidance and driving training for an automatic driver.

In a case where strong pressing or pressing to the full pedal pressing position is detected in spite of these notifications, it can be determined that the driver was in a hurry, and the level of alertness is insufficient.

Further, as part of the fail-safe mechanism from an ergonomic point of view, in a case where it is determined that the driver feels danger and strongly presses the response pedal (the alertness determination pedal) 401 while mistaking the response pedal 401 as the brake pedal, an automatic emergency braking system, which is a so-called AEBS, may be used to perform control such as an emergency stop. However, in a case where such an operation is detected, a penalty is imposed.

The driver is basically required to carefully and slowly press the response pedal (the alertness determination pedal) 401. If the driver is in a normal awake state, stable pressing that is different from simple reflex pedal pressing should be performed. As the mode of pressing of the response pedal (the alertness determination pedal) 401 is observed in this manner, the level of alertness of the driver can be estimated. That is, when detecting a situation where procedures and operations are not stable, the system repeatedly impose a penalty on the driver. As a result, the driver grows to perform an operation to avoid falling into this penalized state, and this is expected to become a habit. Also, this operation is performed on the basis of careful determination, and is not performed unconsciously as a reflex response.

The methods mentioned below can be used as methods for determining whether the driver is pressing the pedal with a high level of alertness and sufficient consciousness, or whether the driver is pressing the pedal in a state of reduced consciousness during awakening from sleep, for example.

The amount of mechanical fluctuation of the amount of pressing applied to the pedal by an encoder or the like, measurement values of pressure applied to the pedal, and the like can be used.

It is also possible to use data obtained from foot movement analysis according to techniques involving a ToF sensor, 3D Flash Lidar, a sensor based on a structured light method, two-dimensional camera image analysis, a stereo camera, and the like.

With the use of these kinds of data, the quality of alertness of the driver can be evaluated.

Note that, when a pedal operation is analyzed, it is possible to perform determination using a threshold calculated by a statistical method or the like. However, to perform analysis with higher precision, with individual variation being taken into consideration, individual behavior evaluation is repeatedly performed, and analysis using a learning dictionary is preferably performed with machine learning such as a convolutional neural network (CNN).

(2) Specific Example 2 of a Response Check

Next, an example of a response check using eye movement analysis is described.

Another effective means of checking the driver's return to consciousness is eye movement analysis. For example, it has been known that the direction in which the line of sight is turned is analyzed so that the line of sight can be analyzed. As this technology is further developed, and the line-of-sight movement is analyzed at high speed, it is possible to detect movement of the eyes in greater detail.

In minute analysis of eye movement, some movement appears in a bioreflexive manner, but many phenomena appearing at the same time reflecting nerve transmission and processing in the brain are also observed in the movement. Accordingly, the results of activities such as brain cognition are reflected in eye movement and become visible.

The driver's level alertness is estimated with high accuracy, on the basis of the fact that the activities in the brain are reflected in eye movement.

Most of the external world information acquired in a case where a person makes situational judgment necessary for an action is obtained from visual information. When a person perceives and recognizes visual information, and takes action, the person looks at the information, and compares the information with his/her own memory (recorded knowledge). Before the person understands the information in the line of sight, the person exhibits specific eye movement necessary for recognizing visual information, such as fine fixation, microsaccade, tremors, and drifting, while keeping the line of sight in or near the region where the information can be seen.

This eye movement shows different behaviors in a case where the person is in a normal alert state and in a case where the person is in a state of decreased consciousness/alertness.

Figure 31:
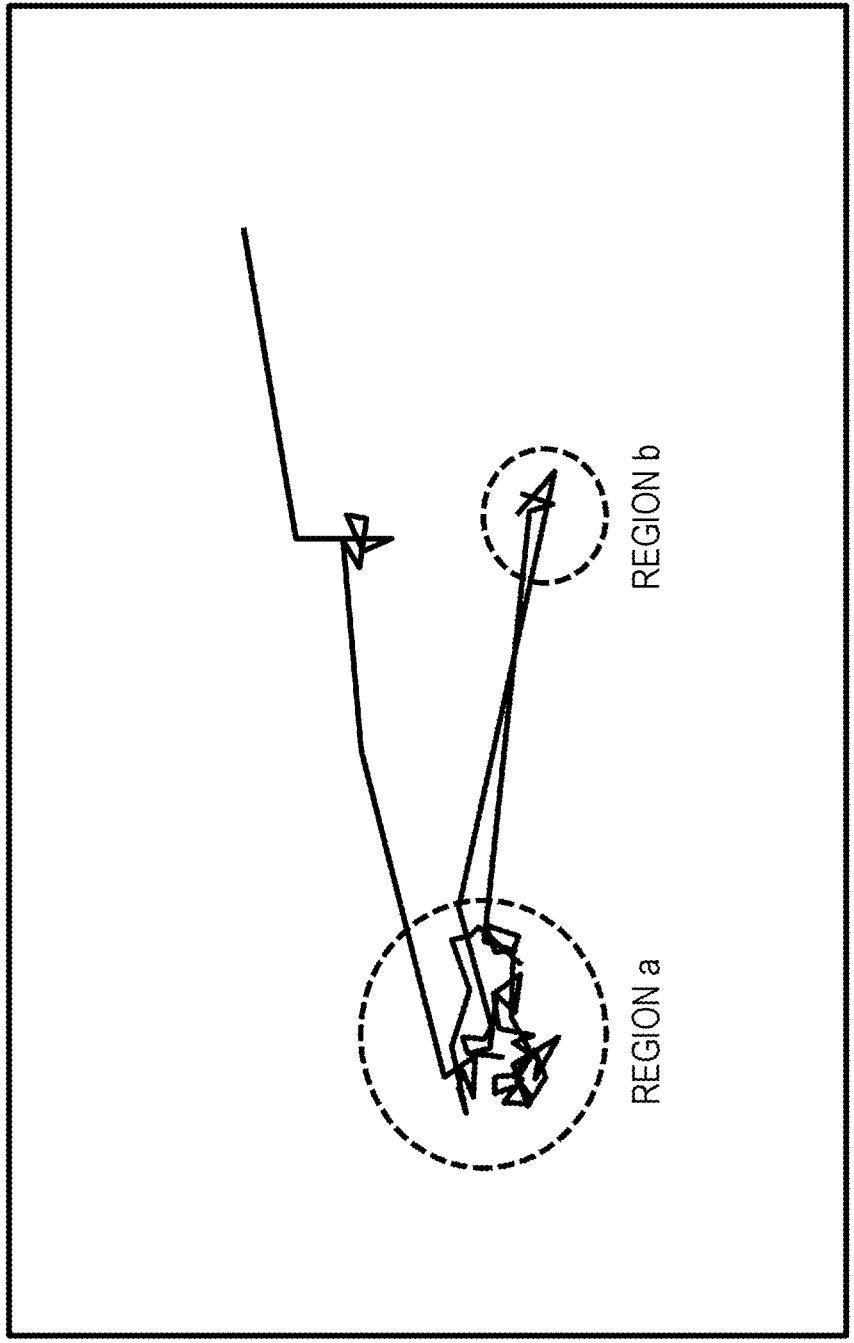
FIG. 31 is a diagram for explaining an example of the trajectory of the driver's eye movement when a visual task is presented to the driver so that the driver looks at certain information.

FIG. 31 shows an example of the trajectory of the driver's eye movement when a visual task is presented to the driver so that the driver looks at certain information.

The example in FIG. 31 shows the trajectory of the eye movement when the person first gazes at the vicinity of a region a, and then gazes at the vicinity of a region b.

In a case where a person tries to understand the contents by visually observing certain information (a task), the person has eye rotation called large saccade as shown in the movement trajectory in FIG. 31, turns the eyes to a predetermined viewing point, and moves the eyes involving fixation and microsaccade in the vicinity.

For example, it is necessary to perform regular monitoring, to check whether or not the driver's consciousness is maintained during automatic driving. To conduct monitoring without excessively troubling the driver, the system presents a symbol that requires some thinking and judging to the driver, for example, and observes the eye movement. In a case where the driver's thinking and checking action with the line of sight is detected as a result of the observation, the driver puts priority on the thinking activity in the brain to deal with the task, and is not immersed in some other secondary task.

Alternatively, the system may detect that the driver's line of sight is directed to the presented information, and may perform a process of determining that the recognition is completed upon further visual recognition of the detection.

Figure 32:
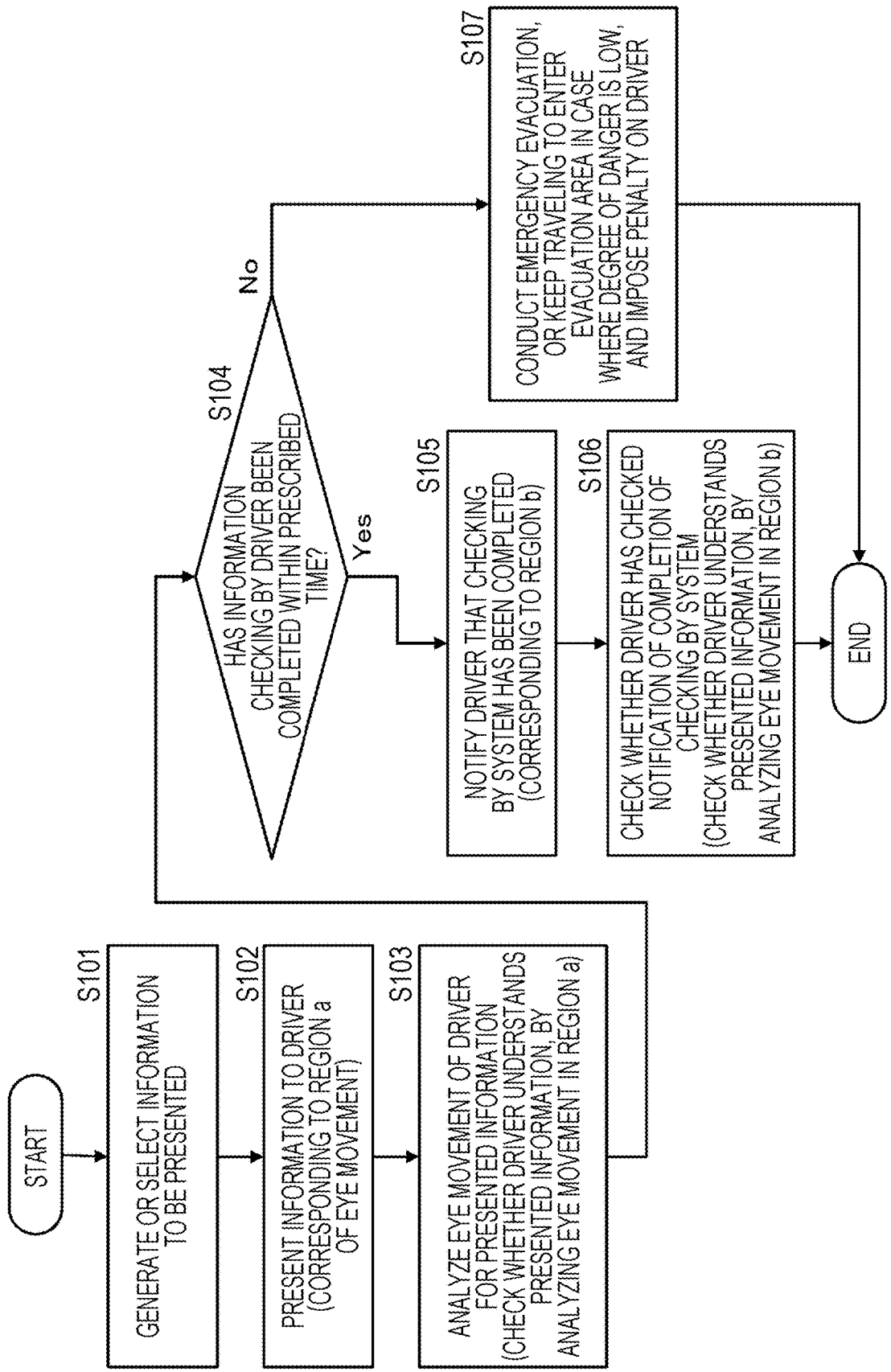
FIG. 32 is a flowchart for explaining a sequence of processes for determining the level of consciousness (the level of alertness) of the driver through a process of observing movement of the eyes of the driver on the basis of an information notification issued to the driver by the system (the information processing device) of the vehicle.

Referring now to the flowchart shown in FIG. 32, a sequence of processes for determining the level of consciousness (the level of alertness) of the driver through a process of observing movement of the eyes of the driver on the basis of an information notification issued to the driver by the system (the information processing device) of the vehicle is described.

The processes in the respective steps shown in the flowchart are sequentially described below.

(Step S101)

First, in step S101, the system selects or generates information to be presented to the driver.

For example, it is presentation information formed with a notification or the like indicating that the timing of switching to manual driving is approaching.

(Step S102)

Next, in step S102, the system performs a process of presenting the information generated or selected in step S101 to the driver.

(Step S103)

Next, in step S103, the system analyzes the driver's eye movement with respect to the presented information.

The driver with a high level of consciousness (level of alertness) has eye movement shown in the regions a and b described above with reference to FIG. 31, or has eye movement accompanied by fixation and microsaccade, for example.

In a case where such eye movement is observed, it can be determined that the driver has recognized the notification information.

(Step S104)

Next, in step S104, the system determines whether the driver has completed the recognition of the notification information within a prescribed time.

That is, the system determines whether or not the eye movement described above, which is the eye movement accompanied by fixation and microsaccade, has been observed. If the eye movement has been observed, it is determined that the driver has completed the recognition of the notification information, and the process moves on to step S105.

If the eye movement has not been observed, on the other hand, it is determined that the driver has not completed the recognition of the notification information, and the process moves on to step S107.

(Step S105)

If it is determined in the determination process in step S104 that the driver has completed the recognition of the notification information within the prescribed time, the system in step S105 notifies the driver that the check (a check to determine whether the driver has recognized the notification) by the system is completed.

(Step S106)

Further, in step S106, the system analyzes the driver's eye movement with respect to the notification information of step S105.

The driver with a high level of consciousness (level of alertness) has eye movement shown in the regions a and b described above with reference to FIG. 31, or has eye movement accompanied by fixation and microsaccade, for example.

If such eye movement has been observed, it is determined that the driver has recognized the notification information, and the process comes to an end.

(Step S107)

If it is determined in the determination process in step S104 that the driver has not completed the recognition of the notification information within the prescribed time, on the other hand, the system takes an emergency evacuation measure in step S107. Alternatively, in a case where the degree of danger is low, the vehicle enters an evacuation area and stops after continuous driving. In either case, the driver will be penalized.

To check a cognitive response from the driver when a notification has been sent to the driver, the system presents information (=an alertness check task) to the driver. In doing so, the system not only looks at the information but also effectively presents a task that requires the driver to understand the contents of the presented information.

An example of the "task that requires the driver to understand the contents of the presented information" is the use of semantic information showing "look right" or "look down" in text, for example. Alternatively, there is a method by which the characters "dog" is presented, and graphical silhouettes including the silhouettes of a dog and other animals similar to dogs are presented to prompt the viewer to select the silhouette of the dog, for example. In this case, the viewer checks whether the silhouette matches the task.

Silhouette information presentation does not necessarily involves normal arrangement, and can effectively include a plurality of silhouettes that are rotated or in complicated postures so as to prompt the viewer to interpret the silhouettes and think. The viewer is expected to move his/her eyes elaborately, to understand the contents of the silhouette. By analyzing this eye movement, it is possible to determine the state of alertness with higher accuracy.

Figure 33:
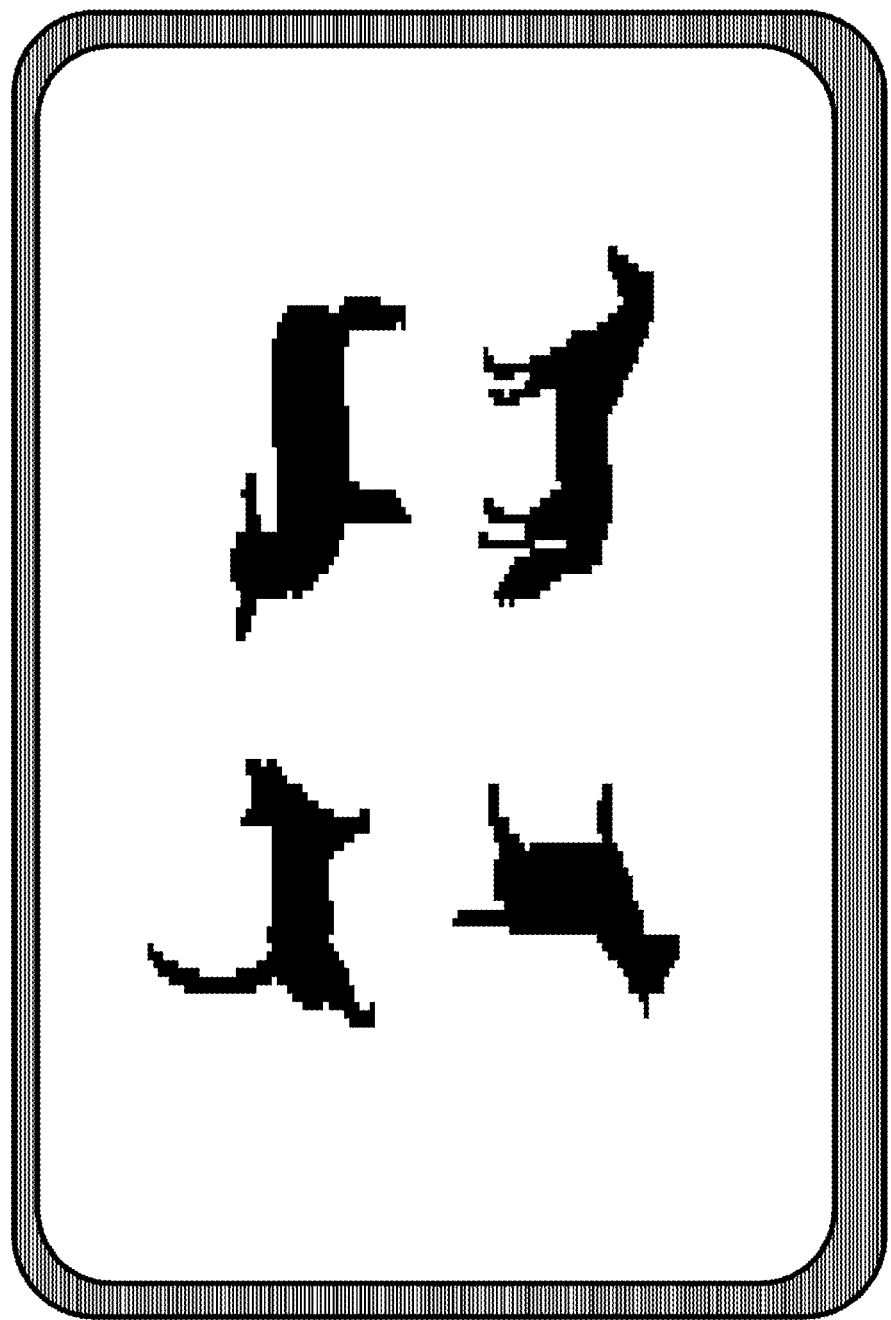
FIG. 33 is a diagram for explaining an example of presentation information for checking the driver's level of consciousness, or the driver's level of alertness.

FIG. 33 is an example of the presentation information for checking the driver's level of consciousness, which is the driver's level of alertness, and is an example of a task of searching for a horse and presentation information formed with silhouettes of four animals. Of these four silhouettes, the lower-right one has a high possibility of being a silhouette of a horse. However, this task is expected to cause fixation and microsaccade so as to check the shape of the tail and the features of the head and the legs to determine whether it is actually a silhouette of a horse.

To accurately understand the contents of presented information that requires detailed observation of information about silhouettes, the viewer not only simply direct the line of sight to the presented information, but also repeats fixation to obtain the features of the visual information and compares the information with memory. In this manner, the viewer completes the judgment.

The occurrence of cognitive and perceptual activities in the brain does not necessarily lead to an accurate answer to the task. What is important is the presence/absence of cognitive activities for recognizing and understanding information, such as saccade, fixation, and microsaccade in search of a quick answer.

That is, to understand contents according to a presented task, the driver performs an information search process with the eye, and exhibit the eye movement characteristics specific to this process.

Note that, in a case where the driver is working at a location away from the driver's seat, for example, a task for eye movement observation is presented to the driver after the driver suspends the work and returns to the driver's seat. As the driver's eye movement with respect to this presented task is observed, the quality of the driver's recovery of alertness can be quantitatively evaluated.

Particularly, in a case where a notification for returning from automatic driving to manual driving is issued, a notification formed with a message or warning information to the driver is displayed on a head-up display (HUD) 421, an instrument panel 422, or the like in the vehicle shown in FIG. 34, for example.

By analyzing the movement of the eyes when the driver visually checks this display, it is possible to evaluate the quality of cognition with respect to the notification. Although detection accuracy varies with observation means, there is no need to limit evaluation to highly accurate detailed analysis of movement of the eyes, but evaluation may be performed with a simpler technique involving recognition of head movement, facial expressions, or the like.

Specific examples of a plurality of response checking processes have been described so far.

In the future, it is expected that general passenger cars will continue to be widely used as a means of flexible transportation between two points, which is the benefit from vehicles. Because of the spread of automatic driving, the enhancement of local dynamic map (LDM) information, and the progress of other software and hardware technologies, it is expected that there will be coexistence of fully automatic driving zones and other various road zones, such as zones in which automatic driving support services and remote support services are available, and zones in which vehicle-to-vehicle communication and guidance by leading vehicles can be used, on the road-zone basis.

The driver is required to smoothly switch the vehicle from automatic driving to manual driving and vice versa, at each boundary between these zones. For example, when a transition failure occurs at a boundary between zones, and measures such as emergency deceleration, slowing down, and stopping are taken, such measures trigger an accident such as a rear-end collision with the vehicle behind, or a traffic jam. Therefore, if it is not possible to smoothly switch from automatic driving to manual driving and vice versa, the sound use of roads as a social infrastructure will be hindered.

For example, in a depopulated area where public transportation such as buses is scarce, a vehicle having an automatic driving function may be used in a case where a user with poor driving ability visits a facility such as a hospital located in an urban area via a highway, from his/her home located adjacent to a general road. In this case, on a route that does not involve any highway, the road traffic is limited, and the possibility of traffic congestion is very low even if the user's vehicle stops. Accordingly, in that zone, the vehicle can move ahead while performing automatic driving at a low velocity.

Further, if the driver has a certain level of steering ability or higher, driving may be performed at a higher speed in accordance with the coping ability of the driver.

Furthermore, in a case where higher-speed driving support is available, higher-speed driving is allowed. Examples of high-speed driving support include LDM information, a leading vehicle that provides automatic driving support, a remote support system, and the like.

It is necessary for the driver to make correct determination as to whether to drive with remote assistance, whether to perform automatic driving with information supplied from the leading vehicle, or whether to perform manual driving with partial automatic driving support, for example. When there are various kinds of zones on the traveling route, it is essential to make this determination correctly for safe driving. For this reason as well, it is important to continuously observe and record the state of alertness of the driver.

In many cases, after the vehicle arrives in an urban area or the like, continuous use of the latest update data of the LDM required for automatic driving becomes possible. This is because environments for supporting automatic driving have already been developed in many commercial areas. Particularly, in the urban centers, there are many vehicles, and the effect of improvement increased by automatic driving is large. Accordingly, it is easy to invest in infrastructures in such areas, and the transportation infrastructure and the like necessary for automatic driving have been developed earlier than in other areas.

While infrastructure development that enables automatic driving advances in urban areas as above, infrastructure development in areas with less traffic lags behind. As a result, the user of a vehicle equipped with an automatic driving function is required to drive while switching between automatic driving and manual driving at any appropriate time.

To enable the driver to switch between automatic driving and manual driving and drive safely in each zone, it is necessary to maintain high return quality when switching between automatic driving and manual driving is performed. As the return quality is maintained at a high level, the occurrence of traffic congestion can be reduced, and the occurrence of induced secondary damage such as a rear-end collision due to an emergency stop or deceleration can also be reduced.

The technology that supports this is maintenance of high return quality at a time when the driver returns from automatic driving to manual driving, and a process of acquiring, recording, and analyzing observation data of the driver.

The data processing unit of an information processing device of the present disclosure performs an observation information recording process. In the observation information recording process, the data processing unit acquires observation information that is part or most of a series of actions of the driver at a time of transition from automatic driving to manual driving or from manual driving to automatic driving, and stores the observation information into a storage unit. Further, the data processing unit analyzes the action delay amount of the driver in respect to a system request that is a request issued from the information processing device to the driver, and stores the result of the analysis, as the evaluation value of the quality of return from automatic driving to manual driving, into the storage unit. On the basis of this return quality evaluation value, the data processing unit performs a process of imposing a penalty on the driver.

[10. Example Configuration of an Information Processing Device]

The processes described above can be performed with an application of the configuration of the moving apparatus described with reference to FIG. 8. However, some of the processes can be performed by an information processing device that can be detachably attached to the moving apparatus, for example.

Referring now to FIG. 35, an example hardware configuration of such an information processing device is described.

FIG. 35 is a diagram showing an example hardware configuration of an information processing device.

A central processing unit (CPU) 501 functions as a data processing unit that performs various kinds of processes in accordance with a program stored in a read only memory (ROM) 502 or a storage unit 508. For example, the processes in the sequence described in the above embodiments are performed.

The program to be executed by the CPU 501, data, and the like are stored in a random access memory (RAM) 503. The CPU 501, the ROM 502, and the RAM 503 are connected to one another by a bus 504.

The CPU 501 is connected to an input/output interface 505 via the bus 504, and an input unit 506 formed with various kinds of switches, a keyboard, a touch panel, a mouse, a microphone, a state data acquisition unit including a sensor, camera, and a GPS, and the like, and an output unit 507 formed with a display, a speaker, and the like are also connected to the input/output interface 505.

Note that input information from a sensor 521 is also input to the input unit 506.

The output unit 507 also outputs drive information for a drive unit 522 of the moving apparatus.

The CPU 501 receives inputs of an instruction, state data, and the like from the input unit 506, performs various kinds of processes, and outputs processing results to the output unit 507, for example.

The storage unit 508 connected to the input/output interface 505 is formed with a hard disk or the like, for example, and stores the program to be executed by the CPU 501 and various kinds of data. The communication unit 509 functions as a transmission/reception unit for data communication via a network such as the Internet or a local area network, and communicates with external devices.

A drive 510 connected to the input/output interface 505 drives a removable medium 511 such as a magnetic disk, an optical disk, a magnetooptical disk, a semiconductor memory like a memory card, and performs recording or reading of data.

[11. Summary of the Configuration According to the Present Disclosure]

Embodiments of the present disclosure have been described so far by way of specific examples. However, it is obvious that those skilled in the art can make modifications to and substitutions of the embodiments without departing from the scope of the present disclosure. That is, the present disclosure is disclosed in the form of examples, and the above description should not be interpreted in a restrictive manner. The claims should be taken into account in understanding the subject matter of the present disclosure.

Note that the technology disclosed in this specification may also be embodied in the configurations described below.

(1) An information processing device including a data processing unit that determines an alertness level that is a consciousness level of a driver of a vehicle, in which the data processing unit acquires observation information about the driver, and determines the alertness level of the driver on the basis of the acquired observation information.

(2) The information processing device according to (1), in which the vehicle is a vehicle capable of switching between automatic driving and manual driving, and the data processing unit performs an observation information recording process, to acquire the observation information that is part or most of a series of actions of the driver at at least one of a time of transition from automatic driving to manual driving and a time of transition from manual driving to automatic driving, and store the observation information into a storage unit.

(3) The information processing device according to (1) or (2), in which the vehicle is a vehicle capable of switching between automatic driving and manual driving, and the data processing unit acquires the observation information that is part or most of a series of actions of the driver at at least one of a time of transition from automatic driving to manual driving and a time of transition from manual driving to automatic driving, and further performs an observation information recording process, to analyze the action delay amount of the driver with respect to a system request that is a request issued from the information processing device to the driver, and store the result of the analysis, as the evaluation value of the quality of return from automatic driving to manual driving, into a storage unit.

(4) The information processing device according to (3), in which the data processing unit performs a process of imposing a penalty on the driver, on the basis of the evaluation value of the quality of return.

(5) The information processing device according to any one of (1) to (4), in which the vehicle is a vehicle capable of switching between automatic driving and manual driving, and, in accordance with the alertness level of the driver, the data processing unit controls a notification timing of a manual driving return request notification that is a notification of request for the driver's return from automatic driving to manual driving.

(6) The information processing device according to any one of (1) to (5), in which the observation information to be acquired by the data processing unit includes observation information about the driver before the driver gets in the vehicle, and observation information about the driver after the driver gets in the vehicle.

(7) The information processing device according to (6), in which the observation information about the driver before the driver gets in the vehicle includes at least one piece of the driver's medical history information, sleep information, fatigue information, and drinking information, and working condition information about professional drivers.

(8) The information processing device according to (6) or (7), in which the observation information about the driver after the driver gets in the vehicle includes at least one piece of (a) information acquired by passive monitoring, and (b) information about analysis of the driver's response to a notification.

(9) The information processing device according to any one of (6) to (8), in which the observation information about the driver after the driver gets in the vehicle includes at least one piece of (a) observation information about the driver's eye movement, (b) observation information before issuance of a manual driving return request notification to the driver, and (c) observation information after issuance of the manual driving return request notification to the driver.

(10) The information processing device according to any one of (6) to (9), in which the data processing unit performs observation to determine which one of driver states 1 to 4 the driver is in, the driver states 1 to 4 being the observation information about the driver after the driver gets in the vehicle, and including:

(driver state 1) a state in which the driver is not in the driver's seat, (driver state 2) a state in which the driver is in the driver's seat, but is not in a driving posture, (driver state 3) a state in which the driver is in the driver's seat and maintains the driving posture, but is not able to return to driving immediately, and (driver state 4) a state in which the driver is in the driver's seat, maintains the driving posture, and is able to return to driving immediately, and the data processing unit determines the alertness level of the driver in accordance with each driver state.

(11) The information processing device according to any one of (1) to (10), in which the data processing unit acquires quality of the driver's steering on a steering device, the quality of the driver's steering being acquired as observation information after issuance of a manual driving return request notification to the driver.

(12) The information processing device according to any one of (1) to (11), in which the data processing unit acquires observation information about the driver's response process in response to a notification to the driver, the observation information about the driver's response process being acquired as the observation information about the driver.

(13) The information processing device according to (12), in which the data processing unit acquires a mode of the driver's pressing of a response pedal in response to the notification, as the observation information about the driver's response process.

(14) The information processing device according to (12) or (13), in which the data processing unit acquires the driver's eye movement when the driver checks display data of the notification, as the observation information about the driver's response process.

(15) A moving apparatus capable of switching between automatic driving and manual driving, the moving apparatus including a data processing unit that determines an alertness level that is a consciousness level of a driver of a vehicle, in which the data processing unit performs an observation information recording process to acquire observation information about the driver and store the observation information into a storage unit, determines the alertness level of the driver on the basis of the acquired observation information, and, in accordance with the determined alertness level, controls a notification timing of a manual driving return request notification that is a notification of request for the driver's return from automatic driving to manual driving.

(16) The moving apparatus according to (15), in which the observation information to be acquired by the data processing unit includes observation information about the driver before the driver gets in the vehicle, and observation information about the driver after the driver gets in the vehicle.

(17) The moving apparatus according to (16), in which the observation information about the driver after the driver gets in the vehicle includes at least one piece of (a) information acquired by passive monitoring, and (b) information about analysis of the driver's response to a notification.

(18) An information processing method implemented in an information processing device, the information processing device including a data processing unit that determines an alertness level that is a consciousness level of a driver of a vehicle, in which the data processing unit performs an observation information recording process to acquire observation information about the driver and store the observation information into a storage unit, and determines the alertness level of the driver on the basis of the acquired observation information.

(19) An information processing method implemented in a moving apparatus capable of switching between automatic driving and manual driving, the moving apparatus including a data processing unit that determines an alertness level that is a consciousness level of a driver of the moving apparatus, in which the data processing unit performs an observation information recording process to acquire observation information about the driver and store the observation information into a storage unit, determines the alertness level of the driver on the basis of the acquired observation information, and, in accordance with the determined alertness level, controls a notification timing of a manual driving return request notification that is a notification of request for the driver's return from automatic driving to manual driving.

(20) A program for causing an information processing device to perform information processing, the information processing device including a data processing unit that determines an alertness level that is a consciousness level of a driver of a vehicle, in which the program causes the data processing unit to perform an observation information recording process to acquire observation information about the driver and store the observation information into a storage unit, and determine the alertness level of the driver on the basis of the acquired observation information.

Further, the series of processes described in this specification can be performed by hardware, software, or a combination of hardware and software. In a case where processes are performed by software, a program in which the process sequences are recorded may be installed into a memory incorporated into special-purpose hardware in a computer that executes the program, or may be installed into a general-purpose computer that can perform various kinds of processes and execute the program. For example, the program can be recorded beforehand into a recording medium. The program can be installed from a recording medium into a computer, or can be received via a network such as a local area network (LAN) or the Internet and be installed into a recording medium such as an internal hard disk.

Note that the various processes described in this specification may not be performed in chronological order according to the description, but may be performed in parallel or independently of one another depending on the processing capability of the device performing the processes or as necessary. Also, in this specification, a system is a logical assembly of a plurality of devices, and does not necessarily mean devices with respective components incorporated into the same housing.

INDUSTRIAL APPLICABILITY

As described above, a configuration of one embodiment of the present disclosure forms a configuration that determines an alertness level that is the consciousness level of the driver of a vehicle, and determines the timing of a manual driving return request notification in accordance with the alertness level. The driver's return action based on the notification is also recorded, and the recorded data is used as feedback data for performing an improvement process to cope with a decrease in the quality of return.

Specifically, a data processing unit determines the alertness level, which is the consciousness level of the driver of the vehicle, for example. The data processing unit acquires observation information about the driver, and determines the alertness level of the driver. The vehicle is a vehicle capable of switching between automatic driving and manual driving, and the data processing unit controls the timing of a manual driving return request notification for the driver's return from automatic driving to manual driving, in accordance with the alertness level of the driver. The observation information to be acquired by the data processing unit includes observation information about the driver both before and after the driver gets in the vehicle. The system performs monitoring to check whether the driver is performing a return transition that is expected in response to a notification issued to the driver, performs prediction, and, at each time, determines whether there is the delay.

For example, passive monitoring, information about the driver's response to a notification, and the like are observed.

This configuration forms a configuration that determines an alertness level that is the consciousness level of the driver of a vehicle, and determines the timing of a manual driving return request notification in accordance with the alertness level. Also, if there is a delay in the return prediction in the middle of a notification request, the information is recorded as the return quality, and appropriate feedback is given to the driver on the basis of the record. In this manner, the driver is made to acquire the habit of acting early and perform early intervention. Further, in a case where an accident or an incident occurs due to a decrease in transition quality, the delay event can be identified on the basis of the recorded data, and a means of analyzing prevention and safety that will lead to improvement of system operation can be provided.

REFERENCE SIGNS LIST

10 Automobile
11 Data processing unit
12 Driver information acquisition unit
13 Environment information acquisition unit
14 Communication unit
15 Notification unit
20 driver
30 Server
50 Information terminal
100 Moving apparatus
101 Input unit
102 Data acquisition unit
103 Communication unit
104 In-vehicle device
105 Output control unit
106 Output unit
107 Drive-line control unit
108 Drive-line system
109 Body control unit
110 Body system
111 Storage unit
112 Automatic-driving control unit
121 Communication network
131 Detection unit
132 Self-location estimation unit
133 Situation analysis unit
134 Planning unit
135 Operation control unit
141 External information detection unit
142 Internal information detection unit
143 Vehicle state detection unit
151 Map analysis unit
152 Traffic rule recognition unit
153 Situation recognition unit
154 Situation prediction unit
155 Safety determination unit
161 Route planning unit
162 Action planning unit
163 Operation planning unit
171 Emergency avoidance unit
172 Acceleration/deceleration control unit
173 Direction control unit
201 Moving apparatus
181 Traveling zone display
182 Tablet
201 Driver information acquisition unit
202 Environment information acquisition unit
203 Driver's individual identification information acquisition unit
210 Safety determination unit
211 Learning processing unit
211 Safety determination process execution unit (manual driving return time estimation unit)
213 Individual authentication processing unit
221 Notification control unit
222 Notification unit
230 Communication unit
240 Storage unit
300 Server
301 Learning data acquisition/generation unit
302 Learning processing unit
303 Communication unit
304 Storage unit
401 Response pedal
421 Head-up display (HUD)
422 Instrument panel
501 CPU
502 ROM
503 RAM
504 Bus
505 Input/output interface
506 Input unit
507 Output unit
508 Storage unit
509 Communication unit
510 Drive
511 Removable medium
521 Sensor
522 Drive unit

The invention claimed is:

1. An information processing device comprising:
a data processing unit configured to determine an alertness level that is a consciousness level of a driver of a vehicle capable of switching between automatic driving and manual driving,
wherein the data processing unit is configured to: acquire observation information about the driver, determine the alertness level of the driver on a basis of the acquired observation information, acquire the observation information that is part or most of a series of actions of the driver at least at one of a time of transition from automatic driving to manual driving and a time of transition from manual driving to automatic driving, perform an observation information recording process, analyze an action delay amount of the driver with respect to a system request that is a request issued from the information processing device to the driver, and store a result of the analysis, as an evaluation value of quality of return from automatic driving to manual driving, into a storage unit.

2. The information processing device according to claim 1, wherein
the data processing unit is configured to store the observation information into the storage unit.

3. The information processing device according to claim 1, wherein
the data processing unit is configured to perform a process of imposing a penalty on the driver, on a basis of the evaluation value of the quality of return.

4. An information processing device comprising:
a data processing unit configured to determine an alertness level that is a consciousness level of a driver of a vehicle capable of switching between automatic driving and manual driving,
wherein the data processing unit is configured to acquire observation information about the driver, determine the alertness level of the driver on a basis of the acquired observation information and,
in accordance with the alertness level of the driver, control a notification timing of a manual driving return request notification that is a notification of request for the driver's return from automatic driving to manual driving.

5. An information processing device comprising:
a data processing unit configured to determine an alertness level that is a consciousness level of a driver of a vehicle,
wherein the data processing unit is configured to acquire observation information about the driver and determine the alertness level of the driver on a basis of the acquired observation information, and wherein
the observation information to be acquired by the data processing unit includes
observation information about the driver before the driver gets in the vehicle, and
observation information about the driver after the driver gets in the vehicle.

6. The information processing device according to claim 5, wherein
the observation information about the driver before the driver gets in the vehicle includes
at least one piece of the driver's medical history information, sleep information, fatigue information, and drinking information, and working condition information about professional drivers.

7. The information processing device according to claim 5, wherein
the observation information about the driver after the driver gets in the vehicle includes at least one piece of
(a) information acquired by passive monitoring, and
(b) information about analysis of the driver's response to a notification.

8. The information processing device according to claim 5, wherein
the observation information about the driver after the driver gets in the vehicle includes at least one piece of
(a) observation information about the driver's eye movement,
(b) observation information before issuance of a manual driving return request notification to the driver, and
(c) observation information after issuance of the manual driving return request notification to the driver.

9. The information processing device according to claim 5, wherein
the data processing unit is configured to perform observation to determine which one of driver states 1 to 4 the driver is in,
the driver states 1 to 4 being the observation information about the driver after the driver gets in the vehicle, and including:
(driver state 1) a state in which the driver is not in the driver's seat,
(driver state 2) a state in which the driver is in the driver's seat, but is not in a driving posture,
(driver state 3) a state in which the driver is in the driver's seat and maintains the driving posture, but is not able to return to driving immediately, and
(driver state 4) a state in which the driver is in the driver's seat, maintains the driving posture, and is able to return to driving immediately, and
the data processing unit is configured to determine the alertness level of the driver in accordance with each driver state.

10. The information processing device according to claim 1, wherein
the data processing unit is configured to acquire quality of the driver's steering on a steering device,
the quality of the driver's steering being acquired as observation information after issuance of a manual driving return request notification to the driver.

11. The information processing device according to claim 1, wherein
the data processing unit is configured to acquire
observation information about the driver's response process in response to a notification to the driver,
the observation information about the driver's response process being acquired as the observation information about the driver.

12. The information processing device according to claim 11, wherein
the data processing unit is configured to acquire a mode of the driver's pressing of a response pedal in response to the notification, as the observation information about the driver's response process.

13. An information processing device comprising:
a data processing unit configured to determine an alertness level that is a consciousness level of a driver of a vehicle,
wherein the data processing unit is configured to: acquire observation information about the driver, determine the alertness level of the driver on a basis of the acquired observation information, acquire observation information about the driver's response process in response to a notification to the driver, the observation information about the driver's response process being acquired as the observation information about the driver, and acquire the driver's eye movement when the driver checks display data of the notification, as the observation information about the driver's response process.

14. A vehicle capable of switching between automatic driving and manual driving,
the vehicle comprising
a data processing unit configured to determine an alertness level that is a consciousness level of a driver of the vehicle,
wherein
the data processing unit is configured to perform an observation information recording process to acquire observation information about the driver and store the observation information into a storage unit, determine the alertness level of the driver on a basis of the acquired observation information, and, in accordance with the determined alertness level, control a notification timing of a manual driving return request notification that is a notification of request for the driver's return from automatic driving to manual driving, and wherein
the observation information to be acquired by the data processing unit includes
observation information about the driver before the driver gets in the vehicle, and observation information about the driver after the driver gets in the vehicle.

15. The vehicle according to claim 14, wherein the observation information about the driver after the driver gets in the vehicle includes at least one piece of
(a) information acquired by passive monitoring, and
(b) information about analysis of the driver's response to a notification.

16. An information processing method implemented in an information processing device,
the information processing device including a data processing unit that determines an alertness level that is a consciousness level of a driver of a vehicle capable of switching between automatic driving and manual driving,
wherein
the data processing unit performs an observation information recording process to acquire observation information about the driver, stores the observation information into a storage unit, determines the alertness level of the driver on a basis of the acquired observation information, acquires the observation information that is part or most of a series of actions of the driver at least at one of a time of transition from automatic driving to manual driving and a time of transition from manual driving to automatic driving, performs an observation information recording process, analyzes an action delay amount of the driver with respect to a system request that is a request issued from the information processing device to the driver, and stores a result of the analysis, as an evaluation value of quality of return from automatic driving to manual driving, into the storage unit.

17. An information processing method implemented in a vehicle capable of switching between automatic driving and manual driving,
the vehicle including a data processing unit that determines an alertness level that is a consciousness level of a driver of the vehicle,
wherein
the data processing unit performs an observation information recording process to acquire observation information about the driver, stores the observation information into a storage unit, determines the alertness level of the driver on a basis of the acquired observation information, and, in accordance with the determined alertness level, controls a notification timing of a manual driving return request notification that is a notification of request for the driver's return from automatic driving to manual driving, wherein
the observation information to be acquired by the data processing unit includes
observation information about the driver before the driver gets in the vehicle, and
observation information about the driver after the driver gets in the vehicle.

18. A non-transitory computer readable medium storing instructions that, when executed by a data processing unit, perform an information processing method comprising;
determining an alertness level that is a consciousness level of a driver of a vehicle capable of switching between automatic driving and manual driving,
wherein
the data processing unit performs an observation information recording process to acquire observation information about the driver, stores the observation information into a storage unit, determines the alertness level of the driver on a basis of the acquired observation information, acquires the observation information that is part or most of a series of actions of the driver at least at one of a time of transition from automatic driving to manual driving and a time of transition from manual driving to automatic driving,
performs an observation information recording process, analyzes an action delay amount of the driver with respect to a system request that is a request issued from the data processing unit to the driver, and stores a result of the analysis, as an evaluation value of quality of return from automatic driving to manual driving, into the storage unit.

\* \* \* \* \*